US009153037B2

(12) United States Patent
Amano et al.

(10) Patent No.: US 9,153,037 B2
(45) Date of Patent: Oct. 6, 2015

(54) IMAGE DECODING DEVICE, IMAGE ENCODING DEVICE, IMAGE DECODING METHOD, AND IMAGE ENCODING METHOD

(71) Applicant: Panasonic Corporation, Osaka (JP)

(72) Inventors: Hiroshi Amano, Osaka (JP); Takeshi Tanaka, Osaka (JP); Kenji Oga, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 40 days.

(21) Appl. No.: 14/241,258

(22) PCT Filed: Nov. 29, 2012

(86) PCT No.: PCT/JP2012/007676
§ 371 (c)(1),
(2) Date: Feb. 26, 2014

(87) PCT Pub. No.: WO2013/108330
PCT Pub. Date: Jul. 25, 2013

(65) Prior Publication Data
US 2014/0294310 A1 Oct. 2, 2014

(30) Foreign Application Priority Data
Jan. 18, 2012 (JP) .................................. 2012-008211

(51) Int. Cl.
G06K 9/36 (2006.01)
G06T 9/00 (2006.01)
(Continued)

(52) U.S. Cl.
CPC ................ *G06T 9/00* (2013.01); *H04N 19/119* (2014.11); *H04N 19/436* (2014.11); *H04N 19/61* (2014.11)

(58) Field of Classification Search
None
See application file for complete search history.

(56) References Cited

U.S. PATENT DOCUMENTS 6,714,686 B2    3/2004   Hashimoto
7,826,535 B2 *  11/2010  Alvarez ................... 375/240.26
(Continued)

FOREIGN PATENT DOCUMENTS

JP      9-84005     3/1997
JP      11-55668    2/1999
(Continued)

OTHER PUBLICATIONS

International Search Report issued Feb. 26, 2013 in corresponding International Application No. PCT/JP2012/007676.
(Continued)

Primary Examiner — Andrae S Allison
(74) Attorney, Agent, or Firm — Wenderoth, Lind & Ponack, L.L.P.

(57) ABSTRACT

An image decoding device which decodes, by pipeline processing which includes plural processes, an encoded image obtained by encoding plural blocks of at least two sizes divided from the image includes: a first storage unit having a capacity for storing two or more blocks having a largest size of the at least two sizes; a first process unit which performs a first process among the plural processes on the plural blocks sequentially, and sequentially stores the plural blocks on which the first process has been performed into the first storage unit; and a second process unit sequentially extracts the plural blocks from the first storage unit, and performs a second process among the plural processes on the extracted plural blocks sequentially.

20 Claims, 46 Drawing Sheets

(51) Int. Cl.
*H04N 19/119* (2014.01)
*H04N 19/61* (2014.01)
*H04N 19/436* (2014.01)

(56) References Cited

U.S. PATENT DOCUMENTS

| | | | |
|---|---|---|---|
| 7,965,773 B1* | 6/2011 | Schlanger et al. | 375/240.16 |
| 8,311,123 B2 | 11/2012 | Kosuge et al. | |
| 2002/0015445 A1 | 2/2002 | Hashimoto | |
| 2004/0264572 A1* | 12/2004 | Sato et al. | 375/240.16 |
| 2008/0123750 A1* | 5/2008 | Bronstein et al. | 375/240.24 |
| 2008/0130743 A1 | 6/2008 | Kosuge et al. | |
| 2009/0190660 A1* | 7/2009 | Kusakabe et al. | 375/240.13 |
| 2010/0225969 A1 | 9/2010 | Sato | |
| 2013/0028531 A1* | 1/2013 | Sato | 382/233 |
| 2013/0188723 A1 | 7/2013 | Tanaka et al. | |
| 2013/0216149 A1* | 8/2013 | Sato | 382/233 |
| 2014/0003510 A1* | 1/2014 | Lu et al. | 375/240.12 |
| 2014/0086322 A1* | 3/2014 | Takahashi et al. | 375/240.12 |
| 2014/0092958 A1* | 4/2014 | Sato | 375/240.02 |
| 2014/0105281 A1* | 4/2014 | Sato et al. | 375/240.03 |

FOREIGN PATENT DOCUMENTS

| | | |
|---|---|---|
| JP | 11-187272 | 7/1999 |
| JP | 2001-275116 | 10/2001 |
| JP | 2008-141276 | 6/2008 |
| JP | 2010-233201 | 10/2010 |
| WO | 2011/145601 | 11/2011 |
| WO | 2012/046435 | 4/2012 |

OTHER PUBLICATIONS

Reply to Written Opinion issued Feb. 26, 2013 in corresponding International Application No. PCT/JP2012/007676 (with English translation).

Thomas Wiegand et al., "Overview of the H.264/AVC Video Coding Standard", IEEE Transactions on Circuits and Systems for Video Technology, vol. 13, No. 7, Jul. 2003, pp. 560-576.

Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d1, 6th Meeting: Torino, IT, Jul. 2011, http://phenix.it-sudparis.eu/jct/doc_end_user/documents/6_Torino/wg11/JCTVC-F803-v3.zip, retrieved on Sep. 22, 2011.

Akihiko Otani et al., "MPEG2 Junkyo Gazo Asshuku Shinchoyo DSP(VDSP2) no Kaihatsu [1]—Architecture Gaiyo—(The Development of a DSP(VDSP2) for the MPEG2 Format1—The Outline of the Architecture-)", 1994 Nen the Institute of Electronics, Information and Communication Engineers Shunki Taikai Koen Ronbunshu, The Institute of Electronics, Information and Communication Engineers, Mar. 10, 1994, p. 218 (with partial English translation).

* cited by examiner

|  | CU size | TU size | PU size |
|---|---|---|---|
| CU0 | 128 x 128 | 64 x 64 | Inter 128 x 128 |
| CU1 | 64 x 64 | 64 x 64 | Inter 64 x 64 |
| CU2 | 64 x 64 | 64 x 64 | Inter 64 x 64 |
| CU3 | 64 x 64 | 64 x 64 | Inter 64 x 64 |
| CU4 | 64 x 64 | 32 x 32 | Inter 64 x 64 |
| CU5 | 128 x 128 | 64 x 64 | Inter 128 x 128 |
| CU6 | 128 x 128 | 64 x 64 | Inter 128 x 128 |
| CU7 | 128 x 128 | 64 x 64 | Inter 128 x 128 |

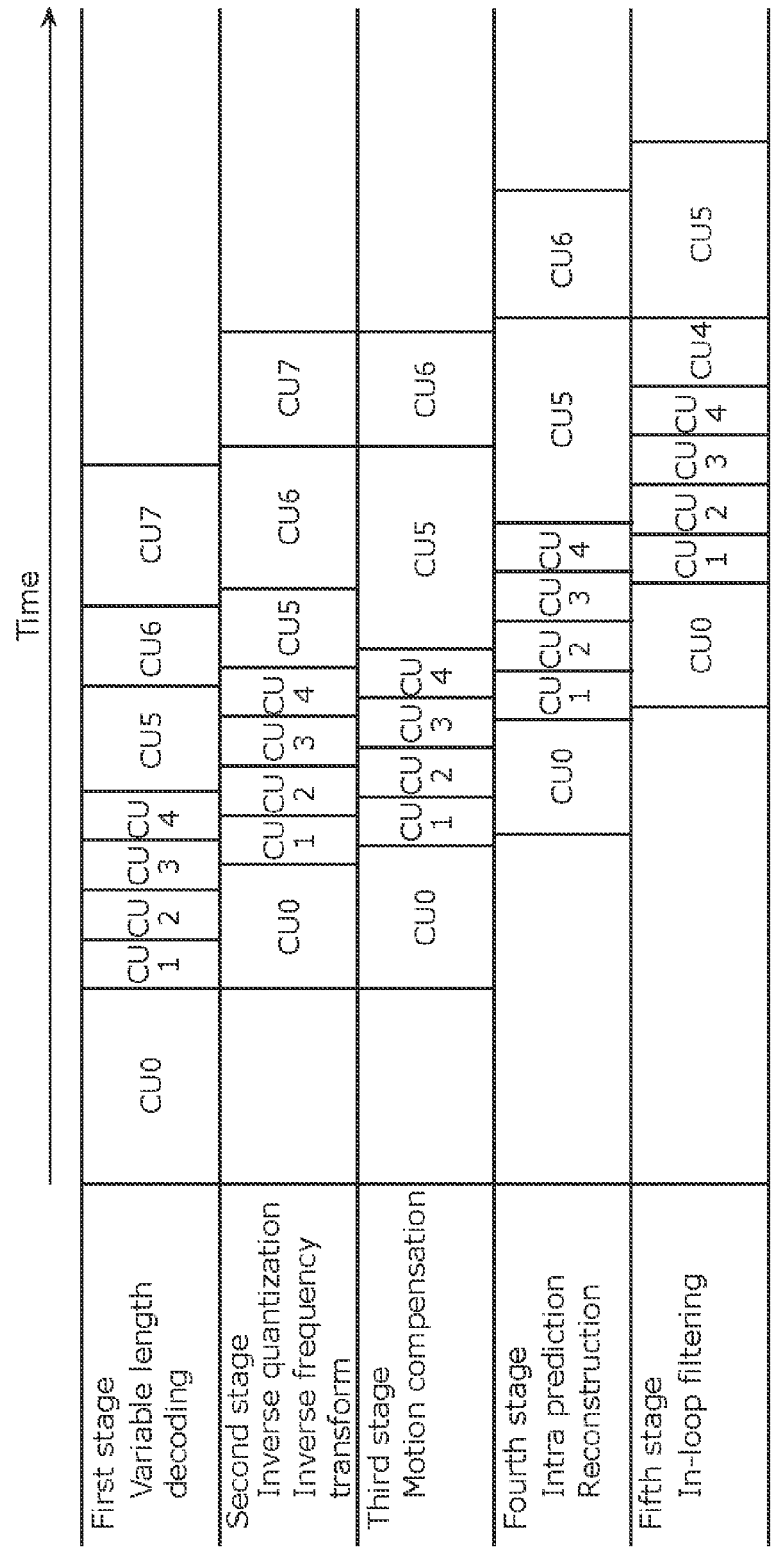

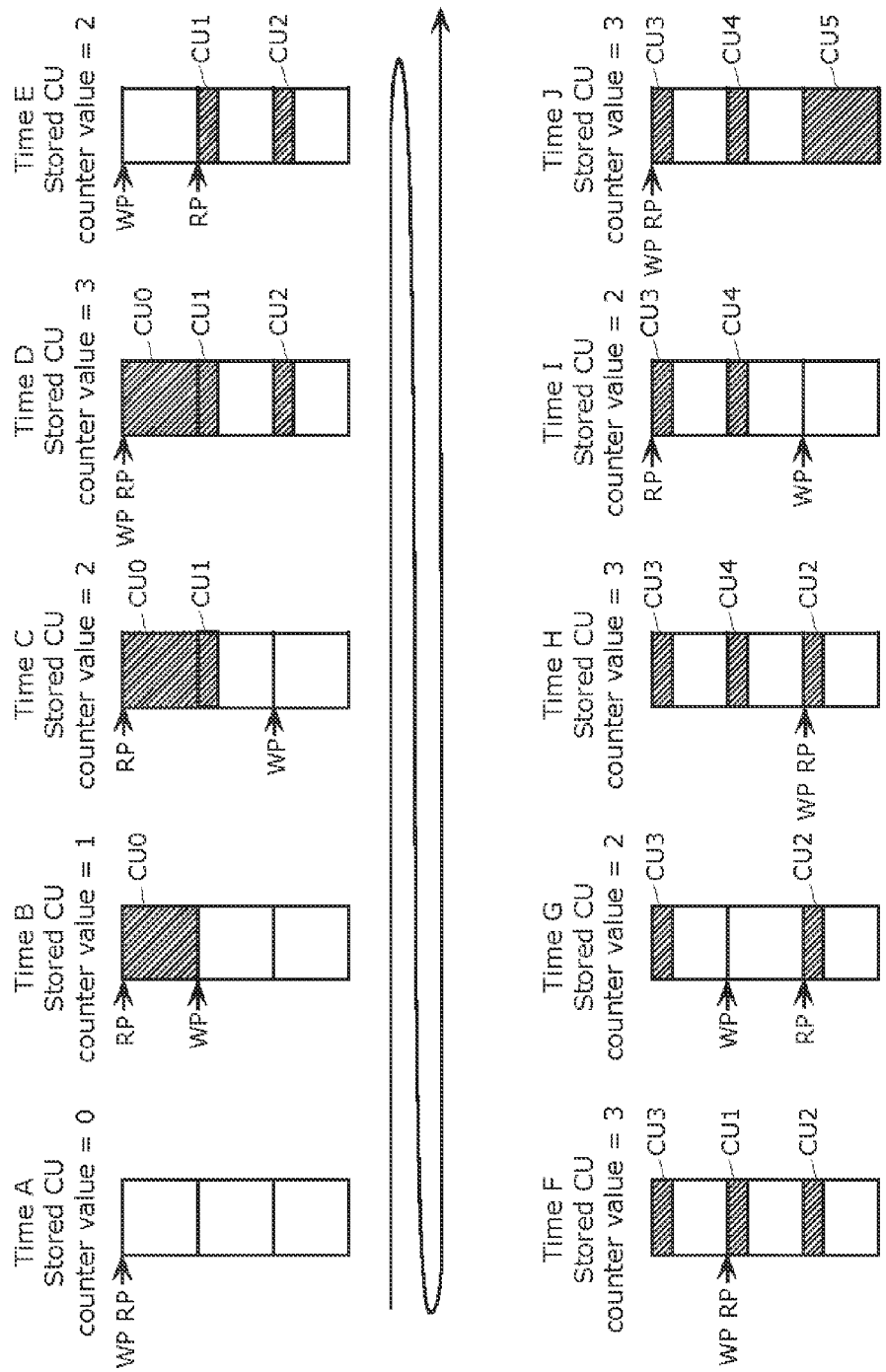

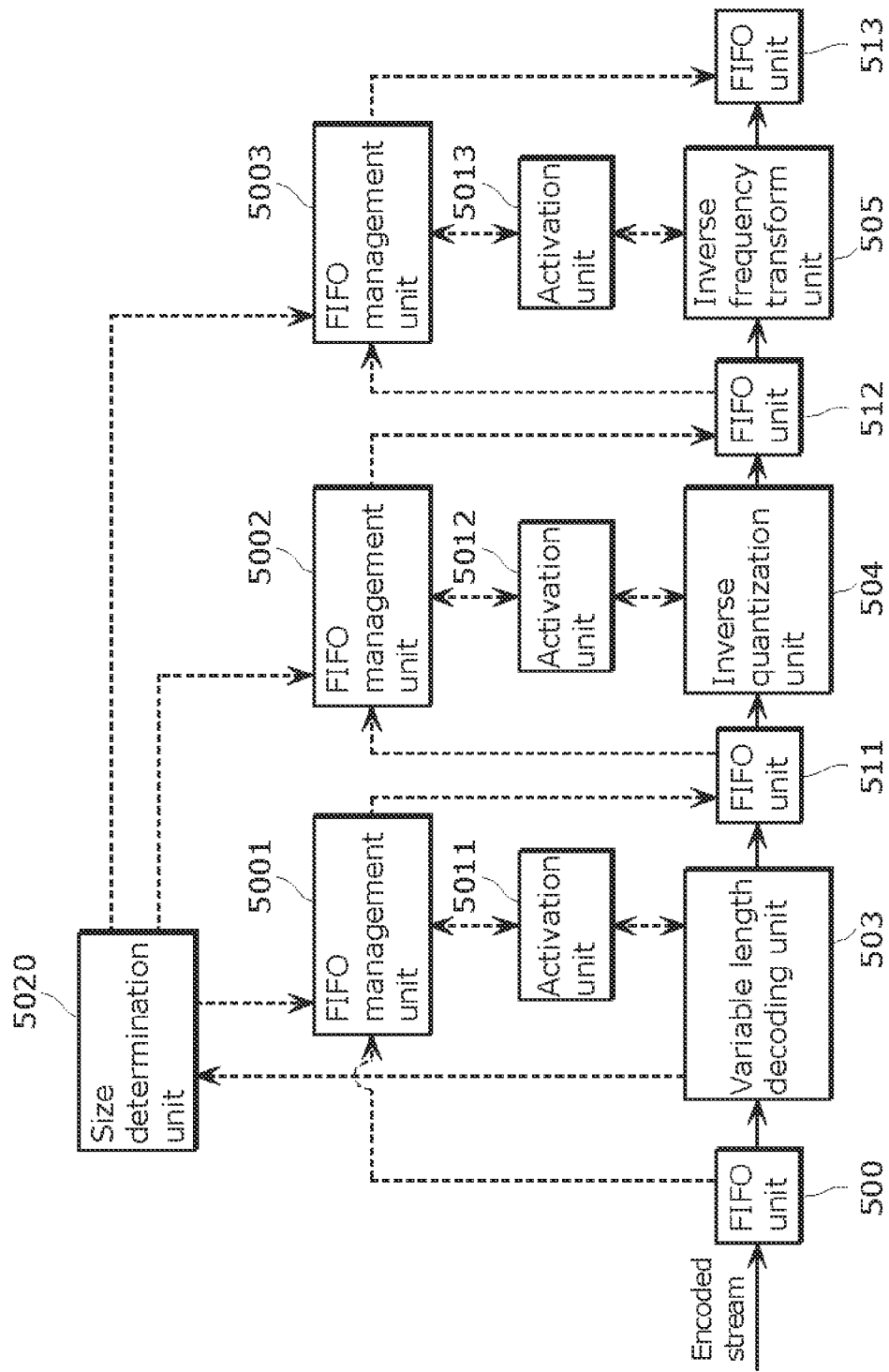

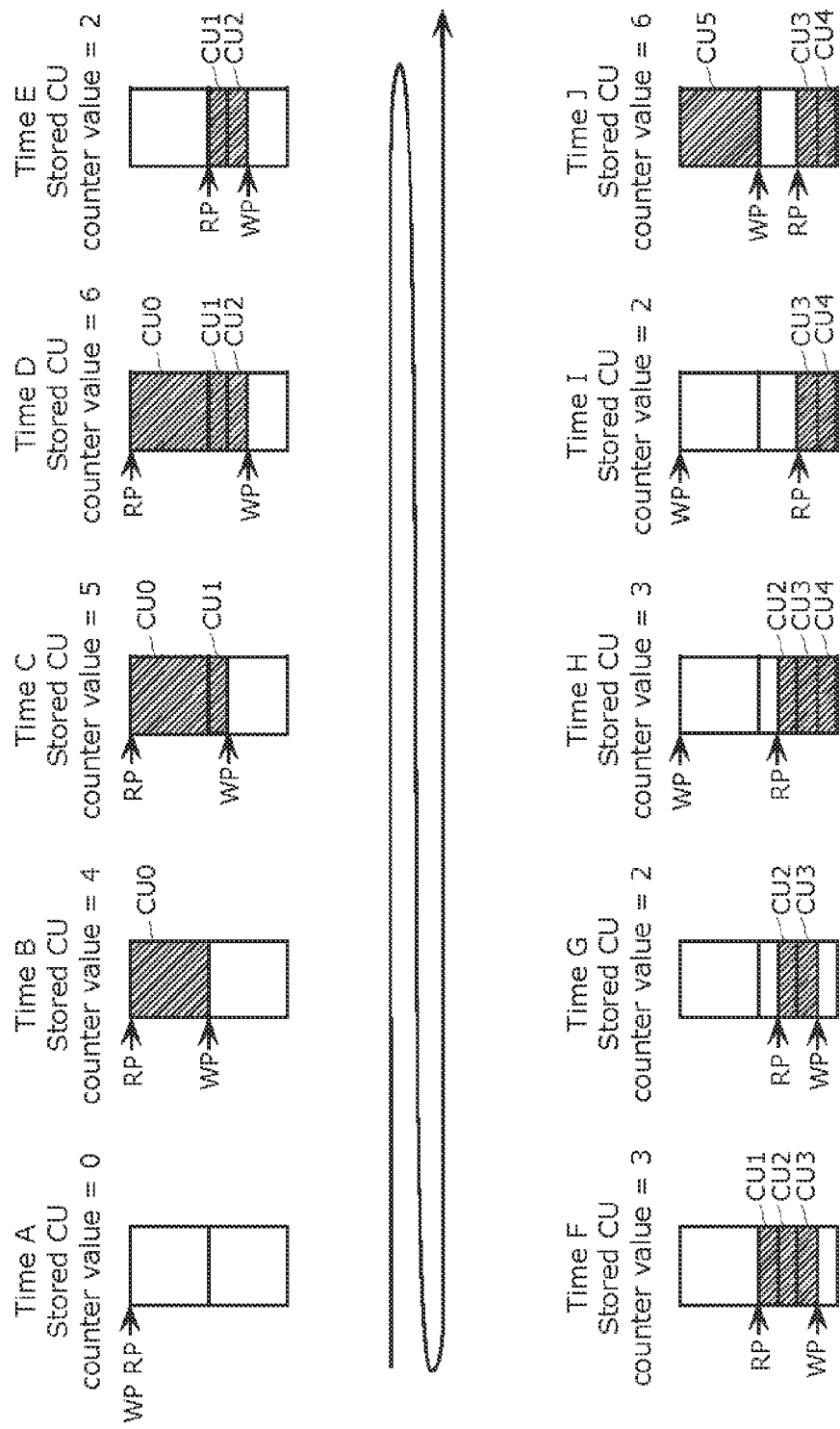

IMAGE DECODING DEVICE, IMAGE ENCODING DEVICE, IMAGE DECODING METHOD, AND IMAGE ENCODING METHOD

TECHNICAL FIELD

The present invention relates to an image decoding device which decodes, by pipeline processing which includes plural processes, an encoded image obtained by encoding plural blocks of at least two sizes divided from the image.

BACKGROUND ART

Patent Literature 1 and Non Patent Literatures 1 and 2 disclose techniques regarding an image decoding device which decodes an image.

CITATION LIST

Patent Literature

[PTL 1] Japanese Unexamined Patent Application Publication No. H9-84005

Non Patent Literature

[NPL 1] Thomas Wiegand et al, "Overview of the H.264/AVC Video Coding Standard", IEEE TRANSACTIONS ON CIRCUITS AND SYSTEMS FOR VIDEO TECHNOLOGY, July 2003, pp. 560-576

[NPL 2] "Working Draft 3 of High-Efficiency Video Coding", [online], Joint Collaborative Team on Video Coding (JCT-VC), Sep. 8, 2011, accessed on Sep. 22, 2011, <URL: http://phenix.it-sudparis.eu/jct/doc_end_user/documents/6_Torino/wg11/JCTVC-F803-v3.zip>

SUMMARY OF INVENTION

Technical Problem

Idle waiting time, however, may be generated when an image decoding device decodes an image by pipeline processing.

In view of this, the present invention provides an image decoding device which can reduce idle waiting time.

Solution to Problem

An image decoding device according to an aspect of the present invention is an image decoding device which decodes, by pipeline processing which includes plural processes, an encoded image obtained by encoding plural blocks of at least two sizes divided from the image, the image decoding device including: a first storage unit having a capacity for storing two or more blocks having a largest size of the at least two sizes; a first process unit configured to perform a first process among the plural processes on the plural blocks sequentially, and sequentially store the plural blocks on which the first process has been performed into the first storage unit; and a second process unit configured to sequentially extract the plural blocks from the first storage unit, and perform a second process among the plural processes on the extracted plural blocks sequentially.

It should be noted that these general and specific aspects may be implemented using a system, a method, an integrated circuit, a computer program, a computer-readable non-transitory recording medium such as a CD-ROM, or any combination of systems, devices, methods, integrated circuits, computer programs, and recording media

Advantageous Effects of Invention

The present invention achieves a reduction in idle waiting time in pipeline processing. Consequently, processing efficiency improves.

BRIEF DESCRIPTION OF DRAWINGS

FIG. 15 is a time chart illustrating operation of the image decoding device according to Embodiment 1.

FIG. 17 illustrates other examples of time-series states of the FIFO unit according to Embodiment 1.

FIG. 18 illustrates detailed configurations of a variable length decoding unit, an inverse quantization unit, and an inverse frequency transform unit of an image decoding device according to Embodiment 2.

FIG. 20 illustrates examples of time-series states of a FIFO unit according to Embodiment 2.

Figure 1:
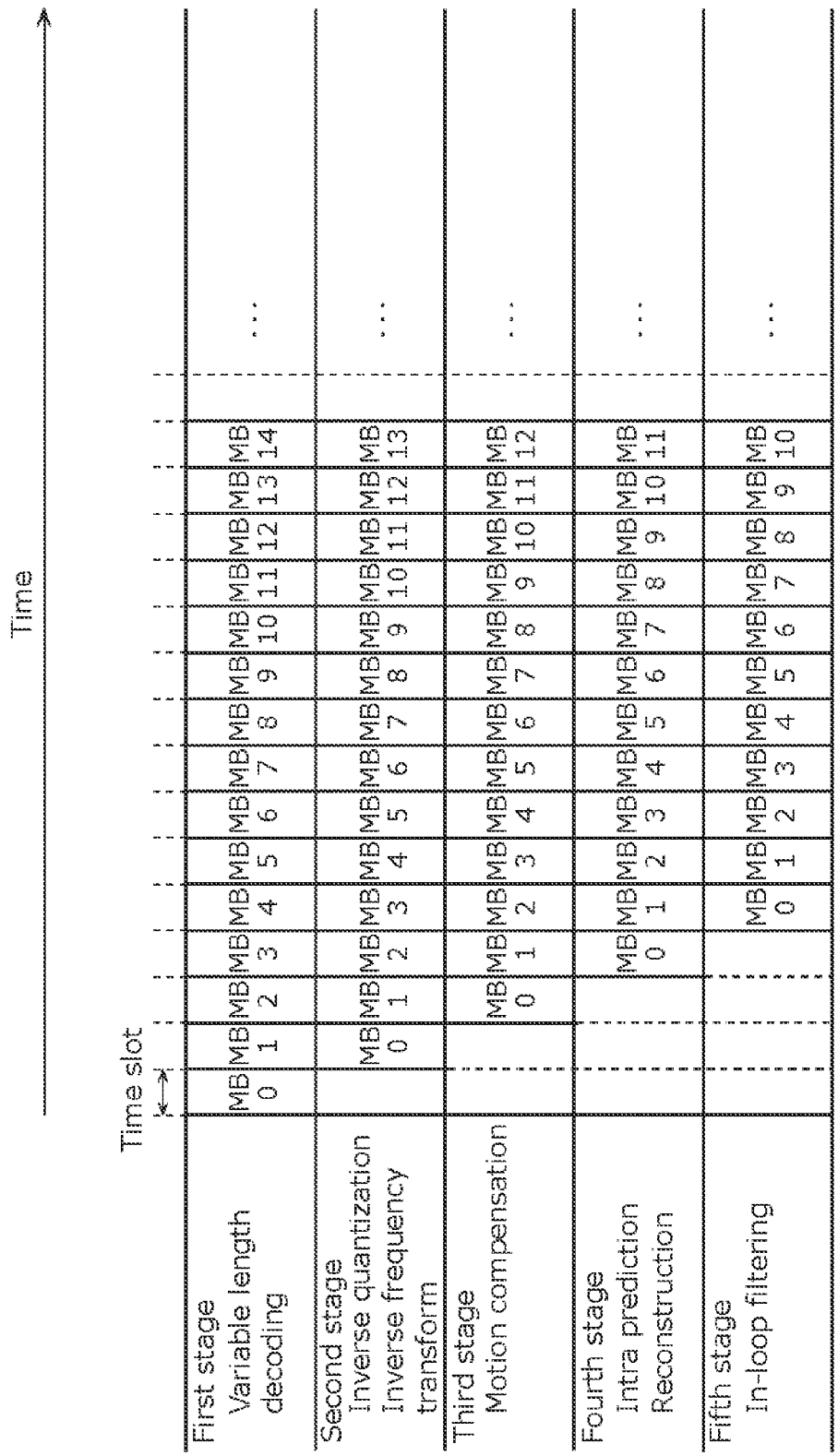
FIG. 1 is an explanatory diagram illustrating pipeline processing.

DESCRIPTION OF EMBODIMENTS (Underlying Knowledge Forming Basis of the Present Invention)

The inventors of the present invention have found problems regarding the image decoding device which decodes an image described in the "Background Art" section. The following is a detailed description.

An image encoding device which encodes a moving picture divides pictures which form a moving picture into plural macroblocks each include 16×16 pixels (a macroblock may be abbreviated and referred to as MB). Then, the image encoding device encodes the macroblocks in the raster scan order. The image encoding device generates an encoded stream by encoding and compressing the moving picture. An image decoding device decodes this encoded stream on a macroblock-by-macroblock basis in the raster scan order, and reproduces pictures of the original moving picture.

One conventional image encoding system is the ITU-T H.264 standard (see NPL 1). An image decoding device reads an encoded stream first, in order to decode an image encoded in accordance with the H. 264 standard. Then, the image decoding device decodes various header information pieces, and thereafter performs variable length decoding. The image decoding device performs inverse quantization on coefficient information obtained by variable length decoding, and performs inverse frequency transform, thereby generating a difference image.

Next, the image decoding device performs intra prediction or motion compensation according to a macroblock type obtained by variable length decoding. The image decoding device thereby generates a predicted image. After that, the image decoding device performs a reconstruction process by adding the difference image to a predicted image. Then, the image decoding device decodes a current image by performing an in-loop filtering process on the reconstructed image.

In this manner, the image decoding device performs processing from the variable length decoding process through the in-loop filtering process for each macroblock, to decode an encoded image. As a technique of accelerating this decoding processing, a technique of executing the decoding processing by pipeline processing for macroblock units is generally used (see PTL 1). In pipeline processing performed for macroblock units, a series of processes from a variable length decoding process through an in-loop filtering process is divided at some stages. Then, processes at the stages are executed in parallel while achieving synchronization in macroblock data units.

It should be noted that a next-generation image encoding scheme proposes setting a data unit more flexibly (see NPL 2, for example).

However, idle waiting time may be generated in pipeline processing in which plural processes are executed in synchronization. For example, if only one process among plural processes included in pipeline processing requires a long time, other processes need to wait until that one process is completed. This idle waiting time exerts an influence on processing efficiency. Further, this exerts greater unfavorable influence in pipeline processing conforming to the next-generation image encoding standard that allows a data unit to be changeable. The following is a more specific description.

FIG. 1 illustrates an example of pipeline processing in which decoding processing is divided at five stages. In the example illustrated in FIG. 1, a process at the first stage through a process at the fifth stage are sequentially performed on one macroblock. Then, the process at the first stage through the process at the fifth stage are simultaneously performed on plural different macroblocks.

At the first stage, the image decoding device performs variable length decoding on an encoded stream, and outputs encoding information such as a motion vector, and coefficient information corresponding to data on each pixel. At the second stage, the image decoding device performs inverse quantization and inverse frequency transform on the coefficient information obtained at the first stage, thereby generating a difference image.

At the third stage, the image decoding device performs motion compensation according to a macroblock type obtained by variable length decoding, thereby generating a predicted image. At the fourth stage, the image decoding device performs a reconstruction process using the difference image obtained at the second stage and one of the predicted image obtained by motion compensation at the third stage and a predicted image obtained by an intra prediction process performed at the fourth stage. At the fifth stage, the image decoding device performs an in-loop filtering process.

In this way, the image decoding device simultaneously processes plural different macroblocks at the stages using pipeline processing. Accordingly, the image decoding device can execute parallel processing, and accelerate decoding processing.

At this time, cycles in time slots (TSs) of pipeline processing are determined based on the longest processing cycle at a stage. Accordingly, if a processing cycle at only a certain stage is long, processes on next macroblocks cannot be started at other stages until the longest process at the stage is completed. Consequently, this causes idle time. To efficiently execute pipeline processing, it is important to make settings such that idle time is not generated in processes included in pipeline processing.

An image encoding device in conformity with the H. 264 standard encodes an image on a macroblock-by-macroblock basis (each macroblock includes 16×16 pixels), as described above. However, 16×16 pixels do not necessarily form an optimal unit for encoding. Generally, the higher a correlation between adjacent blocks is, the higher the resolution of an image is. Accordingly, compression efficiency can be further improved by increasing the size of a coding unit.

In recent years, an extremely high definition display has been developed, such as a 4K2K (3840 pixels×2160 pixels) display, for instance. Thus, it is expected that the resolution of an image to be handled will be increasingly high. The image encoding device in conformity with the H. 264 standard is becoming incapable of encoding such high resolution images efficiently, along with an increase in the resolution of images as described above.

Techniques proposed as next-generation image encoding standards include a technique for addressing such a problem (NPL 2). With such a technique, the size of a block in conformity with the conventional H. 264 standard can be changed. The image encoding device according to this technique can encode an image on a block-by-block basis (each block is larger than a conventional 16×16 pixel block), and appropriately encode extremely high definition images.

Specifically, NPL 2 defines a coding unit as an encoding data unit. This coding unit is a data unit which allows intra prediction for prediction within a slice and inter prediction for motion compensation to be switched, as with a macroblock in the conventional encoding standard, and is specified as the most basic block for encoding.

The size of such a coding unit is one of 4×4 pixels, 8×8 pixels, 16×16 pixels, 32×32 pixels, 64×64 pixels, and 128×128 pixels. A coding unit having the largest size is referred to as a largest coding unit (LCU).

4096-pixel data is included in a 64×64-pixel coding unit. 16384-pixel data is included in a 128×128-pixel coding unit. Thus, a 128×128-pixel coding unit includes 4 times the data of a 64×64-pixel coding unit.

Figure 2:
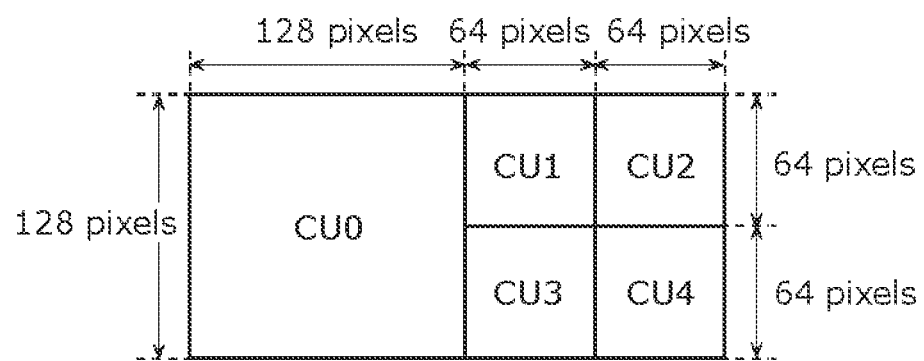
FIG. 2 is an explanatory diagram illustrating blocks having changeable sizes.

FIG. 2 illustrates examples of plural coding units which include 128×128 pixels and 64×64 pixels. Furthermore, NPL 2 defines "transform unit" (TU: also referred to as "frequency transform unit"). A transform unit is defined as a block size for frequency transform. Specifically, the size of such a transform unit is one of 4×4 pixels, 8×8 pixels, 16×16 pixels, 32×32 pixels, and 64×64 pixels.

In addition, a prediction unit (PU) is further defined as a data unit for intra prediction or inter prediction. The size of a prediction unit is selected from among various rectangular sizes of 4×4 pixels or more within a coding unit, such as 128×128 pixels, 64×128 pixels, 128×64 pixels, and 64×64 pixels.

As described above, NPL 2 discloses a technique of improving encoding efficiency by allowing the size of a coding unit, namely, a macroblock to be changed. However, if pipeline processing disclosed in PTL 1 is applied to such a coding unit of a changeable size, a necessary amount of processing increases in proportion to the number of pixels included in a coding unit. In addition, the number of processing cycles also increases, similarly.

Specifically, when an encoded stream includes coding units of different sizes, a time period for a processing cycle at each stage of pipeline processing will greatly differ depending on the size of a coding unit. Accordingly, waiting time in which no processing can be performed is generated at a stage where processing is performed on a small coding unit. Then, processing efficiency of pipelining will fall. Specifically, a coding unit having a changeable size will decrease processing efficiency of the image decoding device.

Figure 3:
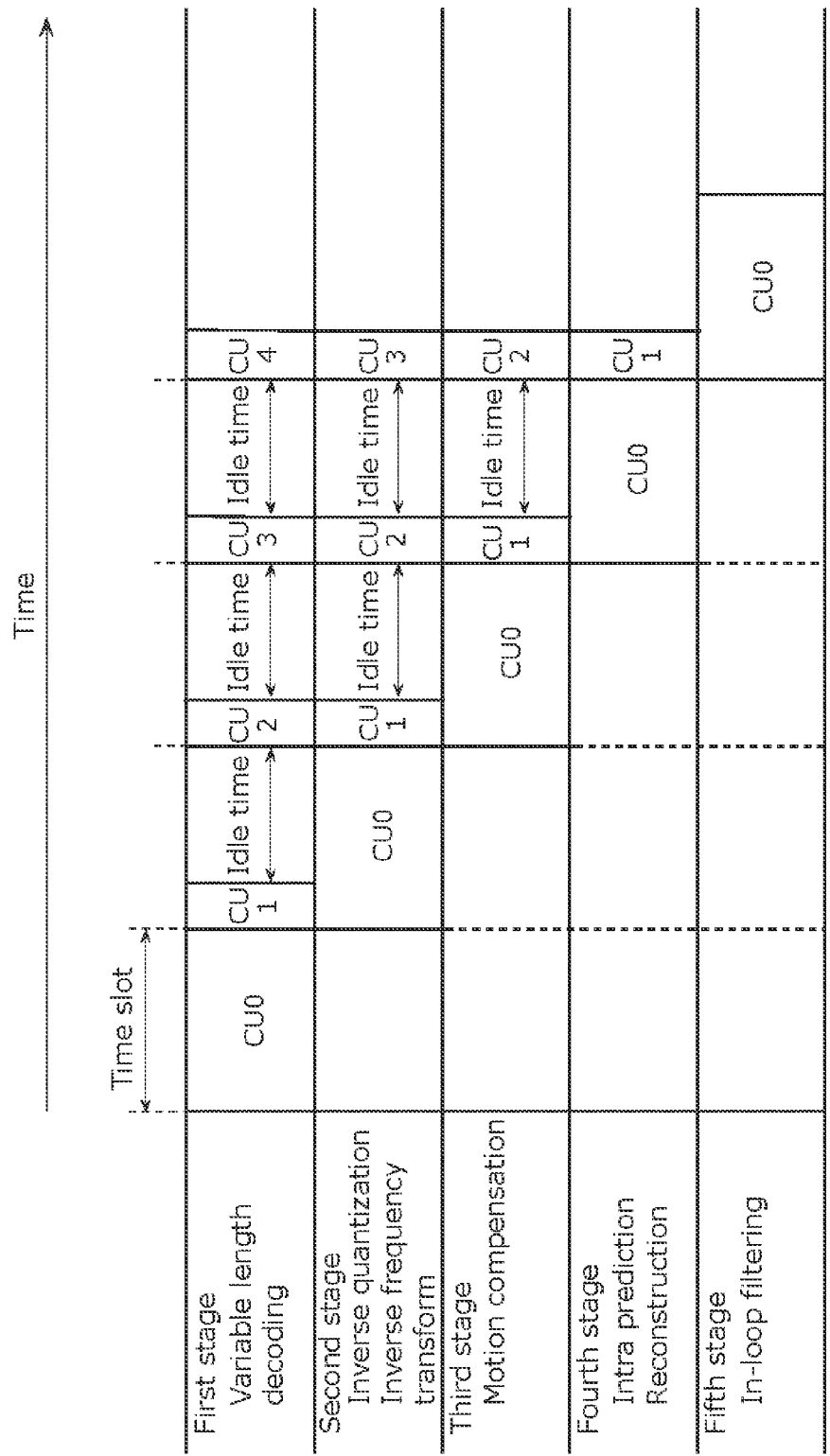
FIG. 3 is an explanatory diagram illustrating operation when pipeline processing is applied to blocks having changeable sizes.

For example, FIG. 3 illustrates an example in which an encoded stream is decoded by pipeline processing at five stages. In this example, as shown in FIG. 2, CU0 is a coding unit including 128×128 pixels, and following CU1 to CU4 each include 64×64 pixels. In this case, CU0 is a coding unit including 4 times the pixels of CU1 to CU4 each, and thus a time period for a cycle of processing on CU0 will be 4 times a time period for a cycle of processing on each of the other coding units.

Accordingly, at the first stage, idle time occurs when the process on CU1 at the first stage is completed up to when the process on CU0 at the second stage is completed. At the second stage, idle time occurs similarly when the process on CU1 at the second stage is completed up to when the process on CU0 at the third stage is completed. Also, at the third stage, idle time occurs when the process on CU1 at the third stage is completed up to when the process on CU0 at the fourth stage is completed. Accordingly, idle time during which the process is not performed occurs at all the stages.

In this way, if the size of a coding unit is changed, the amount of pixel data to be processed varies. If an encoded stream is decoded by pipeline processing, a unit time for pipeline processing is determined based on a coding unit having a large amount of pixel data. As a result, idle time occurs after processing a coding unit having a small amount of pixel data. Accordingly, processing efficiency and processing performance fall.

In order to solve such problems, an image decoding device according to an aspect of the present invention is an image decoding device which decodes, by pipeline processing which includes plural processes, an encoded image obtained by encoding plural blocks of at least two sizes divided from the image, the image decoding device including: a first storage unit having a capacity for storing two or more blocks having a largest size of the at least two sizes; a first process unit configured to perform a first process among the plural processes on the plural blocks sequentially, and sequentially store the plural blocks on which the first process has been performed into the first storage unit; and a second process unit configured to sequentially extract the plural blocks from the first storage unit, and perform a second process among the plural processes on the extracted plural blocks sequentially.

This allows the first process unit to process a block having the largest size and write the block into the first storage unit and simultaneously, the second process unit to extract another block having the largest size from the first storage unit, and process that other block. Furthermore, the first storage unit can store three or more blocks depending on the sizes thereof. Thus, idle waiting time is reduced during which the first process unit and the second process unit wait for the end of each other's process, thus improving processing efficiency.

For example, the image decoding device may further include a second storage unit, wherein the second process unit may be configured to determine whether a block on which the first process has been performed is stored in the first storage unit and whether the second storage unit has an available area for storing a block on which the second process is performed, and at a time when the second process unit determines that a block on which the first process has been performed is stored in the first storage unit and the second storage unit has an available area for storing a block on which the second process is performed, the second process unit may be configured to extract the block from the first storage unit, perform the second process on the extracted block, and store the block on which the second process has been performed into the second storage unit.

This allows the second process unit to perform a process at a time when preparation for the process is complete. Consequently, idle waiting time is reduced.

For example, the image decoding device may further include a determination unit configured to determine sizes of the plural blocks, wherein the first process unit may be configured to determine, according to a size of a block on which the first process has been performed, an area to be occupied by the block in the first storage unit, and store the block into the determined area.

This allows the first process unit to store plural blocks into the first storage unit appropriately according to the sizes thereof. Consequently, the first process unit can store many blocks in a small capacity.

For example, the first storage unit may have a capacity for storing three or more blocks having the largest size of the at least two sizes.

This allows the first process unit to store more blocks into the first storage unit. Consequently, the image decoding device can reduce waiting time more reliably.

For example, the plural blocks may be plural coding units, plural transform units, or plural prediction units, and the first process unit or the second process unit may be configured to perform, as the first process or the second process, a variable length decoding process on the plural coding units, an inverse frequency transform process on the plural transform units, or a prediction process on the plural prediction units.

This reduces idle waiting time in pipeline processing in which various data units are used.

For example, the first process unit may be configured to perform a variable length decoding process as the first process, and the second process unit may be configured to perform an inverse quantization process as the second process.

This reduces waiting time that occurs between a variable length decoding process and an inverse quantization process. Consequently, processing efficiency improves.

For example, the first process unit may be configured to perform an inverse quantization process as the first process, and the second process unit may be configured to perform an inverse frequency transform process as the second process.

This reduces waiting time that occurs between an inverse quantization process and an inverse frequency transform process. Consequently, processing efficiency improves.

For example, the first process unit may be configured to perform an inverse frequency transform process as the first process, and the second process unit may be configured to perform a reconstruction process as the second process.

This reduces waiting time that occurs between an inverse frequency transform process and a reconstruction process. Consequently, processing efficiency improves.

For example, the first process unit may be configured to perform an intra prediction process as the first process, and the second process unit may be configured to perform a reconstruction process as the second process.

This reduces waiting time that occurs between an intra prediction process and a reconstruction process. Consequently, processing efficiency improves.

For example, the first process unit may be configured to perform a motion compensation process as the first process, and the second process unit may be configured to perform a reconstruction process as the second process.

This reduces waiting time that occurs between a motion compensation process and a reconstruction process. Consequently, processing efficiency improves.

For example, the first process unit may be configured to perform a reconstruction process as the first process, and the second process unit may be configured to perform an in-loop filtering process as the second process.

This reduces waiting time that occurs between a reconstruction process and an in-loop filtering process. Consequently, processing efficiency improves.

For example, the first process unit may be configured to perform a reference image transfer process as the first process, and the second process unit may be configured to perform a motion compensation process as the second process.

This reduces waiting time that occurs between a reference image transfer process and a motion compensation process. Consequently, processing efficiency improves.

For example, the second process unit may be configured to sequentially extract the plural blocks from the first storage unit and perform the second process on the extracted plural blocks sequentially, asynchronously with the first process unit.

This allows the first process unit and the second process unit to operate asynchronously and independently. Consequently, the first process unit and the second process unit each perform a process at an appropriate time. Thus, idle waiting time is reduced, and processing efficiency improves.

For example, the second process unit may be configured to perform the second process on a second block away from a first block by two or more blocks in order in which the plural blocks are processed, in parallel to the first process unit performing the first process on the first block.

This allows the first process unit to perform a process independently of the progress state of the process by the second process unit. Consequently, idle waiting time is reduced.

Furthermore, an image encoding device according to an aspect of the present invention may be an image encoding device which divides an image into plural blocks of at least two sizes, and encodes the divided image by pipeline processing which includes plural processes, the image encoding device including: a first storage unit having a capacity for storing two or more blocks having a largest size of the at least two sizes; a first process unit configured to perform a first process among the plural processes on the plural blocks sequentially, and sequentially store the plural blocks on which the first process has been performed into the first storage unit; and a second process unit configured to sequentially extract the plural blocks from the first storage unit, and perform a second process among the plural processes on the extracted plural blocks sequentially.

This allows the image encoding device to achieve similar effects to those achieved by the image decoding device. Accordingly, idle waiting time is reduced and processing efficiency improves in the image encoding device.

It should be noted that these general and specific aspects may be implemented using a system, a method, an integrated circuit, a computer program, a non-transitory computer-readable recording medium such as a CD-ROM, or any combination of systems, devices, methods, integrated circuits, computer programs or recording media.

In the following, a detailed description is given of embodiments of the present invention using drawings. The exemplary embodiments described below each show a general or specific example. The numerical values, shapes, materials, constituent elements, the arrangement and connection of the constituent elements, steps, the processing order of the steps, and the like described in the following embodiments are mere examples, and thus do not limit the scope of the appended claims. Therefore, among the constituent elements in the following exemplary embodiments, constituent elements not recited in any of the independent claims defining the most generic part of the inventive concept are described as arbitrary constituent elements.

In addition, expressions such as 128×128 pixels and 64×64 pixels mean sizes such as a 128×128-pixel size and a 64×64-pixel size, respectively.

In addition, in the following, expressions such a block, a data unit, and a coding unit (CU) each mean a united area. The expressions may each mean an image area. Alternatively, the expressions may each mean a data area in an encoded stream.

In addition, an image may be a moving picture, a still picture, plural pictures which form a moving picture, one picture, or a part of a picture.

Embodiment 1

1-1. Outline

First is a description of the outline of an image decoding device according to the present embodiment. An image decoding device according to the present embodiment decodes an encoded stream which is an encoded image. The size of a coding unit included in an encoded stream can be changed. In addition, the image decoding device divides plural processes included in decoding processing at plural stages, and performs the plural processes in parallel by pipelining.

At that time, the image decoding device performs plural processes in parallel by pipelining, according to the size of a coding unit defined in the encoded stream. Input/output buffers are connected to plural process units included in the image decoding device. The input/output buffers include first-in-first-out (FIFO) units which can each store data corresponding to at least three largest coding units. It should be noted that the largest coding unit is a largest one of plural coding units included in an encoded stream.

This shortens, in each process, a time to wait for the input of data and a time to wait until an output buffer has an available area even if plural coding units have various sizes. Consequently, idle time in pipeline processing is reduced, and pipeline processing is performed efficiently. Thus, processing performance improves.

Then, the greater capacity each FIFO unit has, the shorter a time to wait for the input of data and a time to wait until an output buffer has an available area become in each process.

The above is a description of the outline of the image decoding device according to the present embodiment.

1-2. Configuration

Next is a description of a configuration of the image decoding device according to the present embodiment.

Figure 4:
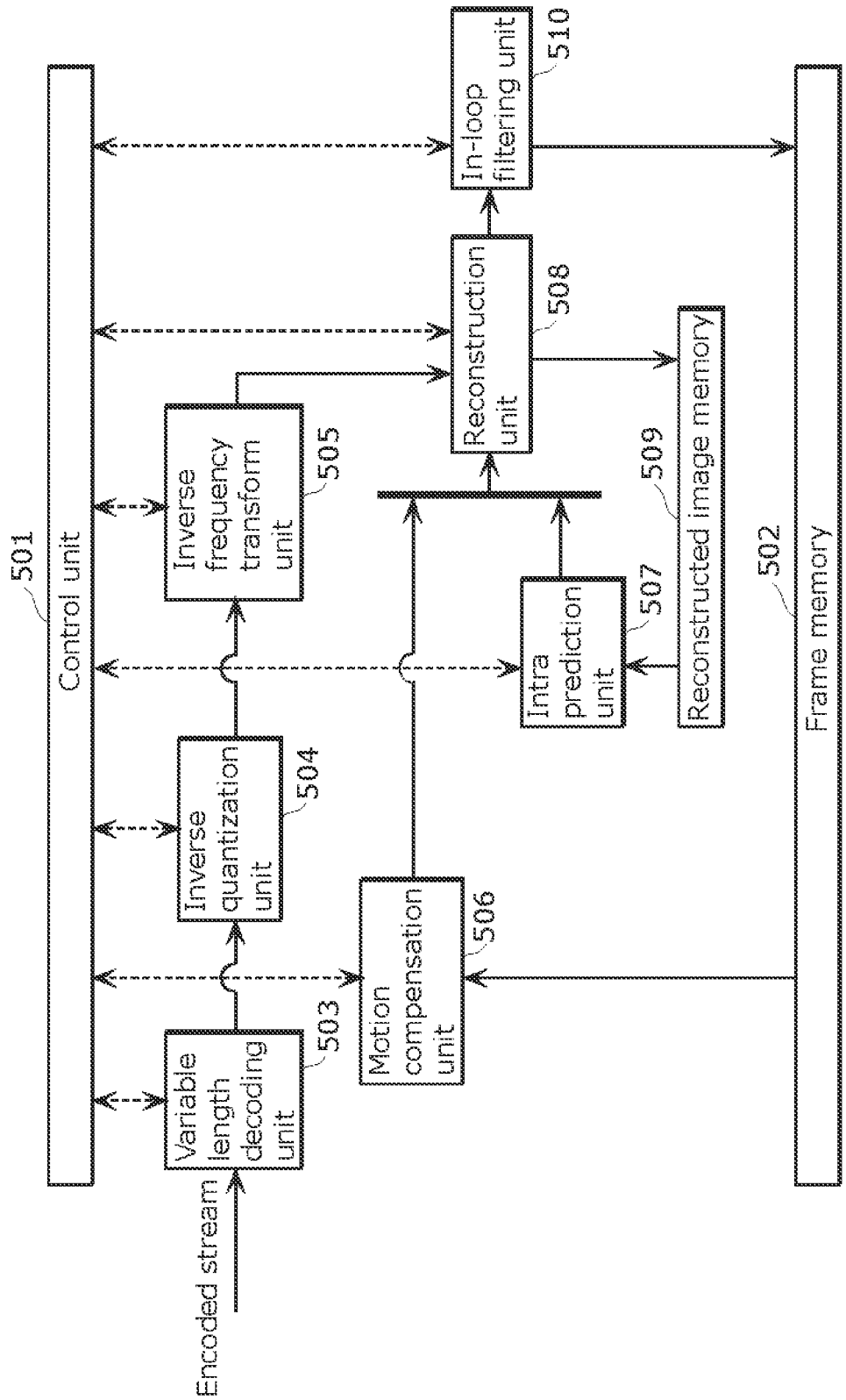
FIG. 4 illustrates a configuration of an image decoding device according to Embodiment 1.

FIG. 4 illustrates a configuration of the image decoding device according to the present embodiment. The image decoding device according to the present embodiment includes: a control unit 501; a frame memory 502; a reconstructed image memory 509; a variable length decoding unit 503; an inverse quantization unit 504; an inverse frequency transform unit 505; a motion compensation unit 506; an intra prediction unit 507; a reconstruction unit 508; and an in-loop filtering unit 510.

The control unit 501 performs overall control of the image decoding device. The frame memory 502 is a memory for storing decoded image data. The reconstructed image memory 509 is a memory for storing some of generated reconstructed images. The variable length decoding unit 503 reads an encoded stream, and decodes a variable length code. The inverse quantization unit 504 performs inverse quantization. The inverse frequency transform unit 505 performs inverse frequency transform.

The motion compensation unit 506 reads a reference image from the frame memory 502, performs motion compensation, and generates a predicted image. The intra prediction unit 507 reads a reference image from the reconstructed image memory 509, performs intra prediction, and generates a predicted image. The reconstruction unit 508 adds a difference image and a predicted image to generate a reconstructed image, and stores some of such images into the reconstructed image memory 509. The in-loop filtering unit 510 eliminates noise of a reconstructed image by an in-loop filtering process, to improve the quality of the reconstructed image.

An in-loop filter is a filter applied to a reconstructed image prior to storing the reconstructed image as a reference image into the frame memory 502. A deblocking filter, a sample adaptive offset filter, and an active loop filter may be used as in-loop filters. In contrast, a filter applied to an image when the image is to be displayed is called an out-loop filter.

Figure 5:
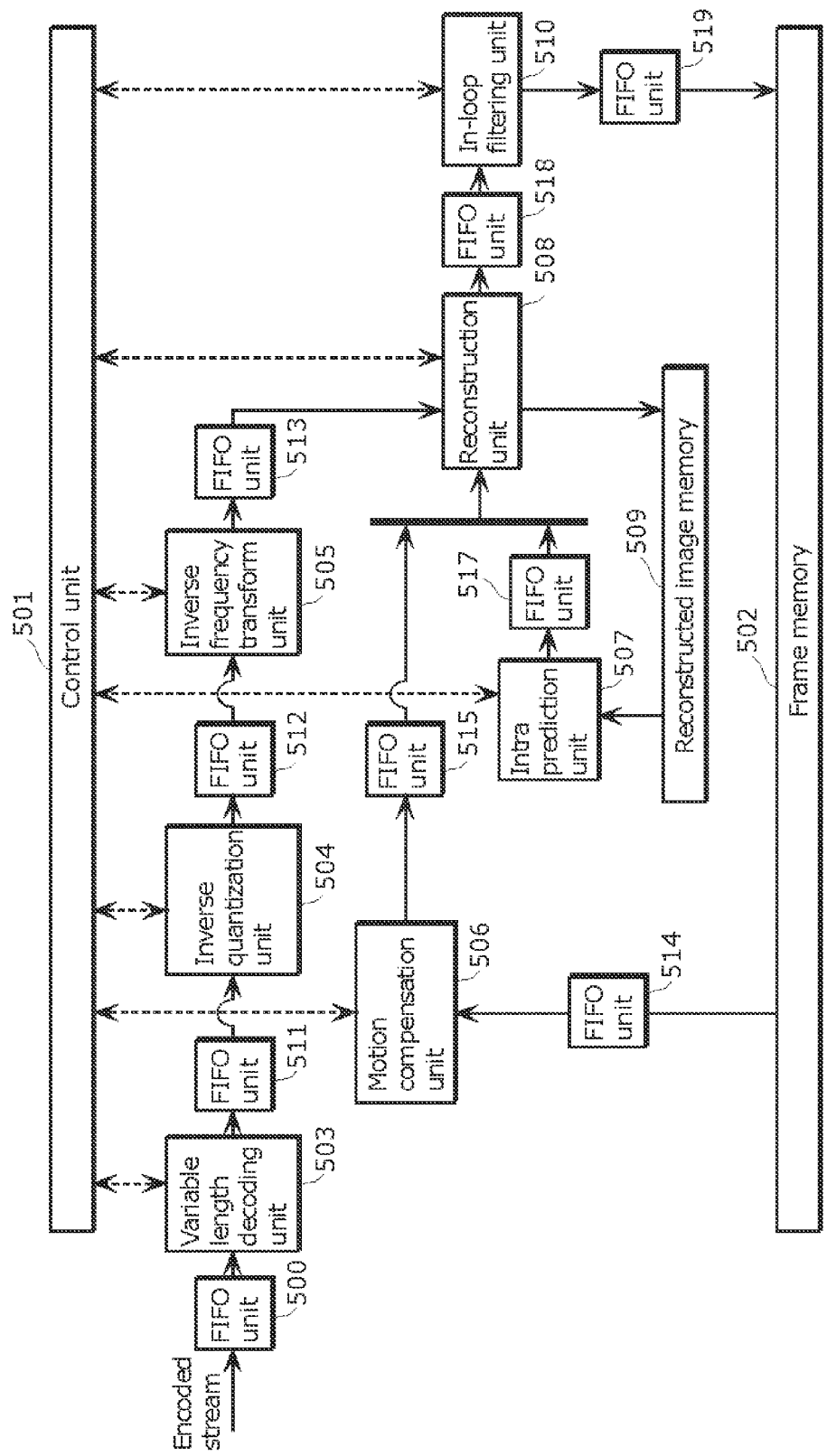
FIG. 5 is a configuration diagram illustrating connection between plural constituent elements according to Embodiment 1.

FIG. 5 is a configuration diagram illustrating connection between plural process units. The same numerals are assigned to the same constituent elements as those in FIG. 4, and a description thereof is omitted.

An encoded stream is input to the variable length decoding unit 503 according to the present embodiment via a FIFO unit 500. The variable length decoding unit 503 and the inverse quantization unit 504 are connected via a FIFO unit 511 for storing a coefficient. In addition, the inverse quantization unit 504 and the inverse frequency transform unit 505 are connected via a FIFO unit 512 for storing a quantized coefficient.

The inverse frequency transform unit 505 and the reconstruction unit 508 are connected via a FIFO unit 513 for storing a residual image after an inverse frequency transform process. In addition, the frame memory 502 and the motion compensation unit 506 are connected via a FIFO unit 514 for storing a reference image. The motion compensation unit 506 and the reconstruction unit 508 are connected via a FIFO unit 515 for storing a predicted image.

The reconstruction unit 508 and the intra prediction unit 507 are connected via a FIFO unit 517 for storing a predicted image. The reconstruction unit 508 and the in-loop filtering unit 510 are connected via a FIFO unit 518 for storing a reconstructed image. In addition, the in-loop filtering unit 510 and the frame memory 502 are connected via a FIFO unit 519 for storing a decoded image. The FIFO units can each store at least three largest coding units of data.

Figure 6:
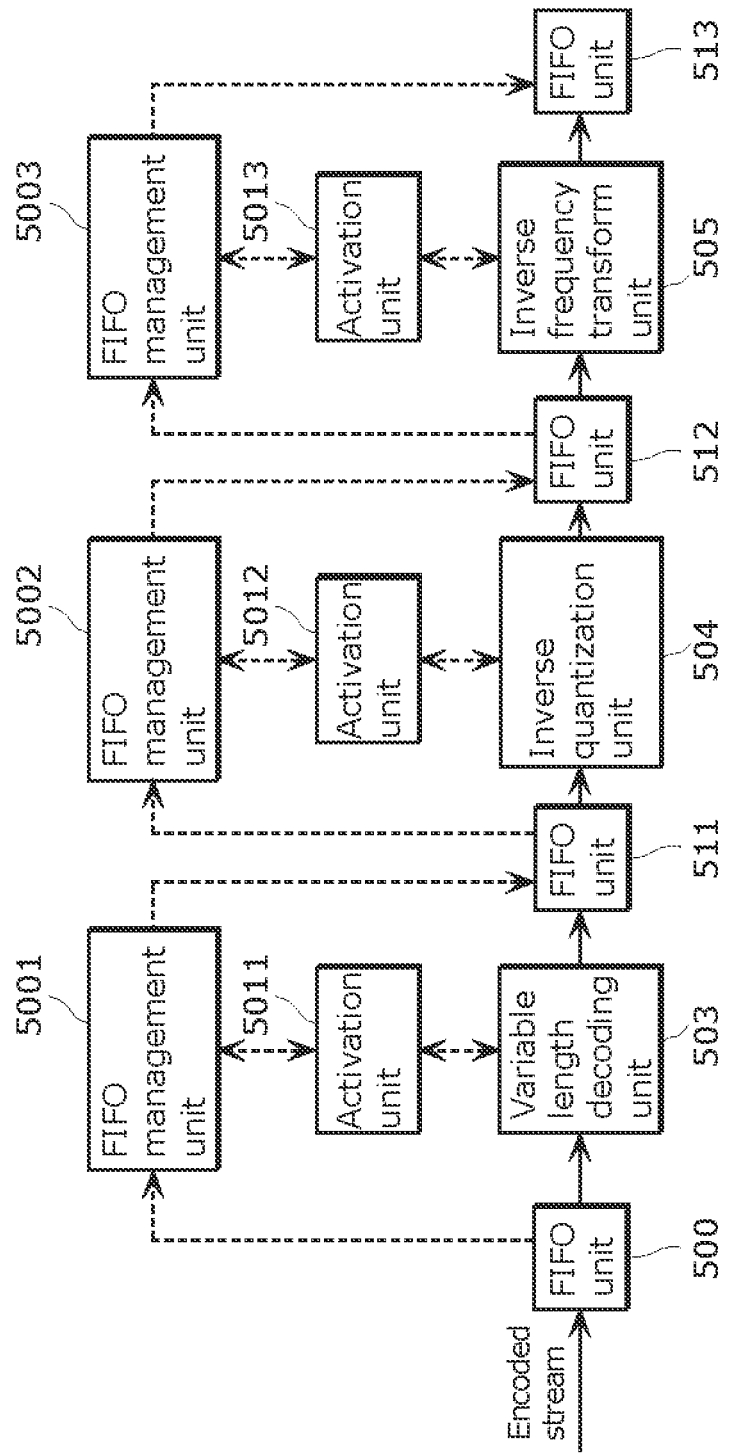
FIG. 6 illustrates detailed configurations of a variable length decoding unit, an inverse quantization unit, and an inverse frequency transform unit of the image decoding device according to Embodiment 1.

FIG. 6 illustrates in detail connection between the variable length decoding unit 503, the inverse quantization unit 504, the inverse frequency transform unit 505, the FIFO unit 500, the FIFO unit 511, the FIFO unit 512, and the FIFO unit 513. A FIFO management unit 5001 and an activation unit 5011 are added to the configuration illustrated in FIG. 5, near the variable length decoding unit 503.

The FIFO management unit 5001 manages data stored in the FIFO unit 500 and an available area in the FIFO unit 511. The activation unit 5011 determines the states of the FIFO unit 500 for input and the FIFO unit 511 for output that are connected to the variable length decoding unit 503, from information managed by the FIFO management unit 5001. Then, the activation unit 5011 activates the variable length decoding unit 503, based on the states of the FIFO units 500 and 511. Specifically, the activation unit 5011 causes the variable length decoding unit 503 to execute a variable length decoding process.

Furthermore, a FIFO management unit 5002 and an activation unit 5012 are added to the configuration illustrated in FIG. 5, near the inverse quantization unit 504. The FIFO management unit 5002 manages data stored in the FIFO unit 511 and an available area in the FIFO unit 512.

The activation unit 5012 determines the states of the FIFO unit 511 for input and the FIFO unit 512 for output that are connected to the inverse quantization unit 504, from information managed by the FIFO management unit 5002. Then, the activation unit 5012 activates the inverse quantization unit 504, based on the states of the FIFO units 511 and 512. Specifically, the activation unit 5012 causes the inverse quantization unit 504 to execute an inverse quantization process.

Furthermore, a FIFO management unit 5003 and an activation unit 5013 are added to the configuration illustrated in FIG. 5, near the inverse frequency transform unit 505. The FIFO management unit 5003 manages data stored in the FIFO unit 512 and an available area in the FIFO unit 513.

The activation unit 5013 determines the states of the FIFO unit 512 for input and the FIFO unit 513 for output that are connected to the inverse frequency transform unit 505, from information managed by the FIFO management unit 5003. Then, the activation unit 5013 activates the inverse frequency transform unit 505, based on the states of the FIFO units 512 and 513. Specifically, the activation unit 5013 causes the inverse frequency transform unit 505 to execute an inverse frequency transform process.

FIFO management units and activation units are provided for the other process units illustrated in FIG. 5, likewise. This allows the process units to perform processes, based on the states of the FIFO units. It should be noted that each process unit may include a FIFO management unit and an activation unit. In the description below, operation of a FIFO management unit and operation of an activation unit may be described as operation of each process unit that includes the FIFO management unit and the activation unit.

It should be noted that the image decoding device may include a reference image transfer process unit which performs a process for transferring a reference image. The reference image transfer process unit transfers a reference image from the frame memory 502 to the FIFO unit 514. The motion compensation unit 506 performs motion compensation using the reference image transferred by the reference image transfer process unit.

The above is a description of the configuration of the image decoding device according to the present embodiment.

1-3. Operation

Next is a description of operation of the image decoding device according to the present embodiment. An encoded stream which is decoded by the image decoding device according to the present embodiment includes a coding unit, a transform unit, and a prediction unit.

The size of a coding unit is set to 128×128 pixels to 8×8 pixels, and a coding unit is a data unit for which intra prediction and inter prediction are switchable. The size of a transform unit is set to 64×64 pixels to 4×4 pixels within a coding unit. The size of a prediction unit is set to 128×128 pixels to 4×4 pixels within a coding unit, and a prediction unit has a mode for intra prediction or a motion vector for inter prediction. In the following, a description is given of a configuration of an encoded stream, using FIGS. 7A to 10B.

Figure 7A:
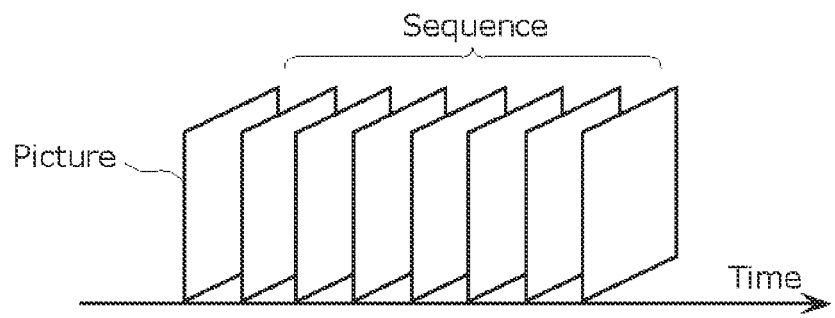
FIG. 7A illustrates a sequence according to Embodiment 1.
Figure 7B:
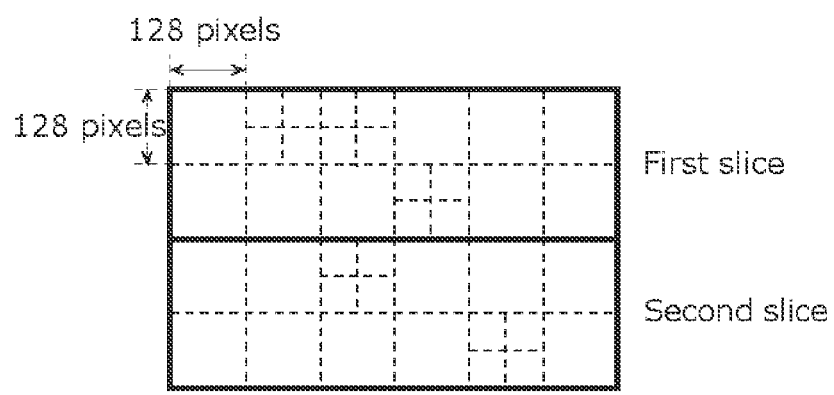
FIG. 7B illustrates a picture according to Embodiment 1.

FIGS. 7A and 7B each illustrate a hierarchical configuration of an encoded stream to be decoded by the image decoding device according to the present embodiment. As illustrated in FIG. 7A, a grouping of plural pictures is referred to as a sequence. In addition, as illustrated in FIG. 7B, each picture is divided into slices and, furthermore, each slice is divided into coding units. A picture may not be divided into slices.

In the present embodiment, the size of the largest coding unit is 128×128 pixels. In addition, a 128×128-pixel coding unit and a 64×64-pixel coding unit are both included.

Figure 7C:
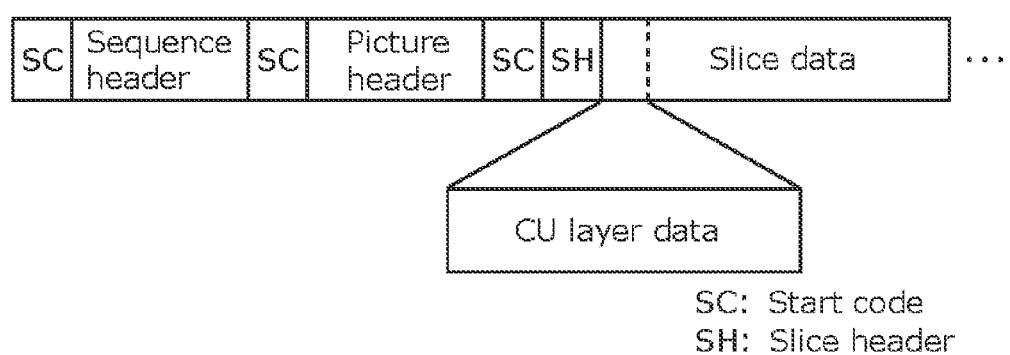
FIG. 7C illustrates an encoded stream according to Embodiment 1.

FIG. 7C illustrates an encoded stream according to the present embodiment. The encoded stream illustrated in FIG. 7C is obtained by hierarchically encoding the data illustrated in FIGS. 7A and 7B.

The encoded stream illustrated in FIG. 7C includes a sequence header for controlling a sequence, a picture header for controlling a picture, a slice header for controlling a slice, and coding unit layer data (CU layer data). With the H. 264 standard, a sequence header is referred to as "sequence parameter set" (SPS), and a picture header is referred to as "picture parameter set" (PPS).

Figure 8A:
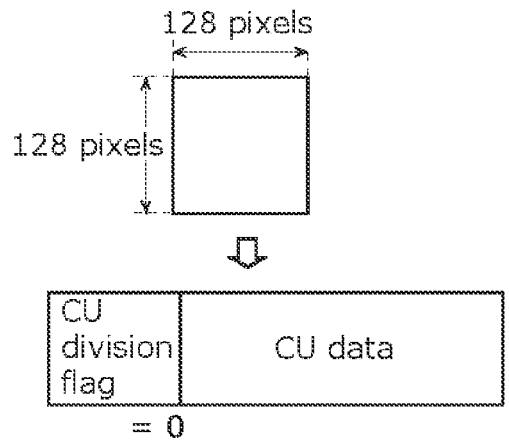
FIG. 8A illustrates an example of a first configuration of a coding unit according to Embodiment 1.
Figure 8B:
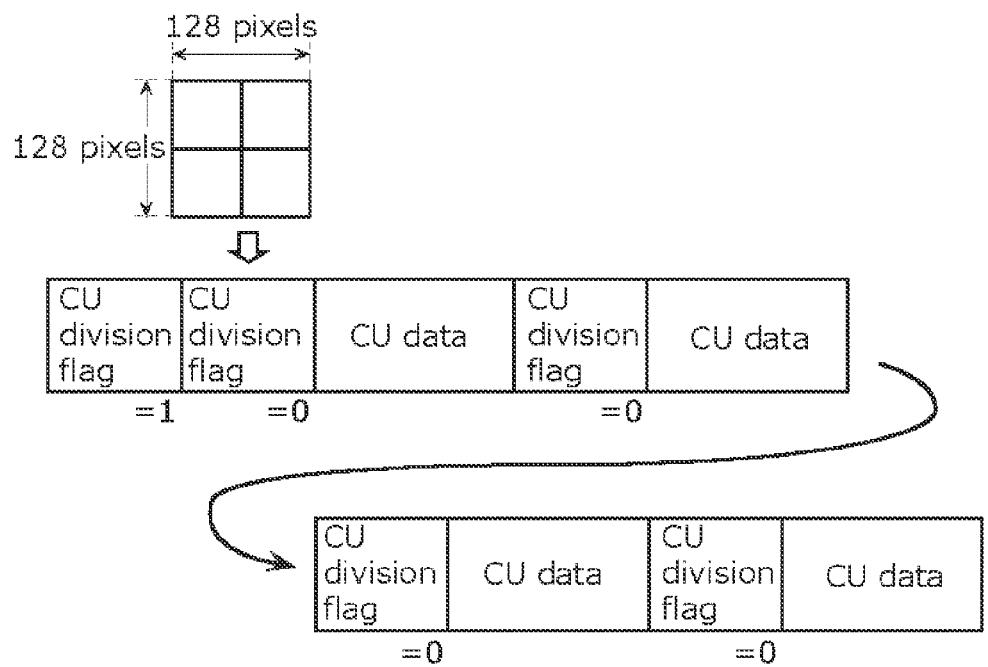
FIG. 8B illustrates an example of a second configuration of a coding unit according to Embodiment 1.

Next, a description is given of configurations of a coding unit and an encoded stream which are used for describing the present embodiment, using FIGS. 8A and 8B. An encoded stream includes a CU division flag and CU data. This CU division flag indicates that a block is divided into four when the flag is "1", whereas the CU division flag indicates that a block is not divided into four when the flag is "0". In the case of a 128×128-pixel coding unit, a block is not divided as shown in FIG. 8A. Thus, a CU division flag is "0".

As illustrated in FIG. 8B, in the case of four 64×64-pixel coding units, the first CU division flag is "1". This first CU division flag indicates that a 128×128-pixel block is divided into at least four 64×64-pixel blocks. All the four 64×64-pixel blocks are not divided, and thus, the following CU division flag is "0". In this manner, the size of a coding unit is identified as one of the sizes from 128×128 pixels to 4×4 pixels, by a CU division flag.

Figure 9A:
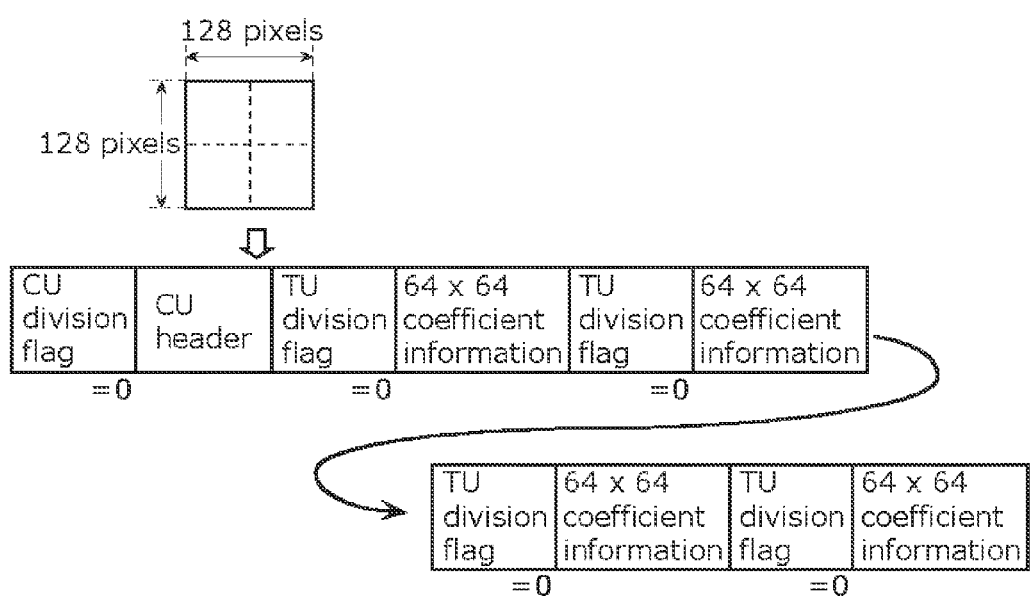
FIG. 9A illustrates an example of a first configuration of a transform unit according to Embodiment 1.
Figure 9B:
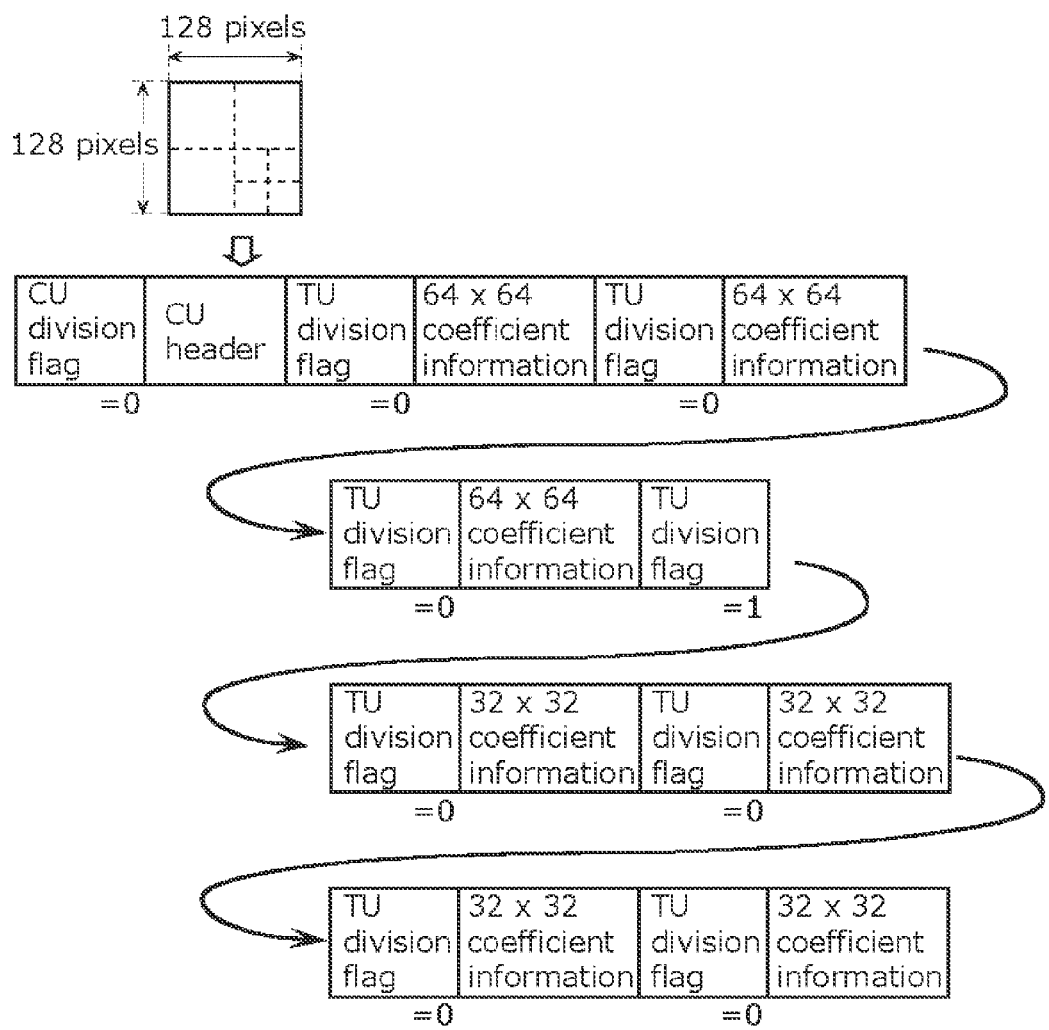
FIG. 9B illustrates an example of a second configuration of a transform unit according to Embodiment 1.

FIGS. 9A and 9B each illustrate an example of a configuration of transform units according to the present embodiment. Furthermore, CU data of each coding unit includes a CU header, a TU division flag, and coefficient information. CU header will be described below. A TU division flag indicates the size of a transform unit in a coding unit, and indicates whether the size thereof is to be divided into four hierarchically, as with a CU division flag.

FIG. 9A illustrates an example in the case where a 128×128-pixel coding unit includes four 64×64-pixel transform units. In the case of a 128×128-pixel coding unit, the maximum size of a transform unit is 64×64 pixels, and thus is always divided into four. In the case of FIG. 9A, all the 64×64-pixel blocks are not divided. Accordingly, all the TU division flags are "0".

FIG. 9B illustrates an example in which a 128×128-pixel coding unit includes three 64×64-pixel transform units and four 32×32-pixel transform units. In this case, a TU division flag having a value of "1" is present.

The transform units in FIGS. 9A and 9B each include luma data (luma information) and chroma data (chroma information). Specifically, coefficient information which includes both luma data and chroma data is collectively included for each transform unit in an encoded stream.

Figure 10A:
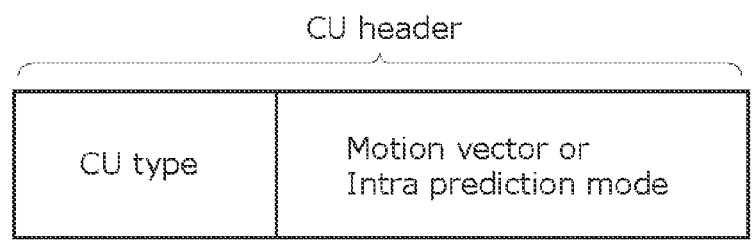
FIG. 10A illustrates a header of a coding unit according to Embodiment 1.
Figure 10B:
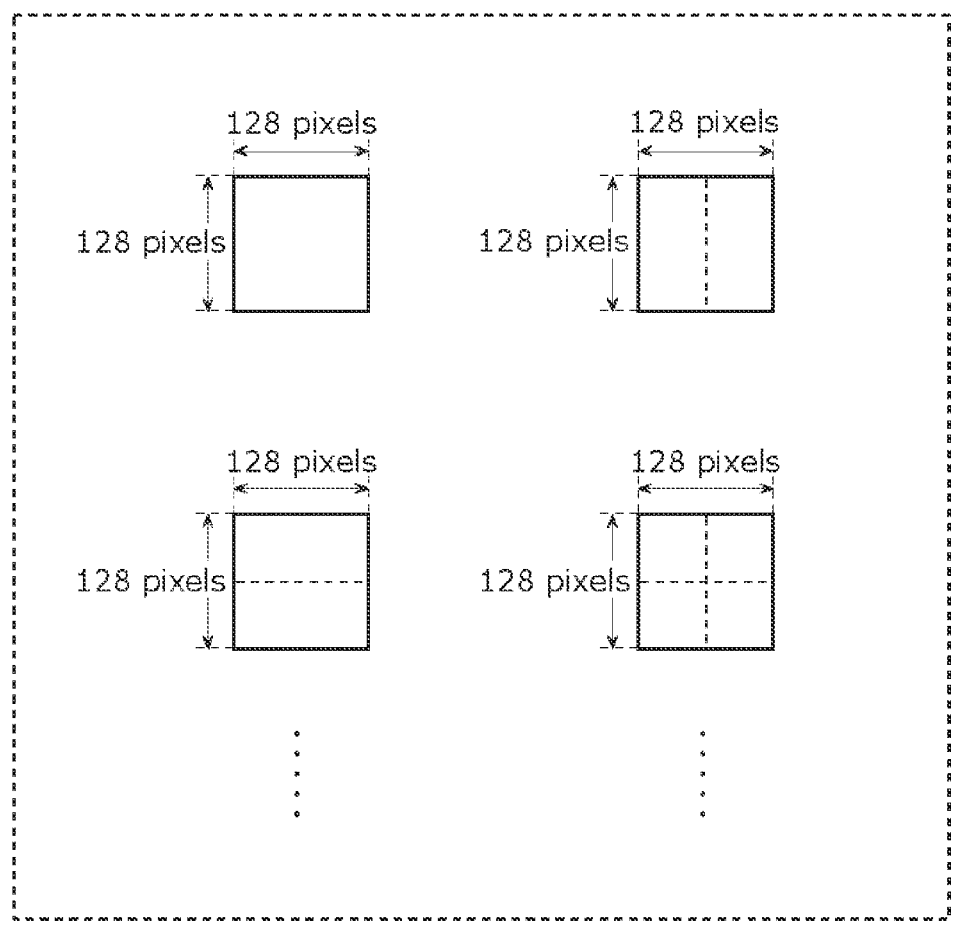
FIG. 10B illustrates prediction units according to Embodiment 1.

Next is a description of a CU header. As illustrated in FIG. 10A, a CU header includes a CU type and, further includes a motion vector or an intra prediction mode. The size of a prediction unit is determined according to the CU type. FIG. 10B illustrates prediction units which include 128×128 pixels, 64×128 pixels, 128×64 pixels, and 64×64 pixels. The size of a prediction unit can be selected from the size of 4×4 pixels or more. In addition, the shape of a prediction unit may be rectangular. A motion vector or an intra prediction mode is designated for each prediction unit.

Figures 11A, 11B:
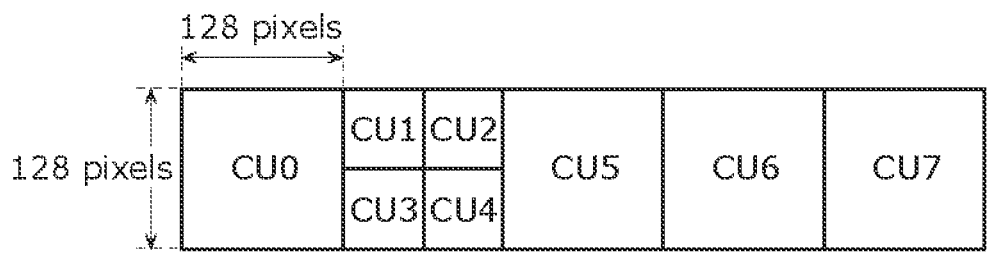
FIG. 11A illustrates an example of a configuration of plural coding units used for describing operation according to Embodiment 1.
FIG. 11B illustrates details of plural coding units used for describing the operation according to Embodiment 1.

Next is a specific description of operation of the image decoding device according to the present embodiment. FIGS. 11A and 11B illustrate examples of configurations of plural coding units used for describing operation. Eight coding units (CU0 to CU7) illustrated in FIG. 11A are used for describing operation of the image decoding device according to the present embodiment.

As illustrated in FIG. 11B, CU0 and CU5 to CU7 are coding units each including 128×128 pixels. CU1 to CU4 are coding units each including 64×64 pixels. The size of a transform unit of CU4 is 32×32 pixels. The size of all the other transform units is 64×64 pixels. The size of a prediction unit of CU0 is 128×128 pixels, the size of prediction units of CU1 to CU4 is 64×64 pixels, and the size of prediction units of CU5 to CU7 is 128×128 pixels.

Figure 12:
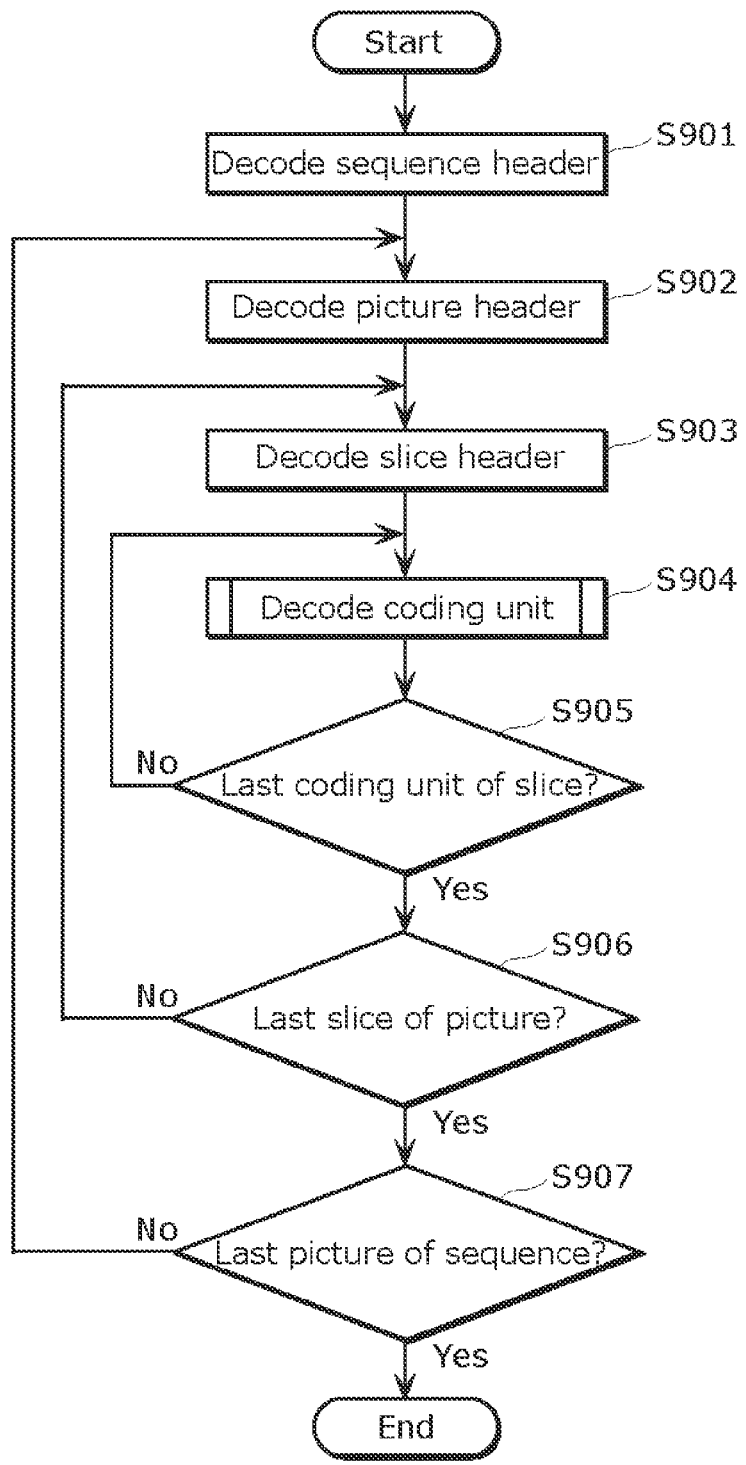
FIG. 12 is a flowchart illustrating operation of the image decoding device according to Embodiment 1.

Next, a description is given of operation of the image decoding device illustrated in FIG. 4, using the flowchart illustrated in FIG. 12. FIG. 12 is a flowchart illustrating decoding operations on one sequence included in an encoded stream. As illustrated in FIG. 12, the image decoding device decodes a sequence header, first (S901). At that time, the variable length decoding unit 503 decodes the coded stream under the control of the control unit 501. Next, the image decoding device decodes a picture header (S902), and decodes a slice header (S903), similarly.

Next, the image decoding device decodes a coding unit (S904). A detailed description is given below of decoding a coding unit. The image decoding device determines, after decoding a coding unit, whether the decoded coding unit is the last coding unit of a slice (S905). Then, if the decoded coding unit is not the last coding unit of the slice, the image decoding device decodes another coding unit which is the next coding unit (S904).

Furthermore, the image decoding device determines whether the slice including the decoded coding unit is the last slice of a picture (S906). Then, if the slice is not the last slice of the picture, the image decoding device decodes another slice header (S903).

Furthermore, the image decoding device determines whether a picture including the decoded coding unit is the last picture of a sequence (S907). Then, if the picture is not the last picture of the sequence, the image decoding device decodes another picture header, (S902). The image decoding device ends a series of decoding operations after decoding all the pictures of the sequence.

Figure 13:
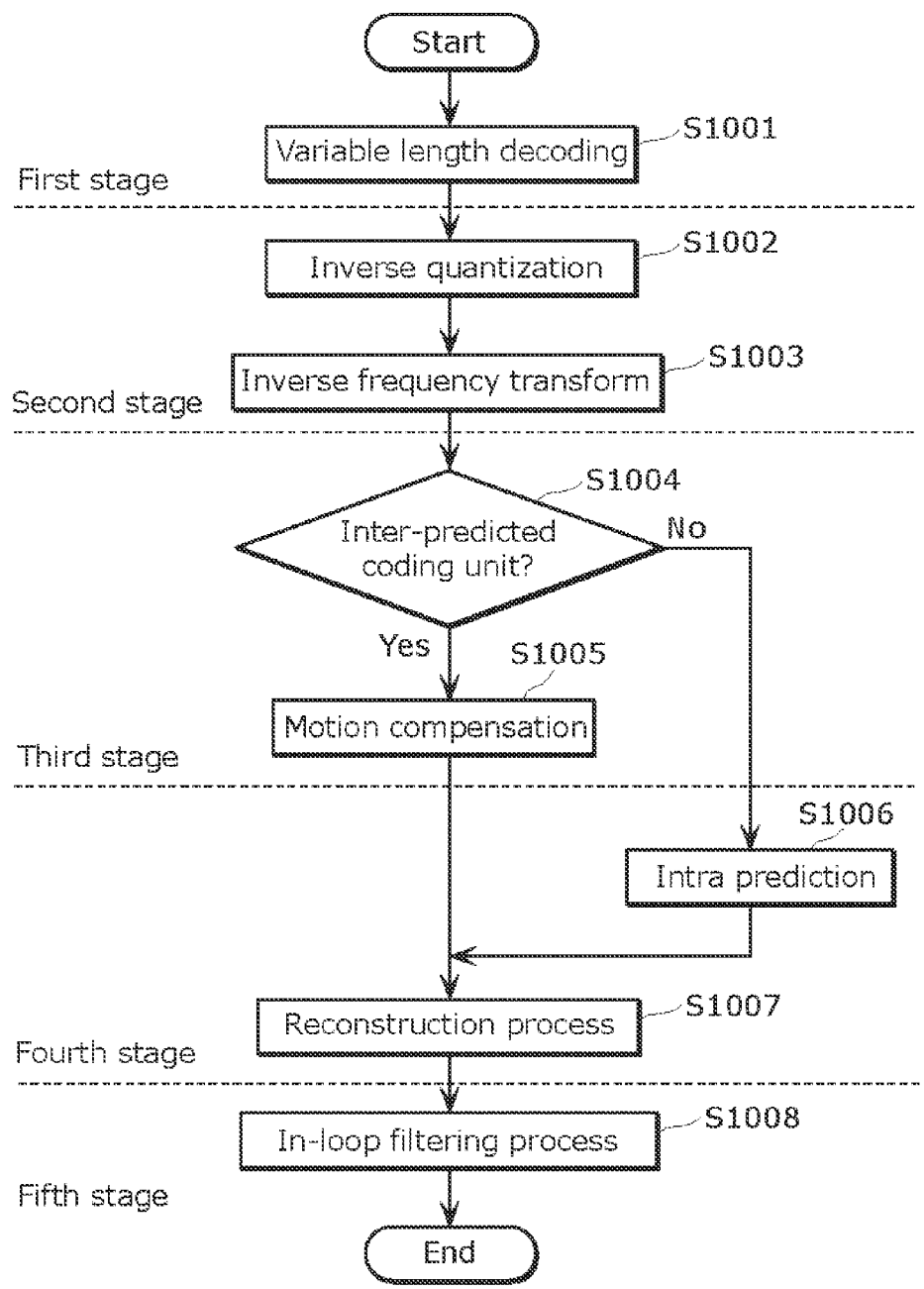
FIG. 13 is a flowchart illustrating processing of decoding a coding unit by the image decoding device according to Embodiment 1.

Next, a description is given of operation of decoding a coding unit (S904) illustrated in FIG. 12, using the flowchart illustrated in FIG. 13. FIG. 13 is a flowchart illustrating decoding operations on one coding unit.

First, the variable length decoding unit 503 performs variable length decoding on a current coding unit to be processed, which is included in an input encoded stream (S1001). In a variable length decoding process (S1001), the variable length decoding unit 503 outputs encoding information such as a coding unit type, an intra prediction mode, motion vector information, and a quantization parameter, and outputs coefficient information corresponding to each pixel data. Encoding information is output to the control unit 501, and thereafter is input to each process unit. The coefficient information is output to the next inverse quantization unit 504. Next, the inverse quantization unit 504 performs an inverse quantization process (S1002). After that, the inverse frequency transform unit 505 performs inverse frequency transform, and generates a difference image (S1003).

Next, the control unit 501 determines which of inter prediction and intra prediction is used for the current coding unit to be processed (S1004). If inter prediction is used, the control unit 501 activates the motion compensation unit 506, and the motion compensation unit 506 generates a predicted image having, for instance, ½ pixel accuracy or ¼ pixel accuracy (S1005). If inter prediction is not used, or in other words, intra prediction is used, the control unit 501 activates the intra prediction unit 507, and the intra prediction unit 507 performs an intra prediction process, and generates a predicted image (S1006).

The reconstruction unit 508 generates a reconstructed image by adding the predicted image output by the motion compensation unit 506 or the intra prediction unit 507, and the difference image output by the inverse frequency transform unit 505 (S1007).

The generated reconstructed image is input to the in-loop filtering unit 510. Simultaneously, a portion to be used for intra prediction is stored in the reconstructed image memory 509. Finally, the in-loop filtering unit 510 performs an in-loop filtering process on the obtained reconstructed image for reducing noise. Then, the in-loop filtering unit 510 stores the result into the frame memory 502 (S1008). The above completes decoding operations on a coding unit.

Here, plural processes illustrated in FIG. 13 are divided into plural stages at the dotted lines. At these plural stages from the first stage to the fifth stage, the image decoding device performs plural processes simultaneously on plural largest coding units different for the stages. Consequently, parallel processing is executed, and performance improves.

Such processing is referred to as pipeline processing.

In the example in FIG. 13, the first stage includes a variable length decoding process (S1001). The second stage includes an inverse quantization process (S1002) and an inverse frequency transform process (S1003). The third stage includes a motion compensation process (S1005). The fourth stage includes an intra prediction process (S1006) and a reconstruction process (S1007). The fifth stage includes an in-loop filtering process (S1008).

The plural processes divided at these plural stages are executed in parallel by pipelining, on plural coding units different for the stages. At this time, if the FIFO units connected to the process units have sufficient capacity, the image decoding device does not need to synchronously execute the processes at all the stages. Thus, the image decoding device can asynchronously execute a process at a stage and a process at another stage.

Figure 14A:
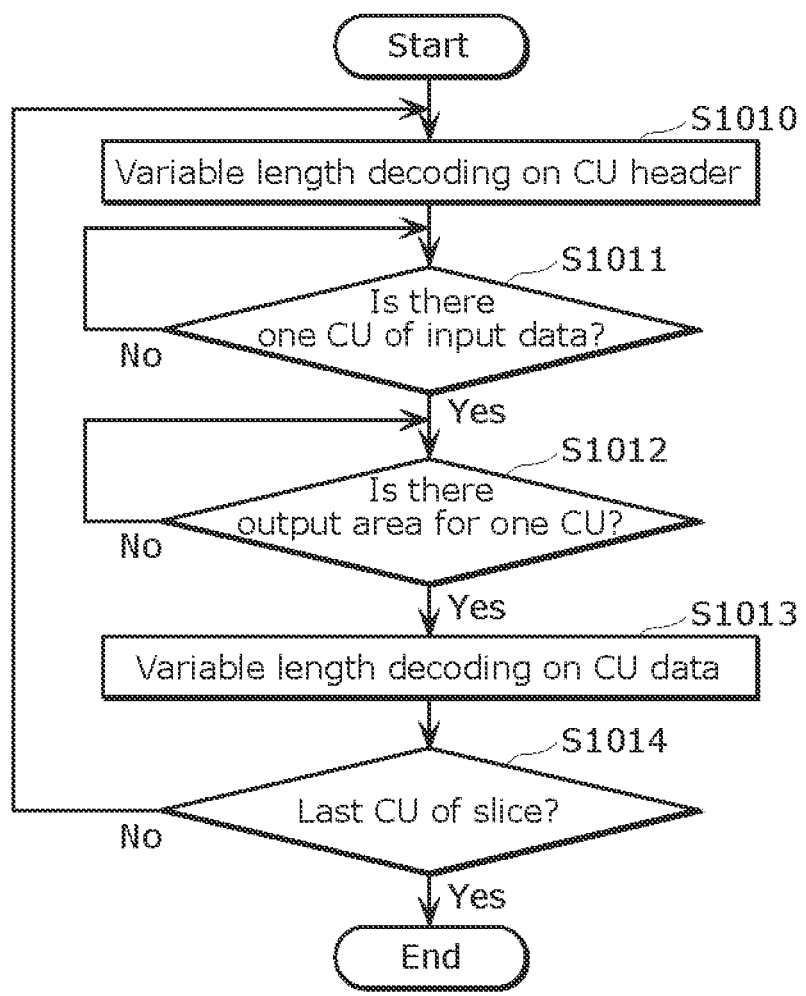
FIG. 14A is a flowchart illustrating operation of the variable length decoding unit according to Embodiment 1.

FIG. 14A is a flowchart illustrating operation of the variable length decoding unit 503 illustrated in FIG. 5. First, the variable length decoding unit 503 performs a variable length decoding process on the header of CU0, after the header of CU0 is input into the FIFO unit 500 (S1010).

Next, the variable length decoding unit 503 determines whether input data necessary for a variable length decoding process on data of CU0 has been input to the FIFO unit 500 (S1011). Further, the variable length decoding unit 503 determines whether the FIFO unit 511 to which a coefficient obtained by the variable length decoding process on the data of CU0 is to be output has an available area for the coefficient (S1012). Then, the variable length decoding unit 503 performs a variable length decoding process on the data of CU0 after determining that the FIFO unit has an available area (S1013).

Similarly, the variable length decoding unit 503 performs a variable length decoding process on the header of CU1, after the header of CU1 is input to the FIFO unit 500 (S1010).

Next, the variable length decoding unit 503 determines whether input data necessary for a variable length decoding process on the data of CU1 has been input to the FIFO unit 500 (S1011). Further, the variable length decoding unit 503 determines whether the FIFO unit 511 to which a coefficient obtained by the variable length decoding process on the data of CU1 is to be output has an available area for the coefficient (S1012). Then, the variable length decoding unit 503 performs a variable length decoding process on the data of CU1 after determining that the FIFO unit has an available area (S1013).

The variable length decoding unit 503 performs processing also on subsequent coding units in the same manner. Then, the variable length decoding unit 503 ends a variable length decoding process on a slice when a variable length decoding process on the last coding unit of the slice ends (S1014).

Figure 14B:
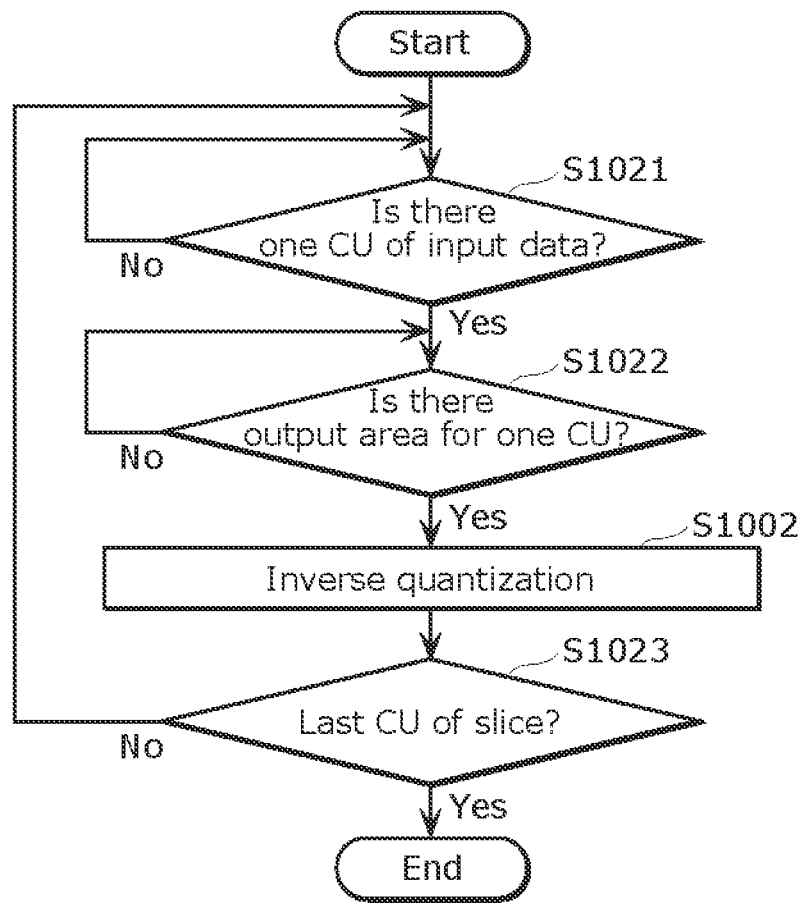
FIG. 14B is a flowchart illustrating operation of the inverse quantization unit according to Embodiment 1.

FIG. 14B is a flowchart illustrating operation of the inverse quantization unit 504 illustrated in FIG. 5. First, the inverse quantization unit 504 determines whether input data necessary for an inverse quantization process on CU0 has been input to the FIFO unit 511 (S1021). Further, the inverse quantization unit 504 determines whether the FIFO unit 512 to which the result obtained by an inverse quantization process on CU0 is to be output has an available area for the result (S1022). Then, the inverse quantization unit 504 performs the inverse quantization process on CU0 after determining that the FIFO unit has an available area (S1002).

Similarly, the inverse quantization unit 504 determines whether input data necessary for an inverse quantization process on CU1 has been input to the FIFO unit 511 (S1021).

Further, the inverse quantization unit 504 determines whether the FIFO unit 512 to which the result obtained by an inverse quantization process on CU1 is to be output has an available area for the result (S1022). Then, the inverse quantization unit 504 performs an inverse quantization process on CU1 after determining that the data has been input and the FIFO unit has an available area (S1002).

The inverse quantization unit 504 performs processing also on subsequent coding units in the same manner. Then, the inverse quantization unit 504 ends an inverse quantization process on a slice when an inverse quantization process on the last coding unit of the slice ends (S1023).

Figure 14C:
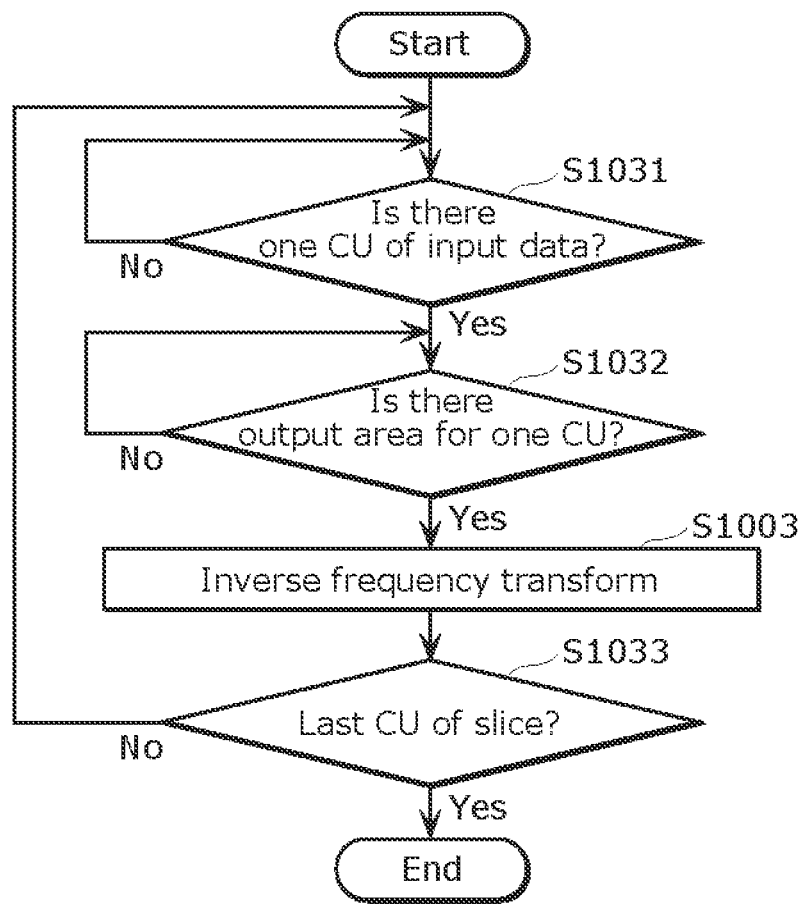
FIG. 14C is a flowchart illustrating operation of the inverse frequency transform unit according to Embodiment 1.

FIG. 14C is a flowchart illustrating operation of the inverse frequency transform unit 505 illustrated in FIG. 5. First, the inverse frequency transform unit 505 determines whether input data necessary for an inverse frequency transform process on CU0 has been input to the FIFO unit 512 (S1031). Further, the inverse frequency transform unit 505 determines whether the FIFO unit 513 to which the result obtained by an inverse frequency transform process on CU0 is to be output has an available area for the result (S1032). Then, the inverse frequency transform unit 505 performs an inverse frequency transform process on CU0 after determining that the FIFO unit has an available area (S1003).

Similarly, the inverse frequency transform unit 505 determines whether input data necessary for an inverse frequency transform process on CU1 has been input to the FIFO unit 512 (S1031). Further, the inverse frequency transform unit 505 determines whether the FIFO unit 513 to which the result obtained by an inverse frequency transform process on CU1 is to be output has an available area for the result (S1032). Then, the inverse frequency transform unit 505 performs an inverse frequency transform process on CU1 after determining that the FIFO unit has an available area (S1003).

The inverse frequency transform unit 505 performs processing also on subsequent coding units in the same manner. Then, the inverse frequency transform unit 505 ends an inverse frequency transform process on a slice when an inverse frequency transform process on the last coding unit of the slice ends (S1033).

Figure 14D:
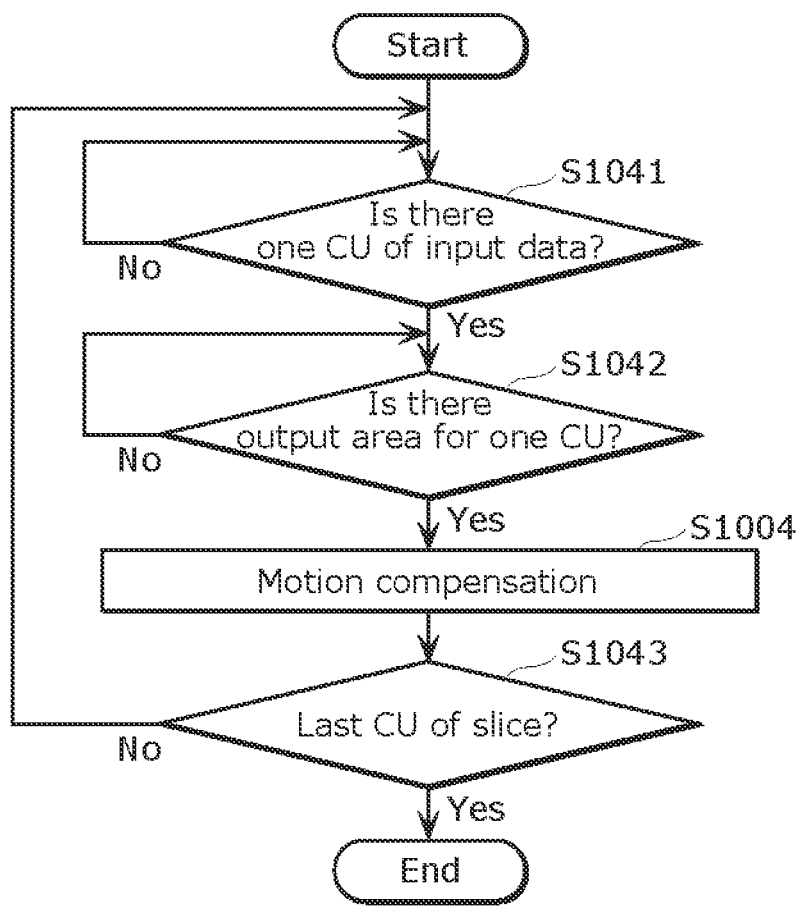
FIG. 14D is a flowchart illustrating operation of a motion compensation unit according to Embodiment 1.

FIG. 14D is a flowchart illustrating operation of the motion compensation unit 506 illustrated in FIG. 5. Here, it is assumed that prediction modes for CU0 to CU7 are inter prediction as shown in the example in FIG. 11B.

First, the motion compensation unit 506 determines whether input data necessary for a motion compensation process on CU0 has been input to the FIFO units 511 and 514 (S1041). Further, the motion compensation unit 506 determines whether the FIFO unit 515 to which the result obtained by a motion compensation process on CU0 is to be output has an available area for the result (S1042). Then, the motion compensation unit 506 performs a motion compensation process on CUD after determining that the FIFO unit has an available area (S1004).

Similarly, the motion compensation unit 506 determines whether input data necessary for a motion compensation process on CU1 has been input to the FIFO units 511 and 514 (S1041). Further, the motion compensation unit 506 determines whether the FIFO unit 515 to which the result obtained by a motion compensation process on CU1 is to be output has an available area for the result (S1042). Then, the motion compensation unit 506 performs a motion compensation process on CU0 after determining that the FIFO unit has an available area (S1004).

The motion compensation unit 506 performs processing also on subsequent coding units in the same manner. Then, the motion compensation unit 506 ends a motion compensation process on a slice when a motion compensation process on the last coding unit of the slice ends (S1043).

Figure 14E:
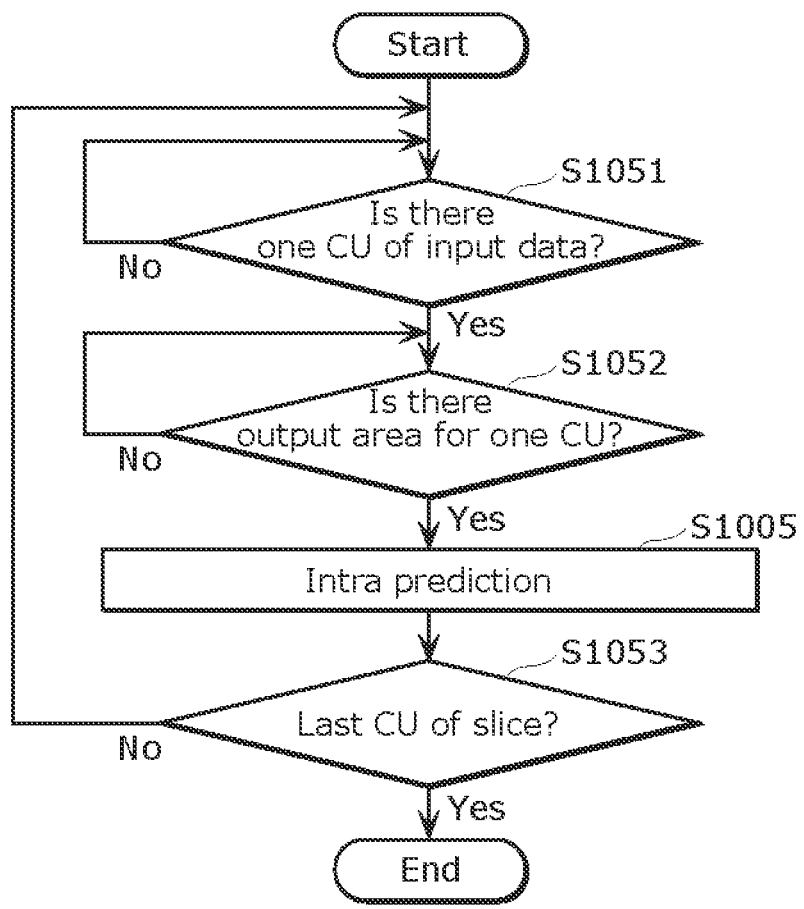
FIG. 14E is a flowchart illustrating operation of an intra prediction unit according to Embodiment 1.

FIG. 14E is a flowchart illustrating operation of the intra prediction unit 507 illustrated in FIG. 5. Here, it is assumed that the prediction mode for CU0 to CU7 is intra prediction, which differs from the example in FIG. 11B.

First, the intra prediction unit 507 determines whether input data necessary for an intra prediction process on CU0 has been input to the FIFO unit 511 and the reconstructed image memory 509 (S1051). Further, the intra prediction unit 507 determines whether the FIFO unit 517 to which a predicted image obtained by an intra prediction process on CU0 is to be output has an available area for the image (S1052). Then, the intra prediction unit 507 performs an intra prediction process on CU0 after determining that the FIFO unit has an available area (S1005).

Similarly, the intra prediction unit 507 determines whether input data necessary for an intra prediction process on CU1 has been input to the FIFO unit 511 and the reconstructed image memory 509 (S1051). Further, the intra prediction unit 507 determines whether the FIFO unit 517 to which a predicted image obtained by an intra prediction process on CU1 is to be output has an available area for the image (S1052). Then, the intra prediction unit 507 performs an intra prediction process on CU1 after determining that the FIFO unit has an available area (S1005).

The intra prediction unit 507 performs processing also on the subsequent coding units in the same manner. Then, the intra prediction unit 507 ends an intra prediction process on a slice when an intra prediction process on the last coding unit of the slice ends (S1053).

Figure 14F:
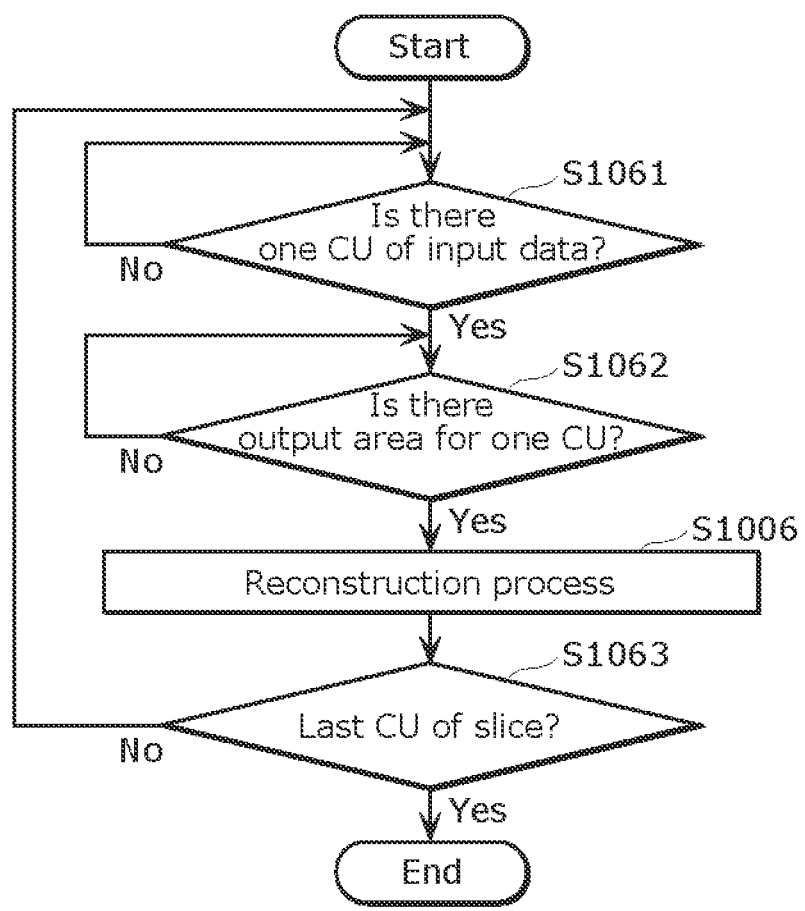
FIG. 14F is a flowchart illustrating operation of a reconstruction unit according to Embodiment 1.

FIG. 14F is a flowchart illustrating operation of the reconstruction unit 508 illustrated in FIG. 5. First, the reconstruction unit 508 determines whether input data necessary for a reconstruction process on CU0 has been input to the FIFO units 513, 515, and 517 (S1061). Further, the reconstruction unit 508 determines whether the FIFO unit 518 to which a reconstructed image obtained by a reconstruction process on CU0 is to be output has an available area for the image (S1062). Then, the reconstruction unit 508 performs a reconstruction process on CU0 after determining that the FIFO unit has an available area (S1006).

Similarly, the reconstruction unit 508 determines whether input data necessary for a reconstruction process on CU1 has been input to the FIFO units 513, 515, and 517 (S1061). Further, the reconstruction unit 508 determines whether the FIFO unit 518 to which a reconstructed image obtained by a reconstruction process on CU1 is to be output has an available area for the image (S1062). Then, the reconstruction unit 508 performs a reconstruction process on CU1 after determining that the FIFO unit has an available area (S1006).

The reconstruction unit 508 performs processing also on the subsequent coding units in the same manner. Then, the reconstruction unit 508 ends a reconstruction process on a slice when a reconstruction process on the last coding unit of the slice ends (S1063).

Figure 14G:
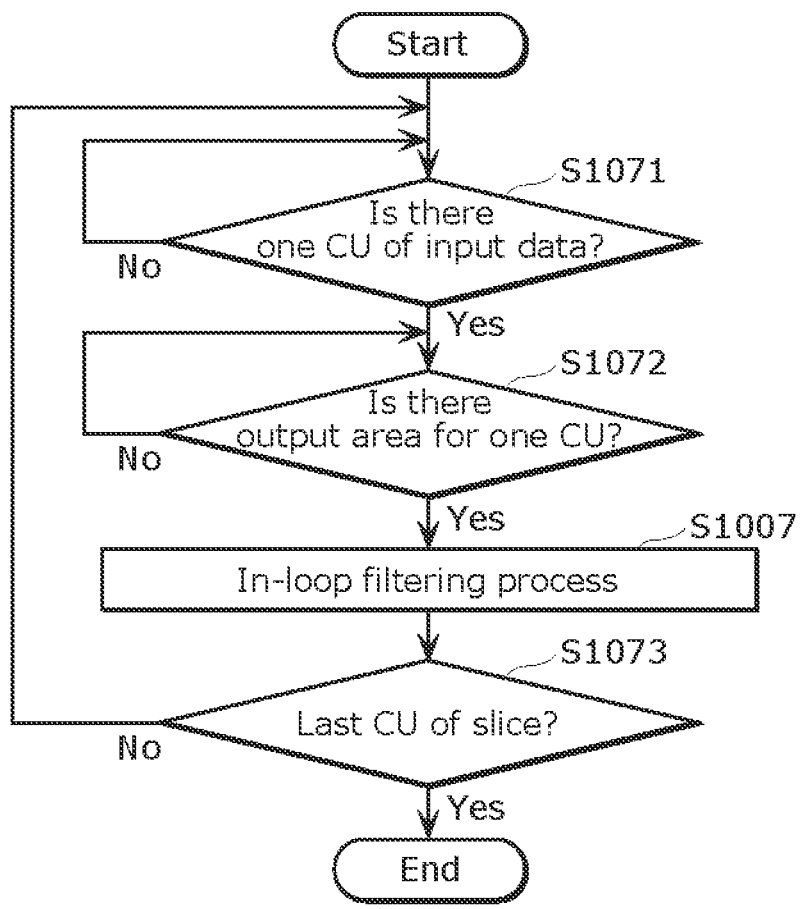
FIG. 14G is a flowchart illustrating operation of an in-loop filtering unit according to Embodiment 1.

FIG. 14G is a flowchart illustrating operation of the in-loop filtering unit 510 illustrated in FIG. 5.

First, the in-loop filtering unit 510 determines whether input data necessary for an in-loop filtering process on CU0 has been input to the FIFO unit 518 (S1071). Further, the in-loop filtering unit 510 determines whether the FIFO unit 519 to which a decoded image obtained by an in-loop filtering process on CU0 is to be output has an available area for the image (S1072). Then, the in-loop filtering unit 510 performs an in-loop filtering process on CU0 after determining that the FIFO unit has an available area (S1007).

Similarly, the in-loop filtering unit 510 determines whether input data necessary for an in-loop filtering process on CU1 has been input to the FIFO unit 518 (S1071). Further, the in-loop filtering unit 510 determines whether the FIFO unit 519 to which a decoded image obtained by an in-loop filtering process on CU1 is to be output has an available area for the image (S1072). Then, the in-loop filtering unit 510 performs an in-loop filtering process on CU1 after determining that the FIFO unit has an available area (S1007).

The in-loop filtering unit 510 performs processing also on the subsequent coding units in the same manner. Then, the in-loop filtering unit 510 ends an in-loop filtering process on a slice when an in-loop filtering process on the last coding unit of the slice ends (S1073).

At the first stage in FIG. 13, the variable length decoding unit 503 performs a variable length decoding process described above. At the second stage, the inverse quantization unit 504 performs an inverse quantization process described above, and the inverse frequency transform unit 505 performs an inverse frequency transform process described above. At the third stage, the motion compensation unit 506 performs a motion compensation process described above. At the fourth stage, the intra prediction unit 507 performs an intra prediction process described above, and the reconstruction unit 508 performs a reconstruction process described above. At the fifth stage, the in-loop filtering unit 510 performs an in-loop filtering process described above.

The image decoding device performs a series of plural processes, using the output result from a previous stage as input data for the next stage. The image decoding device executes plural processes in parallel on plural different coding units at plural stages as described above. Then, the image decoding device executes plural processes asynchronously from one another at times when necessary preparation is made.

FIG. 15 is a time chart illustrating time series operation of the image decoding device according to the present embodiment. FIG. 15 illustrates the case where plural processes are divided at plural stages as shown in FIG. 13, and plural coding units are formed as shown in FIG. 11A. As shown in FIG. 15, at each of the plural stages, a coding unit to be processed is changed at a time when necessary preparation is made, independently of other stages. Consequently, the occurrence of idle waiting time as shown in FIG. 3 is prevented.

Figure 16:
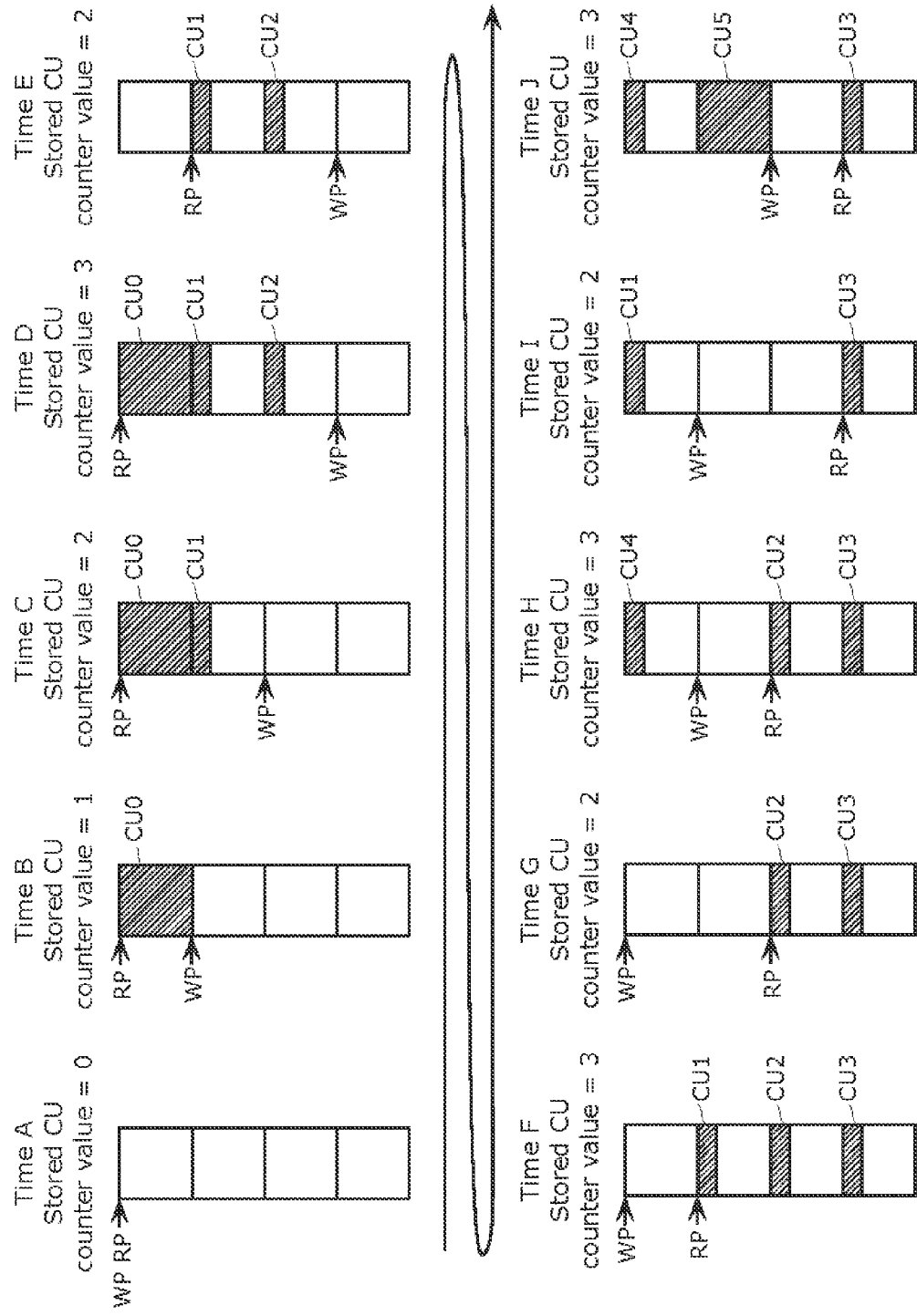
FIG. 16 illustrates examples of time-series states of a FIFO unit according to Embodiment 1.

FIG. 16 illustrates time series states of the FIFO unit 513 according to the present embodiment. The FIFO unit 513 is a constituent element for storing a residual image obtained by inverse frequency transform process. In the example in FIG. 16, the FIFO unit 513 has capacity for storing four largest coding units of data. FIG. 16 illustrates the states of data stored in the FIFO unit 513 at times A to J.

Time A corresponds to a time prior to the completion of an inverse frequency transform process on CU0 in FIG. 15. Time B corresponds to a time at which an inverse frequency transform process on CU0 is completed in FIG. 15. Time C corresponds to a time at which an inverse frequency transform process on CU1 is completed in FIG. 15. Time D corresponds to a time at which an inverse frequency transform process on CU2 is completed in FIG. 15. Time E corresponds to a time at which a reconstruction process on CU0 is completed prior to the completion of an inverse frequency transform process on CU3 in FIG. 15.

Time F corresponds to a time at which an inverse frequency transform process on CU3 is completed in FIG. 15. Time G corresponds to a time at which a reconstruction process on CU1 is completed prior to the completion of an inverse frequency transform process on CU4 in FIG. 15. Time H corresponds to a time at which an inverse frequency transform process on CU4 is completed in FIG. 15. Time I corresponds to a time at which a reconstruction process on CU2 is completed prior to the completion of an inverse frequency transform process on CU5 in FIG. 15. Time 3 corresponds to a time at which an inverse frequency transform process on CU5 is completed in FIG. 15.

WP represents a write pointer, and indicates the position at which input data is written. RP represents a read pointer, and indicates the position at which output data is read.

A stored CU counter value indicates the number of coding units stored in the FIFO unit 513. For example, when the reconstruction unit 508 is to perform a reconstruction process, the reconstruction unit 508 determines whether there is one coding unit of input data, based on whether the stored CU counter value is one or more (S1061 in FIG. 14F). Furthermore, when the inverse frequency transform unit 505 is to perform an inverse frequency transform process, the inverse frequency transform unit 505 determines whether there is an output area for one coding unit, based on whether the stored CU counter value is three or less (S1032 in FIG. 14C).

A process unit which stores data into a specific FIFO unit increases the stored CU counter value of that FIFO unit. In addition, a process unit which extracts data from that FIFO unit decreases the stored CU counter value of that FIFO unit. For example, the inverse frequency transform unit 505 increases the stored CU counter value of the FIFO unit 513 after storing data. Then, the reconstruction unit 508 decreases the stored CU counter value of the FIFO unit 513 after extracting data.

In the example in FIG. 16, the stored CU counter value of the FIFO unit 513 is 1, 2, or 3 at and after Time B. Consequently, idle waiting time does not occur.

FIG. 17 illustrates other examples of time series states of the FIFO unit 513 according to the present embodiment. In the examples in FIG. 17, the FIFO unit 513 has the capacity for storing three largest coding units of data. Other conditions are the same as those for the examples in FIG. 16.

In the case of the examples in FIG. 17, when the inverse frequency transform unit 505 is to perform an inverse frequency transform process, the inverse frequency transform unit 505 determines whether there is an output area for one coding unit, based on whether the stored CU counter value is two or less (S1032 in FIG. 14C). Consequently, if the stored CU counter value is 3, waiting time occurs in an inverse frequency transform process. However, the occurrence of waiting time is reduced compared to the case where the FIFO unit 513 is not provided. In addition, other processes such as a variable length decoding process and an inverse quantization process are performed asynchronously, and thus a delay of the entire processing is reduced.

In the present embodiment, the times at which plural processes included in pipeline processing start and are completed do not synchronize, as described above. Accordingly, idle waiting time is reduced, which allows pipeline processing to be executed efficiently.

The above is a description of operation of the image decoding device according to the present embodiment.

1-4. Advantageous Effects

The image decoding device according to the present embodiment includes as input/output buffers connected to the plural process units, the FIFO units which can store at least three largest coding units of data. An area for one largest coding unit is used for each of a storing process and an extracting process. Further, an area for at least one largest coding unit is used as a buffer for absorbing variance in process time.

This shortens a time to wait for the input of data and a time to wait until an output buffer has an available area in each process, even when plural coding units have various sizes. Consequently, idle time in pipeline processing is reduced, and pipeline processing is performed efficiently. Thus, processing performance improves.

In addition, the greater capacity each FIFO unit has, the shorter a time to wait for the input of data and a time to wait until an output buffer has an available area become in each process. As a result, processing performance further improves. Furthermore, circuit(s) operates efficiently, which reduces necessary power consumption.

1-5. Supplementary Description

It should be noted that a coding unit is used as a data unit used for encoding and decoding in the present embodiment. However, the data unit used for encoding and decoding may be a macroblock. Furthermore, a data unit used for encoding and decoding may be a block called a super macroblock.

Furthermore, in the present embodiment, processes in pipeline processing are described based on the encoding scheme disclosed in NPL 2. However, processes in pipeline processing are not limited to the examples described in the present embodiment.

Furthermore, in the present embodiment, the size of the largest coding unit is 128×128 pixels. However, the size of the largest coding unit may be any size. In addition, in the present embodiment, the size of a coding unit ranges from 128×128 pixels to 8×8 pixels. However, the size of a coding unit may be a size other than these.

The configuration of the pipeline processing described in the present embodiment is an example. Plural processes do not necessarily need to be divided at plural stages as described in the present embodiment. For example, plural processes may be executed at one stage, or one process may be divided at some stages.

Variable length codes are used in the present embodiment. An encoding scheme for variable length codes may be any encoding scheme such as Huffman encoding, run length encoding, or arithmetic encoding.

In addition, part of or the entirety of each process unit may be achieved by a dedicated hardware circuit, or may be achieved by a program on a processor.

Furthermore, the FIFO units 500, 511, 512, 513, 514, 515, 517, 518, and 519, the frame memory 502, and the reconstructed image memory 509 are not limited to memories. These may be memory elements in which data can be stored. For example, these may be configured as flip-flops or registers. Further, part of a memory area of a processor or part of cache memory may be used for these.

In addition, in the present embodiment, the reconstructed image memory 509 is illustrated explicitly. However, a memory in each process unit may be used as the reconstructed image memory 509, and the frame memory 502 may be used as the reconstructed image memory 509.

In addition, decoding processing is described as an example in the present embodiment. However, a similar configuration to that of the present embodiment may be applied to a process other than a decoding process. For example, a similar configuration to that of the present embodiment may be applied to encoding processing opposite the decoding processing. In other words, the image encoding device may include FIFO units which can store data of at least three largest coding units, as input/output buffers connected to the plural process units. Accordingly, pipeline processing is executed efficiently as well as the present embodiment.

In addition, in the present embodiment, a CU division flag is included at the head of a division block. However, the CU division flag does not necessarily need to be included at such a position, and need only be included in an encoded stream. For example, the CU division flag may be included at the head of a largest coding unit.

In the present embodiment, a TU division flag is included at the head of each coefficient information piece. However, the TU division flag does not necessarily need to be included at such a position, and need only be included in an encoded stream. For example, the TU division flag may be included at the head of a coding unit or a largest coding unit.

In the present embodiment, the image decoding device performs plural processes for each coding unit. However, the image decoding device may perform plural processes for each available data set different from a coding unit. Specifically, the image decoding device may perform plural processes for each transform unit, may perform plural processes for each prediction unit, or may perform plural processes for each data set other that the above.

In the present embodiment, all processes are performed for each coding unit. However, an inverse frequency transform process may be performed for each transform unit, and a motion compensation process may be performed for each prediction unit, for example. In other words, data units do not necessarily need to be the same in all processes.

Furthermore, in the present embodiment, the image decoding device includes FIFO units which can store at least three largest coding units of data, as input/output buffers connected to plural process units. However, the image decoding device may include the FIFO units which can each store at least three available largest data sets of data.

For example, the image decoding device may include FIFO units which can each store at least three largest transform units of data. Furthermore, the image decoding device may include FIFO units which can each store at least three largest prediction units of data. Furthermore, the image decoding device may include FIFO units which can each store at least three largest data sets of data other than the above.

Embodiment 2

2-1. Outline

First is a description of the outline of an image decoding device according to the present embodiment. An image decoding device according to the present embodiment decodes an encoded stream which is an encoded image. The size of a coding unit included in an encoded stream can be changed. In addition, the image decoding device divides plural processes included in decoding processing at plural stages, and performs the plural processes in parallel by pipelining.

At that time, the image decoding device performs plural processes in parallel by pipelining, using sizes of coding units defined in the encoded stream. Input/output buffers are connected to plural process units included in the image decoding device. The input/output buffers include FIFO units which can each store data corresponding to at least two largest coding units. The data in the FIFO units is managed based on the size of a coding unit.

This shortens a time to wait for the input of data and a time to wait until an output buffer has an available area in each process even if plural coding units have various sizes. Consequently, idle time in pipeline processing is reduced, and pipeline processing is performed efficiently. Thus, processing performance improves.

In addition, the greater capacity each FIFO unit has, the shorter a time to wait for the input of data and a time to wait until an output buffer has an available area become in each process. Also if the coding unit to be processed is smaller than the largest coding unit assumed, a time to wait for the input of data and a time to wait until an output buffer has an available area shorten in each process. Compared with Embodiment 1, the capacity necessary for memories between plural process units is reduced.

The above is a description of the outline of the image decoding device according to the present embodiment.

2-2. Configuration

FIG. 4 illustrates a configuration of the image decoding device according to the present embodiment. The overall configuration of the image decoding device according to the present embodiment is the same as that of Embodiment 1, and thus a description thereof is omitted.

FIG. 5 illustrates a configuration of connection between plural process units. The configuration of the connection is the same as that in Embodiment 1, and thus a description thereof is omitted.

FIG. 18 illustrates in detail connection between a variable length decoding unit 503, an inverse quantization unit 504, an inverse frequency transform unit 505, a FIFO unit 500, a FIFO unit 511, a FIFO unit 512, and a FIFO unit 513. A description of constituent elements equivalent to those in FIG. 6 is omitted. A size determination unit 5020 is added in the present embodiment. The size determination unit 5020 determines the size of a coding unit, based on header information decoded by the variable length decoding unit 503.

The size determined by the size determination unit 5020 is input to a FIFO management unit which manages a FIFO unit for input and a FIFO unit for output of each process unit. Then, each FIFO management unit manages FIFO units according to the size, and activates a process unit.

It should be noted that the size determination unit 5020 may be included in the variable length decoding unit 503. In the description below, operation of the size determination unit 5020 may be described as operation of the variable length decoding unit 503 which includes the size determination unit 5020.

The above is a description of the configuration of the image decoding device according to the present embodiment.

2-3. Operation

In the present embodiment, the structure of an encoded stream illustrated in FIGS. 7A to 10B is used, as in Embodiment 1. Furthermore, the configuration of plural coding units illustrated in FIGS. 11A and 11B is used as an example, as in Embodiment 1. The entire operation flow of the image decoding device according to the present embodiment is the same as/similar to the operation flow of Embodiment 1 illustrated in FIGS. 12 and 13, and thus a description thereof is omitted.

The image decoding device according to the present embodiment uses the size of a coding unit to determine whether there is input data and whether there is an output area, which differs from Embodiment 1.

Figure 19A:
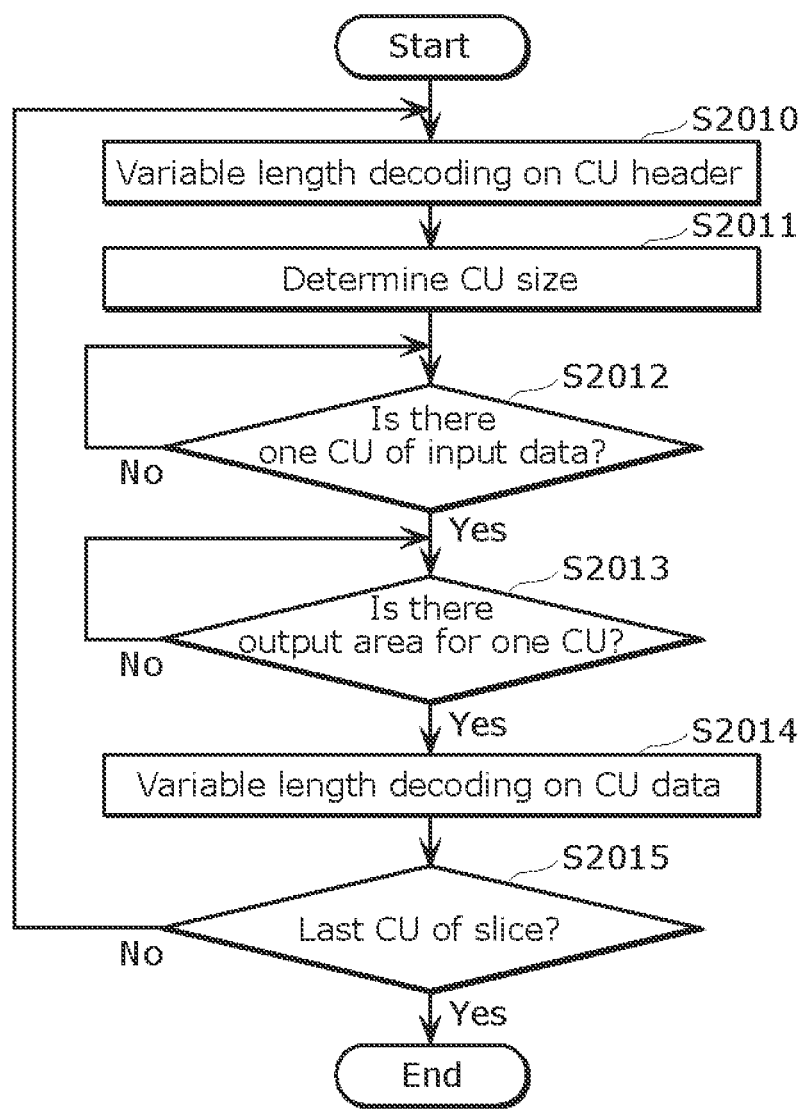
FIG. 19A is a flowchart illustrating operation of the variable length decoding unit according to Embodiment 2.

FIG. 19A is a flowchart illustrating operation of the variable length decoding unit 503 according to the present embodiment. First, the variable length decoding unit 503 performs a variable length decoding process on the header of a coding unit (S2010).

Next, the variable length decoding unit 503 determines the size of the coding unit (S2011). Next, the variable length decoding unit 503 determines whether there is input data corresponding to the size of the coding unit (S2012). Next, the variable length decoding unit 503 determines whether there is an output area corresponding to the size of the coding unit (S2013). Then, the variable length decoding unit 503 performs a variable length decoding process on the data of the coding unit after determining that there is an output area (S2014). Then, the variable length decoding unit 503 repeats the above operation on coding units up to the last coding unit of a slice (S2015).

Figure 19B:
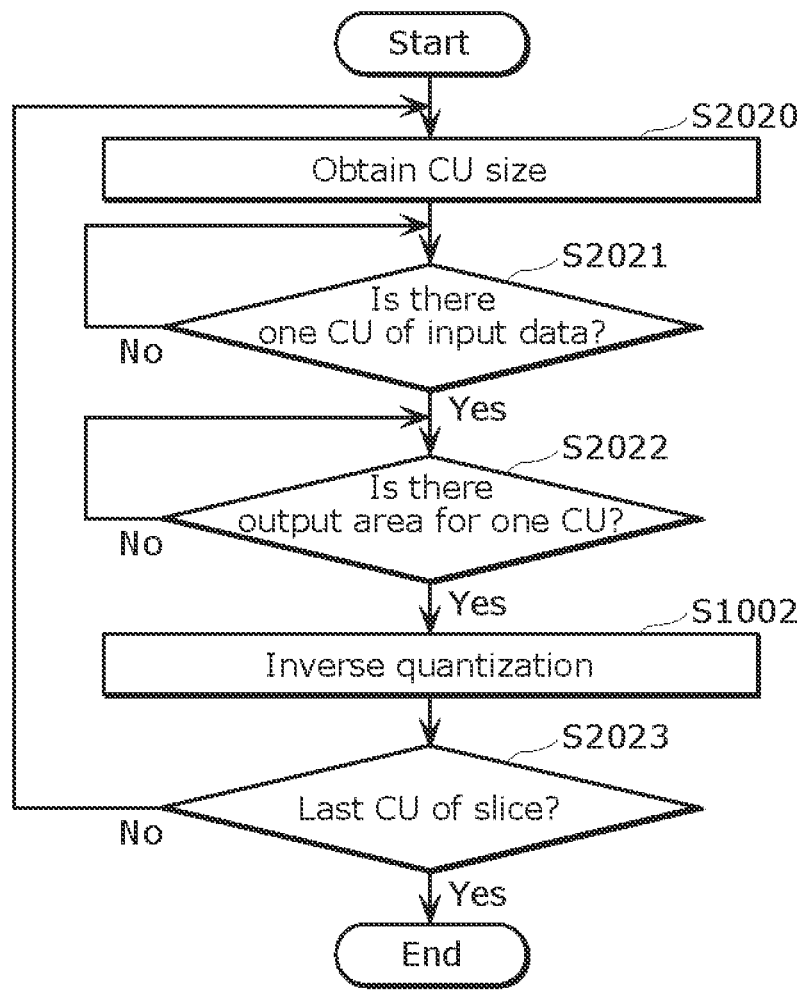
FIG. 19B is a flowchart illustrating operation of the inverse quantization unit according to Embodiment 2.

FIG. 19B is a flowchart illustrating operation of the inverse quantization unit 504 according to the present embodiment. First, the inverse quantization unit 504 obtains the size of a coding unit, based on the result determined by the variable length decoding unit 503 (S2020).

Next, the inverse quantization unit 504 determines whether there is input data corresponding to the size of a coding unit (S2021). Next, the inverse quantization unit 504 determines whether there is an output area corresponding to the size of the coding unit (S2022). Then, the inverse quantization unit 504 performs an inverse quantization process on the coding unit after determining that there is an output area (S1002). Then, the inverse quantization unit 504 repeats the above operation on coding units up to the last coding unit of a slice (S2023).

Figure 19C:
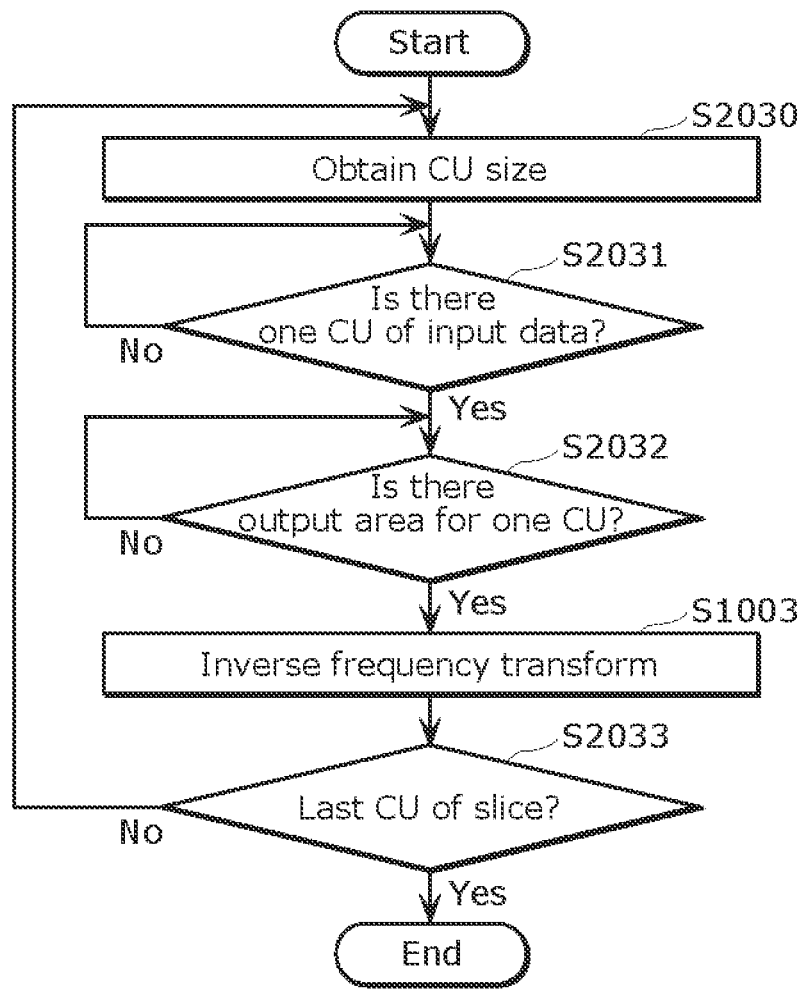
FIG. 19C is a flowchart illustrating operation of the inverse frequency transform unit according to Embodiment 2.

FIG. 19C is a flowchart illustrating operation of the inverse frequency transform unit 505 according to the present embodiment. First, the inverse frequency transform unit 505 obtains the size of a coding unit, based on the result determined by the variable length decoding unit 503 (S2030).

Next, the inverse frequency transform unit 505 determines whether there is input data corresponding to the size of a coding unit (S2031). Next, the inverse frequency transform unit 505 determines whether there is an output area corresponding to the size of the coding unit (S2032). Then, the inverse frequency transform unit 505 performs an inverse frequency transform process on the coding unit after determining that there is an output area (S1003). Then, the inverse frequency transform unit 505 repeats the above operation on coding units up to the last coding unit of a slice (S2033).

Figure 19D:
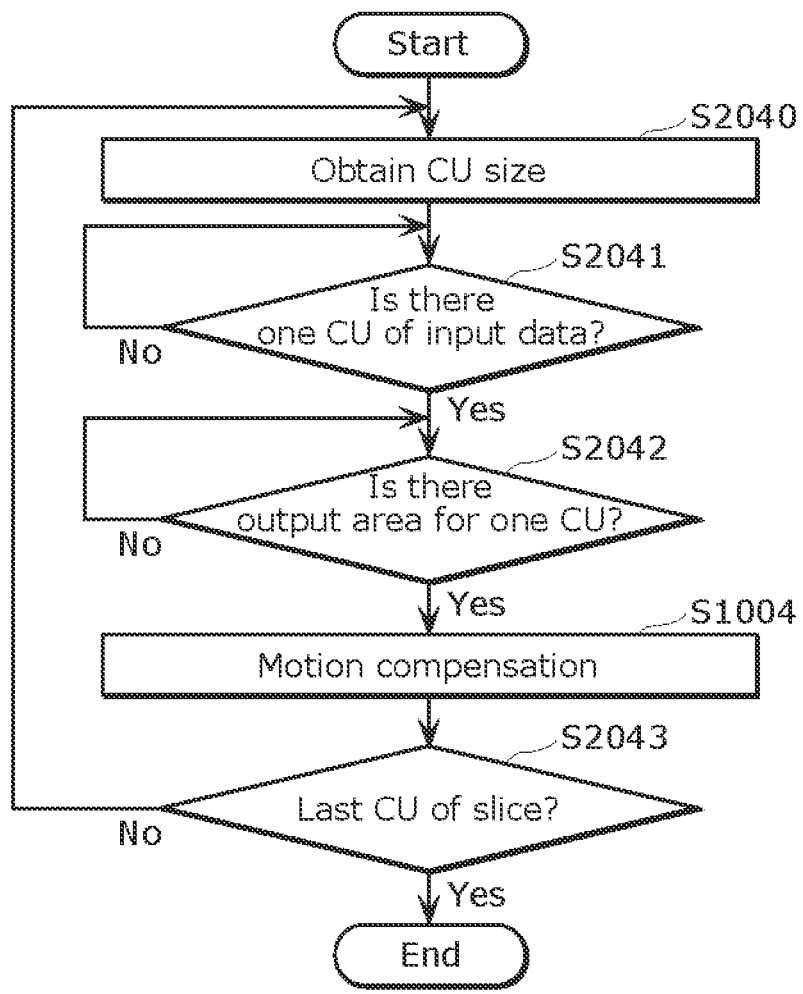
FIG. 19D is a flowchart illustrating operation of a motion compensation unit according to Embodiment 2.

FIG. 19D is a flowchart illustrating operation of the motion compensation unit 506 according to the present embodiment. First, the motion compensation unit 506 obtains the size of a coding unit, based on the result determined by the variable length decoding unit 503 (S2040).

Next, the motion compensation unit 506 determines whether there is input data corresponding to the size of a coding unit (S2041). Next, the motion compensation unit 506 determines whether there is an output area corresponding to the size of the coding unit (S2042). Then, the motion compensation unit 506 performs a motion compensation process on the coding unit after determining that there is an output area (S1004). Then, the motion compensation unit 506 repeats the above operation on coding units up to the last coding unit of a slice (S2043).

Figure 19E:
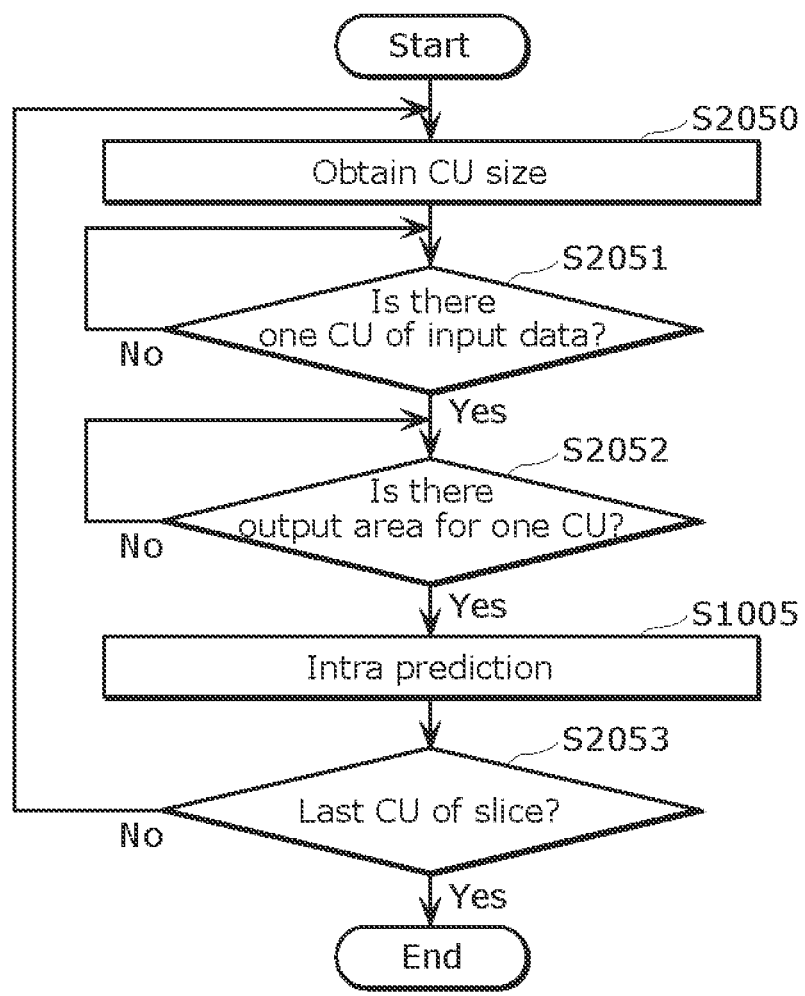
FIG. 19E is a flowchart illustrating operation of an intra prediction unit according to Embodiment 2.

FIG. 19E is a flowchart illustrating operation of the intra prediction unit 507 according to the present embodiment. First, the intra prediction unit 507 obtains the size of a coding unit, based on the result determined by the variable length decoding unit 503 (S2050).

Next, the intra prediction unit 507 determines whether there is input data corresponding to the size of the coding unit (S2051). Next, the intra prediction unit 507 determines whether there is an output area corresponding to the size of the coding unit (S2052). Then, the intra prediction unit 507 performs an intra prediction process on the coding unit after determining that there is an output area (S1005). Then, the intra prediction unit 507 repeats the above operation on coding units up to the last coding unit of a slice (S2053).

Figure 19F:
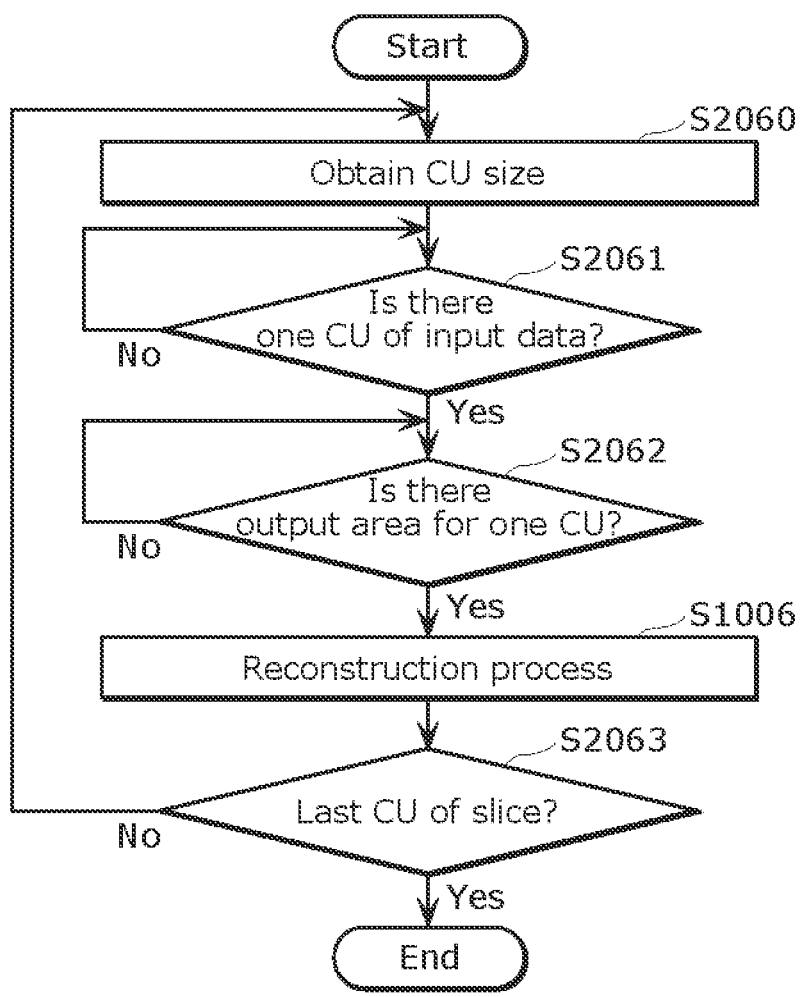
FIG. 19F is a flowchart illustrating operation of a reconstruction unit according to Embodiment 2.

FIG. 19F is a flowchart illustrating operation of the reconstruction unit 508 according to the present embodiment. First, the reconstruction unit 508 obtains the size of a coding unit, based on the result determined by the variable length decoding unit 503 (S2060).

Next, the reconstruction unit 508 determines whether there is input data corresponding to the size of the coding unit (S2061). Next, the reconstruction unit 508 determines whether there is an output area corresponding to the size of the coding unit (S2062). Then, the reconstruction unit 508 performs an intra prediction process on the coding unit after determining that there is an output area (S1006). Then, the reconstruction unit 508 repeats the above operation on coding units up to the last coding unit of a slice (S2063).

Figure 19G:
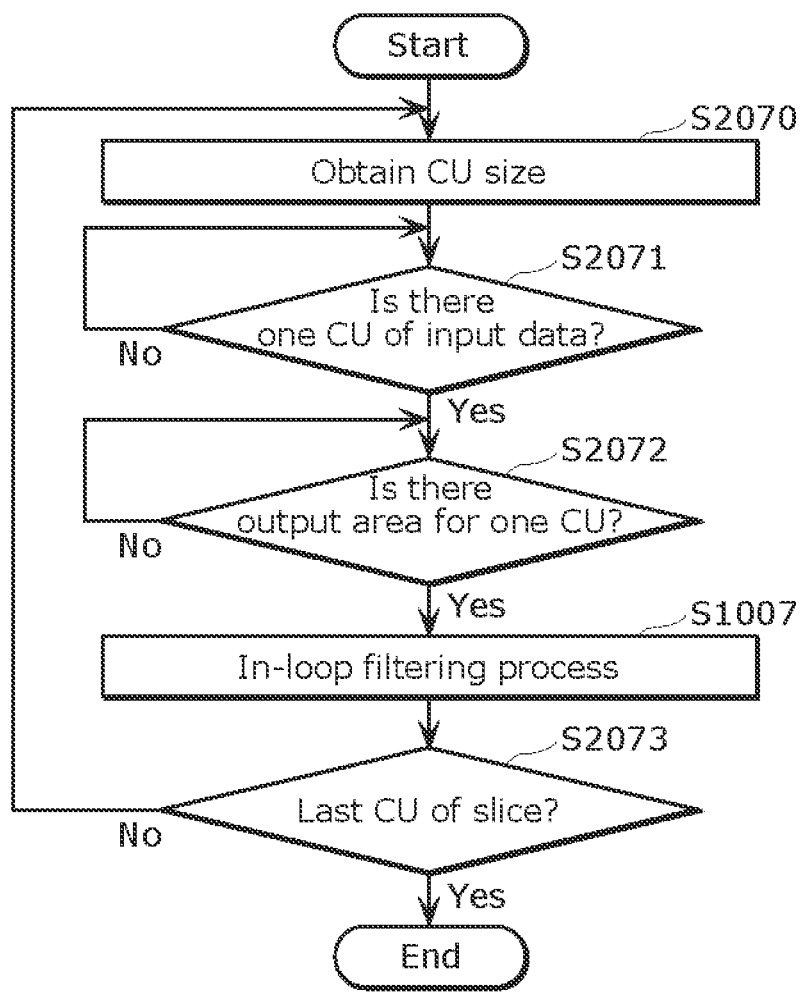
FIG. 19G is a flowchart illustrating operation of an in-loop filtering unit according to Embodiment 2.

FIG. 19G is a flowchart which illustrates operation of the in-loop filtering unit 510 according to the present embodiment. First, the in-loop filtering unit 510 obtains the size of a coding unit, based on the result determined by the variable length decoding unit 503 (S2070).

Next, the in-loop filtering unit 510 determines whether there is input data corresponding to the size of the coding unit (S2071). Next, the in-loop filtering unit 510 determines whether there is an output area corresponding to the size of the coding unit (S2072). Then, the in-loop filtering unit 510 performs an in-loop filtering process on the coding unit after determining that there is an output area (S1007). Then, the in-loop filtering unit 510 repeats the above operation on coding units up to the last coding unit of a slice (S2073).

In the present embodiment, each process is executed based on the size of a coding unit, as described above. Other operations are the same as in Embodiment 1.

FIG. 15 illustrates time series operation of the image decoding device according to the present embodiment. Also in the present embodiment, pipeline processing is executed as in Embodiment 1.

FIG. 20 illustrates time series states of the FIFO unit 513 according to the present embodiment. In the example in FIG. 20, the FIFO unit 513 has a capacity for storing two largest coding units of data. FIG. 20 illustrates the states of data stored in the FIFO unit 513 at times A to J. Times A to J are the same as the time points mentioned in Embodiment 1. Furthermore, WP represents a write pointer, and indicates a position at which input data is written, as in FIG. 16. RP represents a read pointer, and indicates a position at which output data is read.

A stored CU counter value in FIG. 20 indicates the number of smallest coding units corresponding to information stored in the FIFO unit 513. For example, if CU1, CU2, CU3, and CU4 are the smallest size of a coding unit, CU0 corresponds to four smallest coding units. In other words, as shown at time B in FIG. 20, the value corresponding to four smallest coding units is added to the stored CU counter value at the point in time when a process on CU0 is completed.

For example, the reconstruction unit 508 obtains the size of a coding unit to be processed prior to determining whether there is input data corresponding to one CU, which differs from Embodiment 1 (S2060 in FIG. 19F). Then, the reconstruction unit 508 determines whether the FIFO unit 513 has input data, based on whether the stored CU counter value of the FIFO unit 513 is a value corresponding to that size or more (S2061 of FIG. 19F).

The inverse frequency transform unit 505 determines whether the FIFO unit 513 has an available area, based on whether the result obtained by adding a value corresponding to the size of a coding unit and the stored CU counter value is 8 or less (S2032 in FIG. 19C).

As in Embodiment 1, a process unit which stores data of a coding unit into a specific FIFO unit increases the stored CU counter value of that FIFO unit, based on the size of the coding unit. Furthermore, a process unit which extracts data of the coding unit from that FIFO unit decreases the stored CU counter value of the FIFO unit, based on the size of the coding unit.

The image decoding device according to the present embodiment manages data input to/output from FIFO units, based on the size of a coding unit, as described above. Consequently, the image decoding device can execute plural processes in parallel by pipelining on plural coding units having various sizes. Thus, the image decoding device can efficiently utilize the areas of the FIFO units which connect plural process units.

The above is a description of operation of the image decoding device according to the present embodiment.

2-4. Advantageous Effect

The image decoding device performs plural processes in parallel by pipelining according to the sizes of coding units defined in the encoded stream. In addition, the image decoding device includes FIFO units which can each store at least two largest coding units of data, as input/output buffers connected to plural process units. In addition, the image decoding device manages data input to/output from FIFO units, based on the size of a coding unit.

This shortens a time to wait for the input of data and a time to wait until an output buffer has an available area in each process even when plural coding units have various sizes. Consequently, idle time in pipeline processing is reduced, and pipeline processing is performed efficiently. Thus, processing performance improves.

In addition, the greater the capacity of the FIFO units is, the greater capacity each FIFO unit has, the shorter a time to wait for the input of data and a time to wait until an output buffer has an available area become in each process. Also, if the coding unit to be processed is smaller than the largest coding unit assumed, a time to wait for the input of data and a time to wait until an output buffer has an available area are shortened in each process.

As a result, processing performance further improves. In addition, circuit(s) operates efficiently, which reduces necessary power consumption. Furthermore, it is possible to reduce the capacity of memories disposed between plural process units, compared with Embodiment 1. This achieves a reduction in circuit scale.

2-5. Supplementary Description

It should be noted that in the present embodiment, a coding unit is used as a data unit used for encoding and decoding. However, the data unit used for encoding and decoding may be a macroblock. The data unit used for encoding and decoding may be a block called a super macroblock.

In the present embodiment, processes in pipeline processing are described based on the encoding scheme disclosed in NPL 2. However, the processes in pipeline processing are not limited to the examples in the present embodiment.

Furthermore, in the present embodiment, the size of the largest coding unit is 128×128 pixels. However, the size of the largest coding unit may be any size. In addition, in the present embodiment, the size of a coding unit ranges from 128×128 pixels to 8×8 pixels. However, the size of a coding unit may be a size other than these.

The configuration of the pipeline processing described in the present embodiment is an example. Plural processes do not necessarily need to be divided at plural stages as described in the present embodiment. For example, plural processes may be executed at one stage, or one process may be divided at some stages.

Variable length codes are used in the present embodiment. An encoding scheme for variable length codes may be any encoding scheme such as Huffman encoding, run length encoding, or arithmetic encoding.

In addition, part of or the entirety of each process unit may be achieved by a dedicated hardware circuit, or may be achieved by a program on a processor.

In addition, the FIFO units 500, 511, 512, 513, 514, 515, 517, 518, and 519, the frame memory 502, and the reconstructed image memory 509 are not limited to memories. These may be memory elements in which data can be stored. For example, these may be flip-flops, registers, or the like. Further, part of a memory area of a processor or part of cache memory may be used for these.

In addition, in the present embodiment, the reconstructed image memory 509 is illustrated explicitly. However, a memory in each process unit may be used as the reconstructed image memory 509, and the frame memory 502 may be used as the reconstructed image memory 509.

In addition, decoding processing is described as an example in the present embodiment. However, a similar configuration to that described in the present embodiment may be applied to a process other than a decoding process. For example, a similar configuration to that in the present embodiment may be applied to encoding processing opposite the decoding processing.

Specifically, the image encoding device may include FIFO units which can each store at least two largest coding units of data as input/output buffers connected to plural process units, and manage data in the FIFO units based on the size of a coding unit. Accordingly, pipeline processing is executed as efficiently as in the present embodiment.

In addition, in the present embodiment, a CU division flag is included at the head of a division block. However, the CU division flag does not necessarily need to be included at such a position, and need only be included in an encoded stream. For example, the CU division flag may be included at the head of a largest coding unit.

In the present embodiment, a TU division flag is included at the head of each coefficient information piece. However, the TU division flag does not necessarily need to be included at such a position, and need only be included in an encoded stream. For example, the TU division flag may be included at the head of a coding unit or a largest coding unit.

In addition, in the present embodiment, the image decoding device performs plural processes for each coding unit. However, the image decoding device may perform plural processes for each available data set different from a coding unit. In other words, the image decoding device may perform plural processes for each transform unit, may perform plural processes for each prediction unit, and may perform plural processes for each data set other than the above.

In the present embodiment, all processes are performed for each coding unit. However, an inverse frequency transform process may be performed for each transform unit, and a motion compensation process may be performed for each prediction unit, for example. Accordingly, a data unit does not necessarily need to be the same in all processes.

In the present embodiment, the image decoding device includes FIFO units which can each store at least two largest coding units of data, as input/output buffers connected to plural process units. However, the image decoding device may include FIFO units which can each store two or more available largest data sets of data.

For example, the image decoding device may include FIFO units which can each store two or more largest transform units of data. In addition, the image decoding device may include FIFO units which can each store two or more largest prediction units of data. In addition, the image decoding device may include FIFO units which can each store data of two or more largest data sets other than the above.

Embodiment 3

An image decoding device and an image encoding device according to the present embodiment include distinctive constituent elements among plural constituent elements described in Embodiments 1 and 2.

Figure 21A:
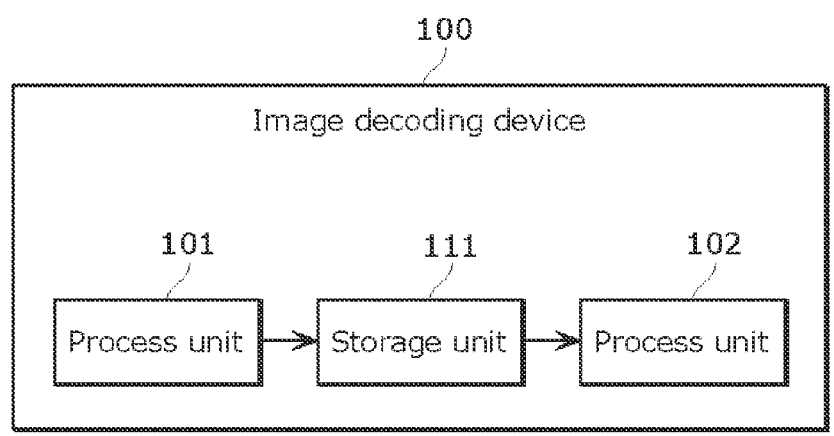
FIG. 21A illustrates a configuration of an image decoding device according to Embodiment 3.

FIG. 21A illustrates a configuration of the image decoding device according to the present embodiment. An image decoding device 100 illustrated in FIG. 21A decodes an encoded image obtained by encoding plural blocks of at least two sizes divided from the image, by pipeline processing which includes plural processes. Then, the image decoding device 100 includes two process units 101 and 102 and a storage unit 111. The storage unit 111 has a capacity for storing two or more blocks having the largest size of the at least two sizes.

Figure 21B:
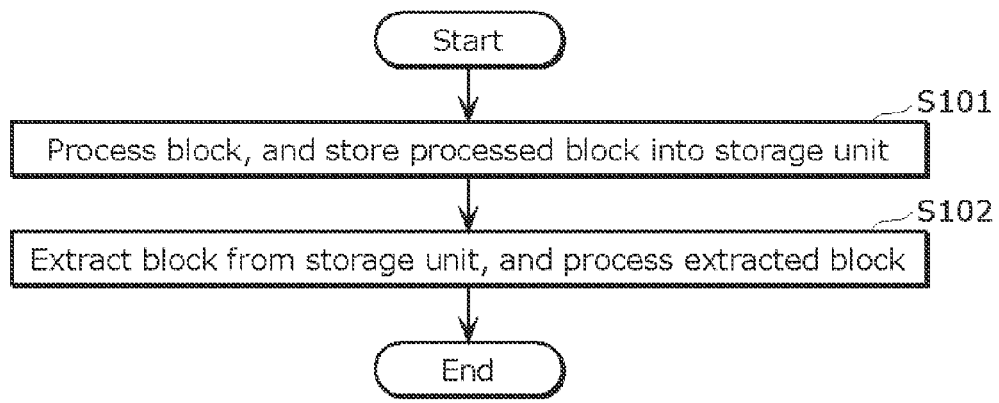
FIG. 21B is a flowchart illustrating operation of the image decoding device according to Embodiment 3.

FIG. 21B is a flowchart showing operation of the image decoding device 100 shown in FIG. 21A. First, the process unit 101 performs a first process among plural processes on plural blocks sequentially. Then, the process unit 101 stores the block on which the first process has been performed into the storage unit 111, thereby sequentially storing the plural blocks into the storage unit 111 (S101). Next, the process unit 102 sequentially extracts plural blocks from the storage unit 111. Then, the process unit 102 performs a second process among plural processes on the extracted plural blocks sequentially (S102).

This allows the process unit 101 to process a block having the largest size and write the processed block into the storage unit 111, and meanwhile, the process unit 102 to extract another block having the largest size from the storage unit 111 and process the extracted block. The storage unit 111 can store three or more blocks depending on the sizes thereof. Consequently, idle waiting time in which the process units 101 and 102 wait for the end of a process by the other unit is reduced, thus improving processing efficiency.

Figure 22A:
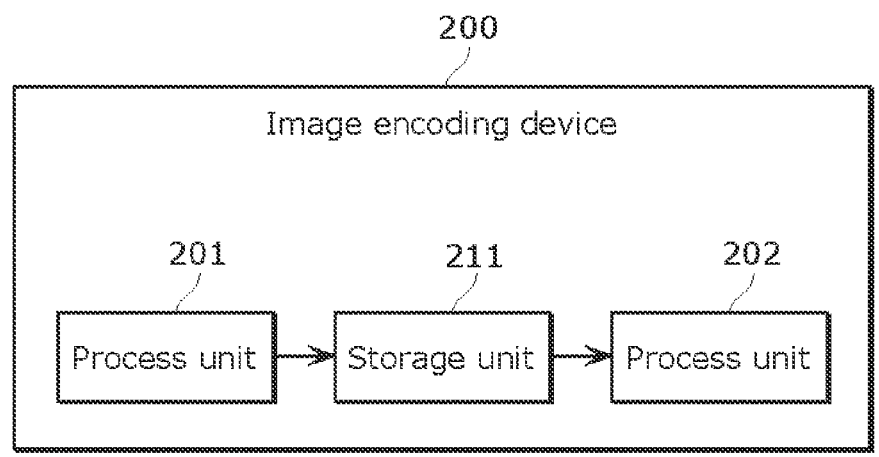
FIG. 22A illustrates a configuration of an image encoding device according to Embodiment 3.

FIG. 22A illustrates the configuration of an image encoding device according to the present embodiment. An image encoding device 200 illustrated in FIG. 22A divides an image into plural blocks having at least two sizes, and encodes the divided image by pipeline processing which includes plural processes. Then, the image encoding device 200 includes two process units 201 and 202 and a storage unit 211. The storage unit 211 has a capacity for storing two or more blocks having the largest size of the at least two sizes.

Figure 22B:
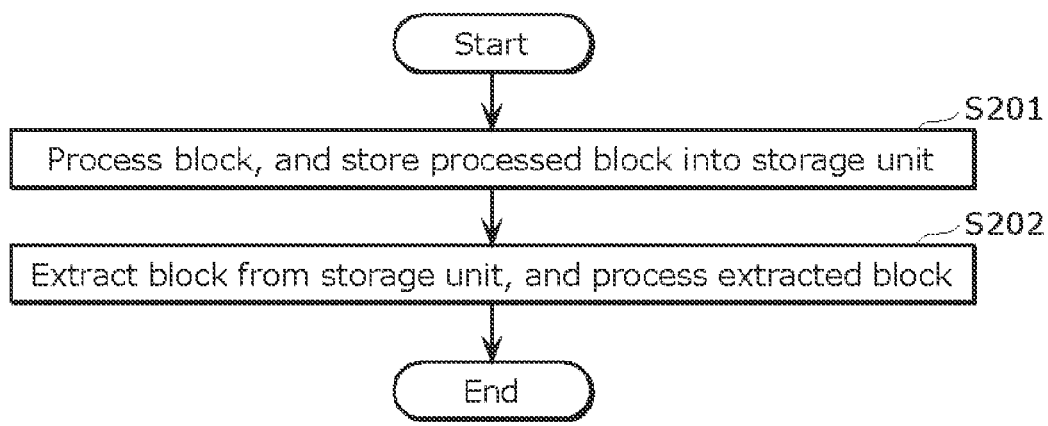
FIG. 22B is a flowchart illustrating operation of the image encoding device according to Embodiment 3.

FIG. 22B is a flowchart showing operation of the image encoding device 200 shown in FIG. 22A. First, the process unit 201 performs a first process among plural processes on plural blocks sequentially. Then, the process unit 201 stores a block on which the first process has been performed into the storage unit 211, thereby sequentially storing plural blocks into the storage unit 211 (S201). Next, the process unit 202 sequentially extracts plural blocks from the storage unit 211. Then, the process unit 202 performs a second process on the extracted plural blocks sequentially (S202).

In this manner, the image encoding device 200 can obtain similar effects to those obtained by the image decoding device 100.

It should be noted that the storage units 111 and 211 may have a capacity for storing three or more blocks having the largest size of at least two sizes.

In addition, plural blocks may be plural coding units, plural transform units, or plural prediction units.

In this case, the process unit 101 or 102 performs a variable length decoding process on plural coding units, an inverse frequency transform process on plural transform units, or a prediction process on plural prediction units, as the first or second process. Then, the process unit 201 or 202 performs a variable length encoding process on plural coding units, a frequency transform process on plural transform units, or a prediction process on plural prediction units, as the first or second process.

Alternatively, the process unit 101 may perform a variable length decoding process as the first process, and the process unit 202 may perform an inverse quantization process as the second process. The process unit 201 may perform a frequency transform process as the first process, and the process unit 202 may perform a quantization process as the second process. The process unit 201 may perform a quantization process as the first process, and the process unit 202 may perform a variable length encoding process as the second process.

Alternatively, the process units 101 and 201 may perform an inverse quantization process as the first process, and the process units 102 and 202 may perform an inverse frequency transform process as the second process. Alternatively, the process units 101 and 201 may perform an inverse frequency transform process as the first process, and the process units 102 and 202 may perform a reconstruction process as the second process.

Alternatively, the process units 101 and 201 may perform an intra prediction process as the first process, and the process units 102 and 202 may perform a reconstruction process as the second process. Alternatively, the process units 101 and 201 may perform a motion compensation process as the first process, and the process units 102 and 202 may perform a reconstruction process as the second process. Alternatively, the process units 101 and 201 may perform a reconstruction process as the first process, and the process units 102 and 202 may perform an in-loop filtering process as the second process.

Alternatively, the process units 101 and 201 may perform a reference image transfer process as the first process, and the process units 102 and 202 may perform a motion compensation process as the second process.

For example, the process unit 101 transfers a reference image of a current block to be decoded, and stores the image into the storage unit 111. The process unit 102 extracts the reference image of the current block from the storage unit 111, and executes a motion compensation process on the current block using the extracted reference image. Similarly, the process unit 201 transfers the reference image of a current block to be encoded, and stores the image into the storage unit 211. The process unit 202 extracts the reference image of the current block from the storage unit 211, and executes a motion compensation process on the current block using the extracted reference image.

The process unit 102 may sequentially extract plural blocks from the storage unit 111, and perform the second process on the extracted plural blocks sequentially, asynchronously with the process unit 101. Similarly, the process unit 202 may sequentially extract plural blocks from the storage unit 211, and may perform the second process on the extracted plural blocks sequentially, asynchronously with the process unit 201.

In addition, the process unit 102 may perform a second process on a second block away from a first block by two or more blocks in order in which plural blocks are processed, in parallel to the process unit 101 performing a first process on the first block. Similarly, the process unit 202 may perform a second process on a second block away from a first block by two or more blocks in order in which plural blocks are processed, in parallel to the process unit 201 performing a first process on the first block.

In addition, typically, the process unit 102 sequentially extracts plural blocks from the storage unit 111 in order in which the plural blocks are stored into the storage unit 111. Similarly, typically, the process unit 202 sequentially extracts plural blocks from the storage unit 211 in order in which the plural blocks are stored into the storage unit 211.

Embodiment 4

An image decoding device and an image encoding device according to the present embodiment include distinctive constituent elements among plural constituent elements described in Embodiments 1 and 2. In addition, in the present embodiment, a new constituent element is added to the configuration described in Embodiment 3.

Figure 23A:
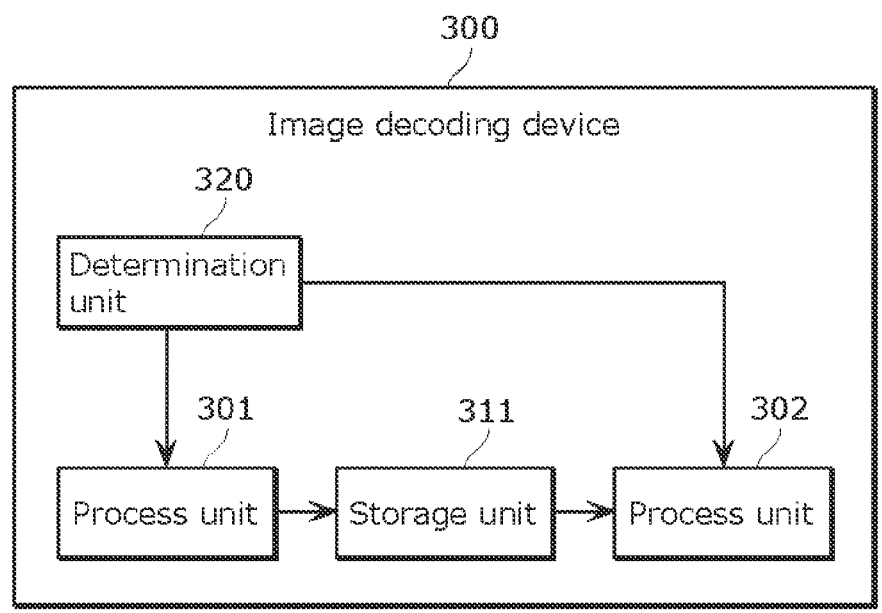
FIG. 23A illustrates a configuration of an image decoding device according to Embodiment 4.

FIG. 23A illustrates a configuration of the image decoding device according to the present embodiment. The image decoding device 300 illustrated in FIG. 23A decodes an encoded image obtained by encoding plural blocks of at least two sizes divided from the image, by pipeline processing which includes plural processes. Then, the image decoding device 300 includes two process units 301 and 302, a storage unit 311, and a determination unit 320. The storage unit 311 has a capacity for storing two or more blocks having the largest size of the at least two sizes. The determination unit 320 determines sizes of the plural blocks.

Figure 23B:
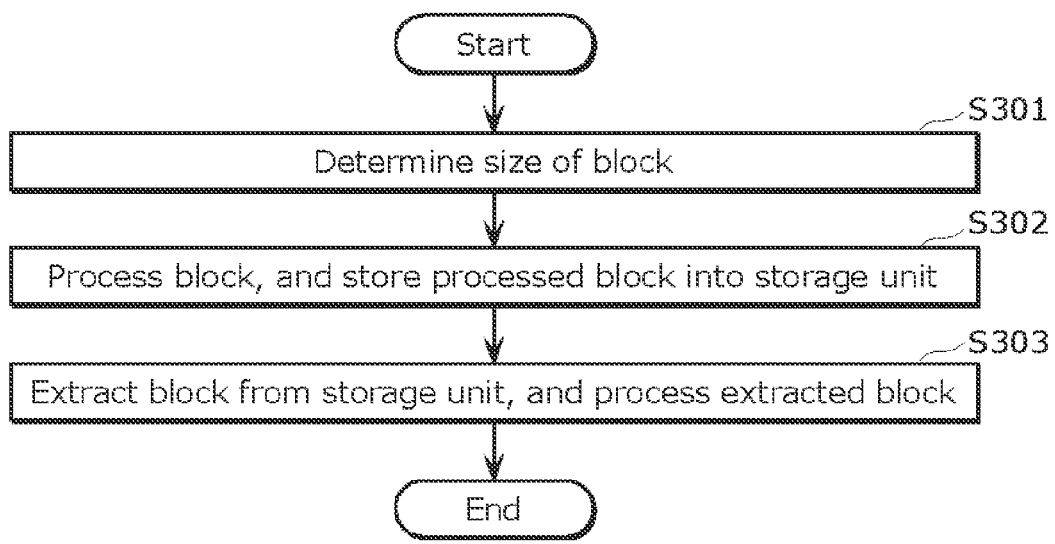
FIG. 23B is a flowchart illustrating operation of the image decoding device according to Embodiment 4.

FIG. 23B is a flowchart illustrating operation of the image decoding device 300 illustrated in FIG. 23A. First, the determination unit 320 determines the size of a block (S301).

The process unit 301 performs a first process on the block. Then, the process unit 301 stores the block on which the first process has been performed into the storage unit 311 (S302). At this time, the process unit 301 determines an area to be occupied by the block in the storage unit 311 according to the size of the block on which the first process has been performed, and stores the block in the determined area. Next, the process unit 302 extracts the block from storage unit 311.

Then, the process unit 302 performs a second process among plural processes on the extracted block (S303).

In this manner, the process unit 301 can store plural blocks into the storage unit 311 appropriately according to the sizes thereof. Consequently, the process unit 301 can store many blocks in a small capacity.

Figure 24A:
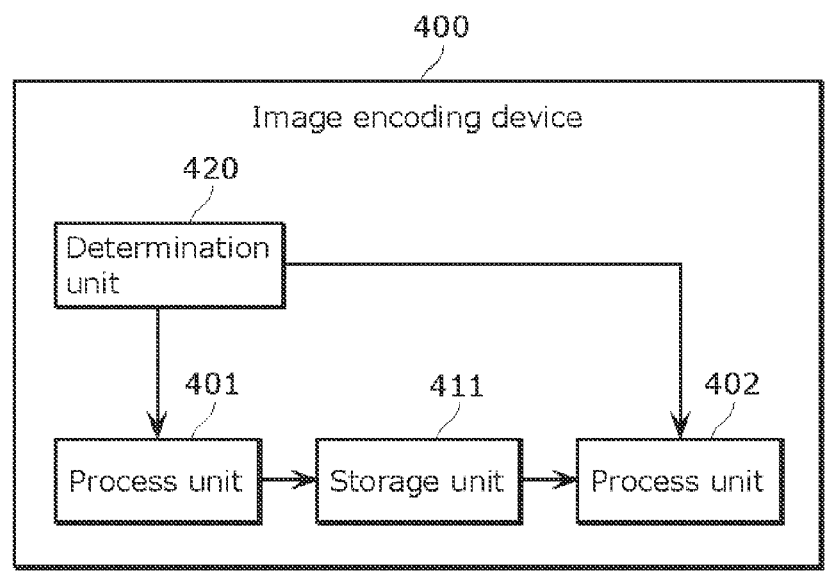
FIG. 24A illustrates a configuration of an image encoding device according to Embodiment 4.

FIG. 24A illustrates a configuration of an image encoding device according to the present embodiment. An image encoding device 400 illustrated in FIG. 24A divides an image into plural blocks having at least two sizes, and encodes the divided image by pipeline processing which includes plural processes. The image encoding device 400 includes two process units 401 and 402, a storage unit 411, and a determination unit 420. The storage unit 411 has a capacity for storing two or more blocks having the largest size of the at least two sizes. The determination unit 420 determines the sizes of plural blocks.

Figure 24B:
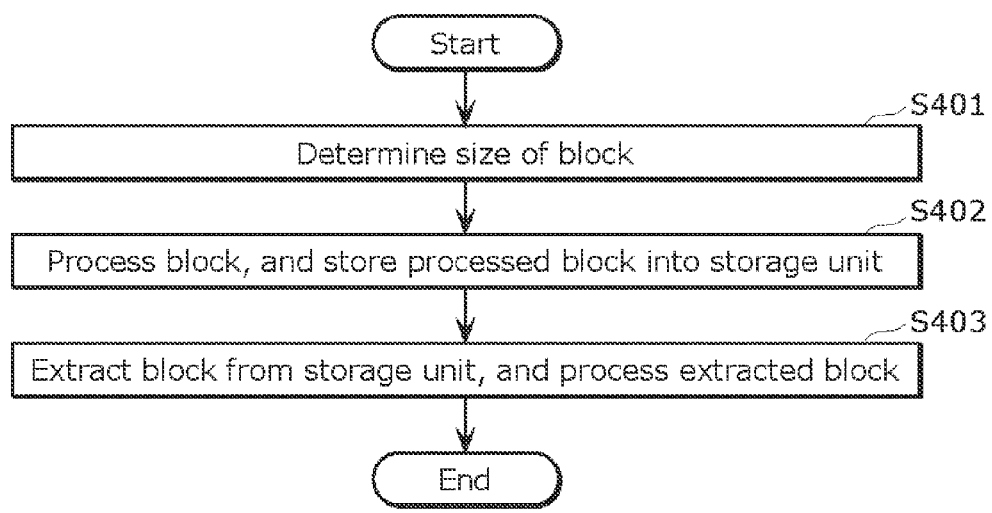
FIG. 24B is a flowchart illustrating operation of the image encoding device according to Embodiment 4.

FIG. 24B is a flowchart illustrating operation of the image encoding device 400 illustrated in FIG. 24A. First, the determination unit 420 determines the size of a block (S401).

The process unit 401 performs a first process on the block. Then, the process unit 401 stores the block on which the first process has been performed into the storage unit 411 (S402). At this time, the process unit 401 determines an area to be occupied by the block in the storage unit 411 according to the size of the block on which the first process has been performed, and stores the block in the determined area. Next, the process unit 402 extracts the block from the storage unit 411.

Then, the process unit 402 performs a second process among plural processes on the extracted block (S403).

In this manner, the image encoding device 400 can achieve effects similar to those obtained by the image decoding device 300.

Embodiment 5

An image decoding device and an image encoding device according to the present embodiment include distinctive constituent elements among plural constituent elements described in Embodiments 1 and 2. In the present embodiment, a new constituent element is added to the configuration described in Embodiment 3.

Figure 25A:
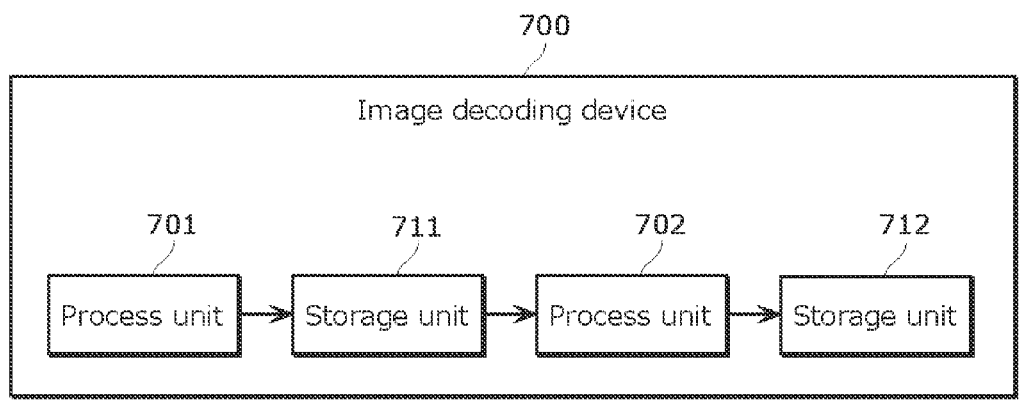
FIG. 25A illustrates a configuration of an image decoding device according to Embodiment 5.

FIG. 25A illustrates a configuration of the image decoding device according to the present embodiment. An image decoding device 700 illustrated in FIG. 25A decodes an encoded image obtained by encoding plural blocks of at least two sizes divided from the image, by pipeline processing which includes plural processes. The image decoding device 700 includes two process units 701 and 702 and two storage units 711 and 712. The storage unit 711 has a capacity for storing two or more blocks having the largest size of the at least two sizes.

The process units 701 and 702 according to the present embodiment perform similar operation to that of the process units 101 and 102 according to Embodiment 3. The process unit 702 according to the present embodiment additionally performs operation illustrated in FIG. 25B when performing a second process.

Figure 25B:
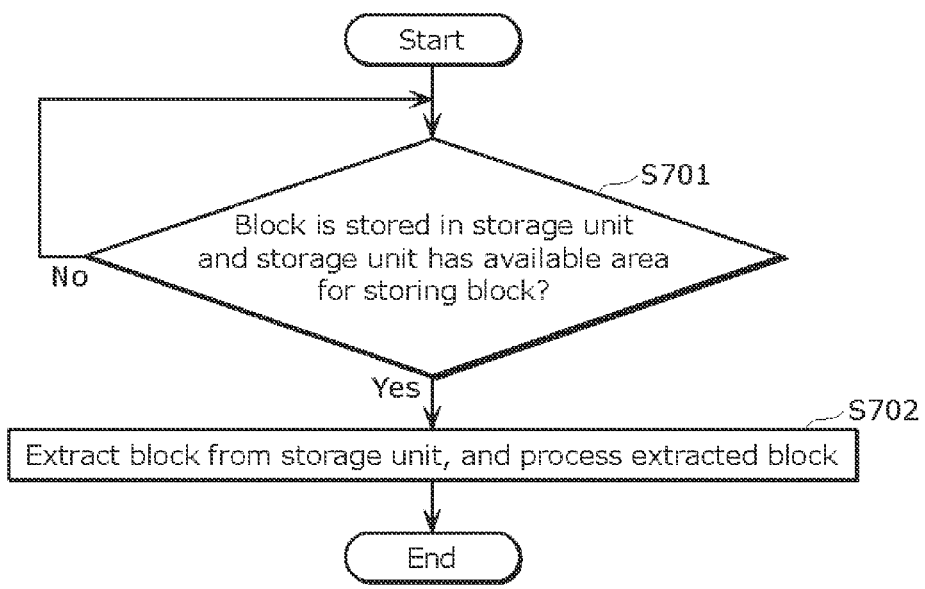
FIG. 25B is a flowchart illustrating operation of a process unit of the image decoding device according to Embodiment 5.

FIG. 25B is a flowchart illustrating operation of the process unit 702 illustrated in FIG. 25A. Prior to performing a second process, the process unit 702 determines whether a block on which a first process has been performed is stored in the storage unit 711, and whether the storage unit 712 has an available area for storing a block on which the second process is performed (S701).

Then, the process unit 702 extracts a block from the storage unit 711 at a time when the process unit 702 determines that a block on which the first process has been performed is stored in the storage unit 711 and furthermore, the storage unit 712 has an available area for storing a block on which the second process is performed. Then, the process unit 702 performs the second process on the extracted block, and stores the block on which the second process has been performed into the storage unit 712 (S702).

In this manner, the process unit 702 can process a block at a time at which preparation for the process is complete. Consequently, wasteful waiting time decreases.

Figure 26A:
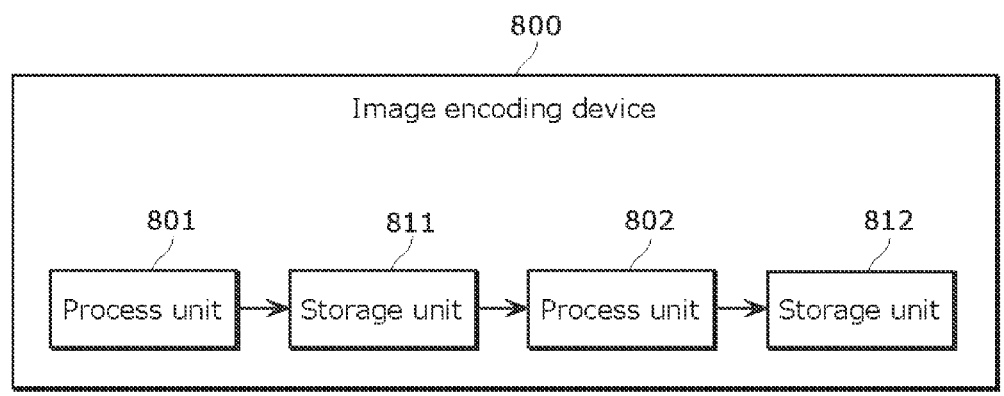
FIG. 26A illustrates a configuration of an image encoding device according to Embodiment 5.

FIG. 26A illustrates a configuration of an image encoding device according to the present embodiment. An image encoding device 800 illustrated in FIG. 26A divides an image into plural blocks having at least two sizes, and encodes the divided image by pipeline processing which includes plural processes. The image encoding device 800 includes two process units 801 and 802 and two storage units 811 and 812. The storage unit 811 has a capacity for storing two or more blocks having the largest size of the at least two sizes.

The process units 801 and 802 according to the present embodiment perform similar operation to that of the process units 801 and 802 according to Embodiment 3. The process unit 802 according to the present embodiment additionally performs operation illustrated in FIG. 26B when performing a second process.

Figure 26B:
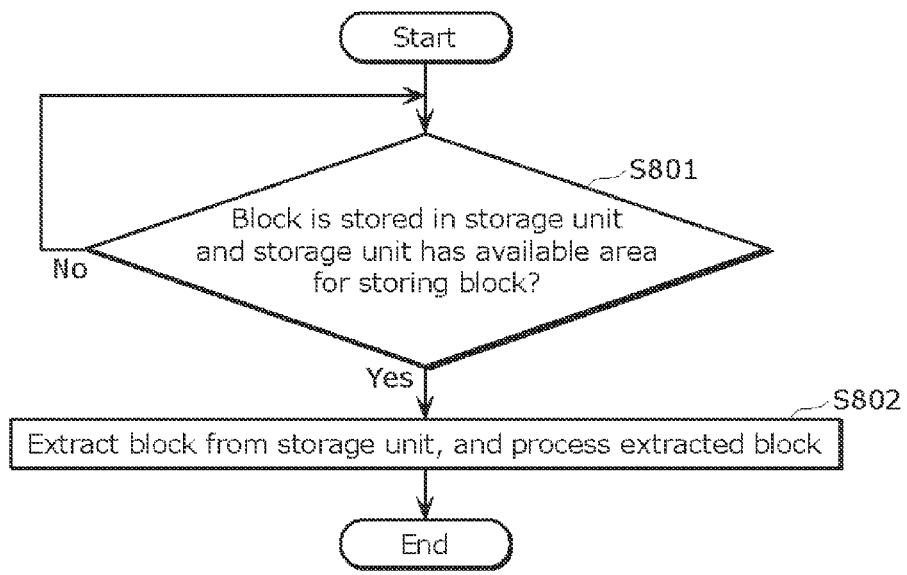
FIG. 26B is a flowchart illustrating operation of the process unit of the image encoding device according to Embodiment 5.

FIG. 26B is a flowchart illustrating operation of the process unit 802 illustrated in FIG. 26A. Prior to performing the second process, the process unit 802 determines whether a block on which a first process has been performed is stored in the storage unit 811, and whether the storage unit 712 has an available area for storing a block on which the second process is performed (S801).

Then, the process unit 802 extracts a block from the storage unit 811 at a time when the process unit 802 determines that a block on which the first process has been performed is stored in the storage unit 811 and furthermore, the storage unit 812 has an available area for storing a block on which the second process is performed. Then, the process unit 802 performs the second process on the extracted block, and stores the block on which the second process has been performed into the storage unit 812 (S802).

In this manner, the image encoding device 800 can achieve similar effects to those obtained by the image decoding device 700.

It should be noted that in the above embodiments, each constituent element may be constituted by dedicated hardware, or may be obtained by executing a software program suitable for the constituent element. Each constituent element may be obtained by a program execution unit such as a CPU or a processor reading and executing a software program recorded on a recording medium such as a hard disk or semiconductor memory. Here, the software which achieves the image decoding device according to the above embodiments, for instance, is a program as will be described below.

Specifically, this program causes a computer to execute an image decoding method for decoding, by pipeline processing which includes plural processes, an encoded image obtained by encoding plural blocks of at least two sizes divided from the image, the image decoding method including: (a) performing a first process among the plural processes on the plural blocks sequentially, and sequentially storing the plural blocks on which the first process has been performed into a first storage unit having a capacity for storing two or more blocks having a largest size of the at least two sizes; and (b) sequentially extracting the plural blocks from the first storage unit, and performing a second process among the plural processes on the extracted plural blocks sequentially.

Furthermore, this program may cause a computer to execute an image encoding method for dividing an image into plural blocks of at least two sizes, and encoding the divided image by pipeline processing which includes plural processes, the image encoding method including: (a) performing a first process among the plural processes on the plural blocks sequentially, and sequentially storing the plural blocks on which the first process has been performed into a first storage unit having a capacity for storing two or more blocks having a largest size of the at least two sizes; and (b) sequentially extracting the plural blocks from the first storage unit, and performing a second process among the plural processes on the extracted plural blocks sequentially.

Further, each constituent element may be a circuit. The circuits may form one circuit as a whole or may be separate circuits. Furthermore, each circuit may be a general-purpose circuit or a dedicated circuit.

Although the above describes the image decoding device and the image encoding device according to one or more aspects of the present invention, based on the embodiments, the present invention is not limited to the above embodiments. Various modifications to the embodiments that may be conceived by those skilled in the art and combinations of constituent elements in different embodiments may be included within the scope of the one or more aspects of the present invention, as long as the modifications and combinations do not depart from the spirit of the present invention.

For example, another process unit may execute the process executed by a specific process unit. Furthermore, the order of executing processes may be changed, and plural processes may be executed in parallel.

In addition, the present invention can be achieved not only as an image decoding device and an image encoding device, but also as a method in which process units constituting the image decoding device and the image encoding device are achieved as steps. For example, those steps are executed by a computer. In addition, the present invention can be achieved as a program for causing a computer to execute the steps included in the method. Furthermore, the present invention can be achieved as a non-transitory computer-readable recording medium such as a CD-ROM in which the program is stored.

In addition, the plural constituent elements included in the image decoding device and the image encoding device may be achieved as a large scale integration (LSI) which is an integrated circuit. These constituent elements may be each formed as a single chip or may be formed as a single chip to include some or all of the elements. For example, constituent elements except for a memory may be formed as a single chip. Although an LSI is described here, the integrated circuit may also be called an integrated circuit (IC), a system LSI, a super LSI, or an ultra LSI, depending on the difference in the degree of integration.

Moreover, ways to achieve integration are not limited to the LSI, and a dedicated circuit or a general purpose processor can also achieve the integration. A field programmable gate array (FPGA) that allows programming or a reconfigurable processor that allows reconfiguration of the connections and settings of the circuit cells inside the LSI may also be used.

In addition, depending on the emergence of circuit integration technology that replaces LSI due to the progress of semiconductor technology or other derivative technology, such technology may of course be used to perform circuit integration of the constituent elements included in the image decoding device and the image encoding device.

Embodiment 6

Furthermore, by recording a program, which realizes the image encoding method and the image decoding method described in each of the embodiments, onto a recording medium, it is possible to easily perform the processing as described in each of the embodiments in an independent computer system. The recording medium may be a magnetic disc, an optical disc, a magnet-optical disc, an integrated circuit (IC) card, or a semiconductor memory, as far as the media can record the program.

Furthermore, applications of the image encoding method and the image decoding method described in each of the above embodiments, and a system using such applications are described below.

Figure 27:
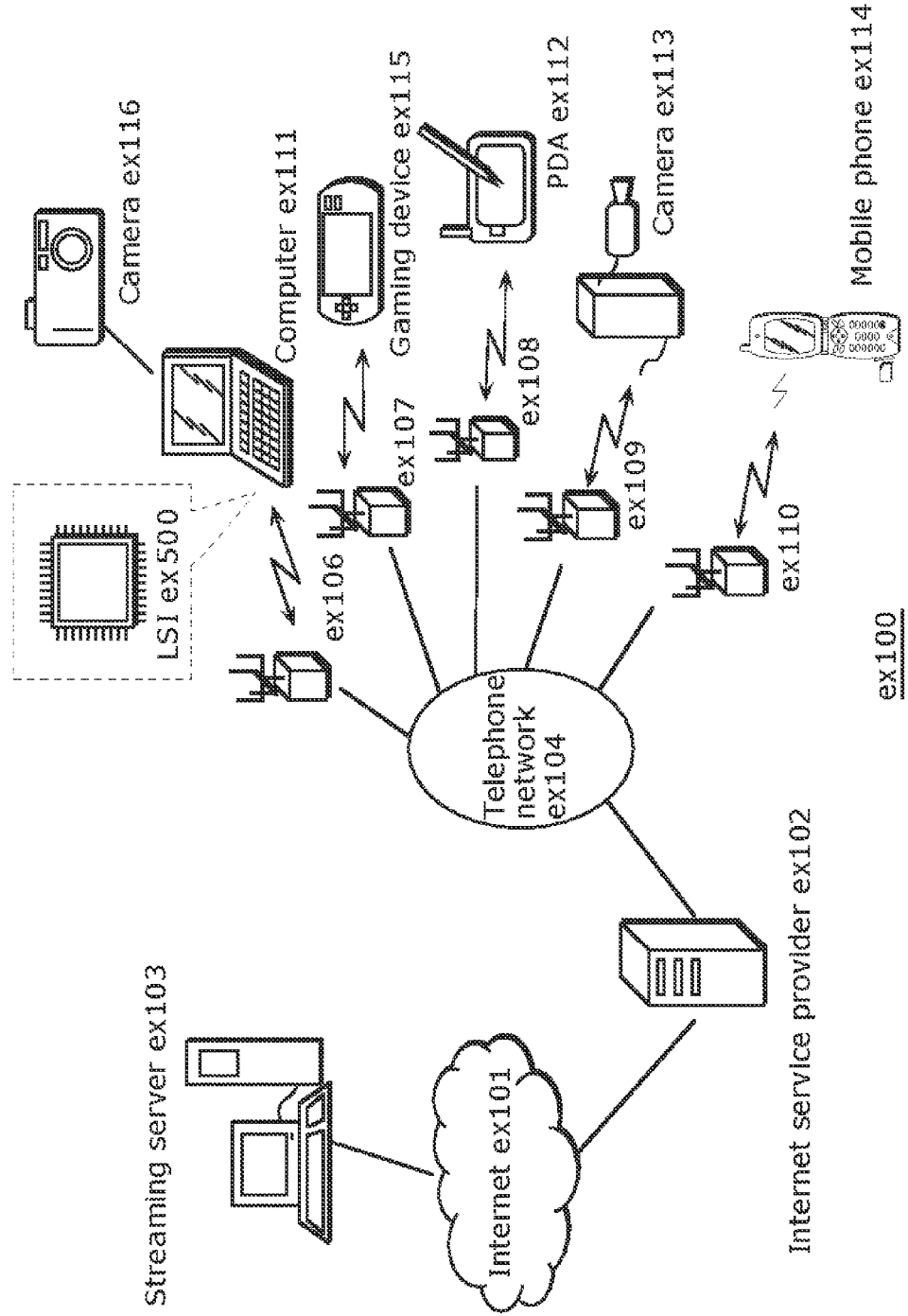
FIG. 27 illustrates an overall configuration of a content providing system for implementing content distribution services.

FIG. 27 is a block diagram showing the overall configuration of a content providing system ex100 for realizing content distribution service. The area for providing communication service is divided into cells of a desired size, and base stations ex106 to ex110 which are fixed wireless stations are placed in the respective cells.

In this content providing system ex100, various devices such as a computer ex111, a Personal Digital Assistant (PDA) ex112, a camera ex113, a mobile phone ex114 and a gaming machine ex115 are connected to one another, via a telephone network ex104 and base stations ex106 to ex110. Furthermore, the various devices are connected to the Internet ex101 via an Internet service provider ex102.

However, the content providing system ex100 is not limited to the combination as shown in FIG. 27, and may include a combination of any of these devices which are connected to each other. In addition, each device may be connected directly to the telephone network ex104, not through the base stations ex106 to ex110 which are fixed wireless stations. Furthermore, the devices may be connected directly to one another via Near Field Communication (NFC) or the like.

The camera ex113 is a device such as a digital video camera capable of shooting moving images. The camera ex116 is a device such as a digital video camera capable of shooting still images and moving images. The mobile phone ex114 may be any of a mobile phone of a Global System for Mobile Communications (GSM "registered trade mark)) system, a Code Division Multiple Access (CDMA) system, a Wideband-Code Division Multiple Access (W-CDMA) system, a Long Term Evolution (LTE) system, a High Speed Packet Access (HSPA) system, a Personal Handy-phone System (PHS), and the like.

In the content providing system ex100, the camera ex113 is connected to a streaming server ex103 via the base station ex109 and the telephone network ex104, which realizes live distribution or the like. In the live distribution, the encoding as described in the above embodiments is performed for a content (such as a video of a live music performance) shot by a user using the camera ex113, and the coded content is provided to the streaming server ex103. On the other hand, the streaming server ex103 makes steam distribution of the received content data to the clients at their requests. The clients include the computer ex111, the PDA ex112, the camera ex113, the mobile phone ex114, the gaming machine ex115, and the like, capable of decoding the above-mentioned coded data. Each device receiving the distributed data decodes the received data to be reproduced.

Here, the encoding of the data shot by the camera may be performed by the camera ex113, the streaming server ex103 for transmitting the data, or the like. Likewise, either the client or the streaming server ex103 may decode the distributed data, or both of them may share the decoding. In addition, the still image and/or moving image data shot by the camera ex116 may be transmitted not only to the camera ex113 but also to the streaming server ex103 via the computer ex111. In this case, either the camera ex116, the computer ex111, or the streaming server ex103 may perform the encoding, or all of them may share the encoding.

It should be noted that the above-described encoding and the decoding are performed by a Large Scale integration (LSI) ex500 generally included in each of the computer ex111 and the devices. The LSI ex500 may be implemented as a single chip or a plurality of chips. It should be noted that software for encoding and decoding images may be integrated into any of various type of recording media (such as a CD-ROM, a flexible disc and a hard disk) that is readable by the computer ex111 or the like, so that the encoding and decoding are performed by using the software. Furthermore, if the mobile phone ex114 is a camera-equipped mobile phone, it may transmit generated moving image data. This moving image data is the data encoded by the LSI ex500 included in the mobile phone ex114.

It should be noted that the streaming server ex103 may be implemented as a plurality of servers or a plurality of computers, so that data is divided into pieces to be processed, recorded, and distributed separately.

As described above, the content providing system ex100 enables the clients to receive and reproduce coded data. Thus, in the content providing system ex100, the clients can receive information transmitted by the user, then decode and reproduce it, so that the user without specific rights nor equipment can realize individual broadcasting.

Figure 28:
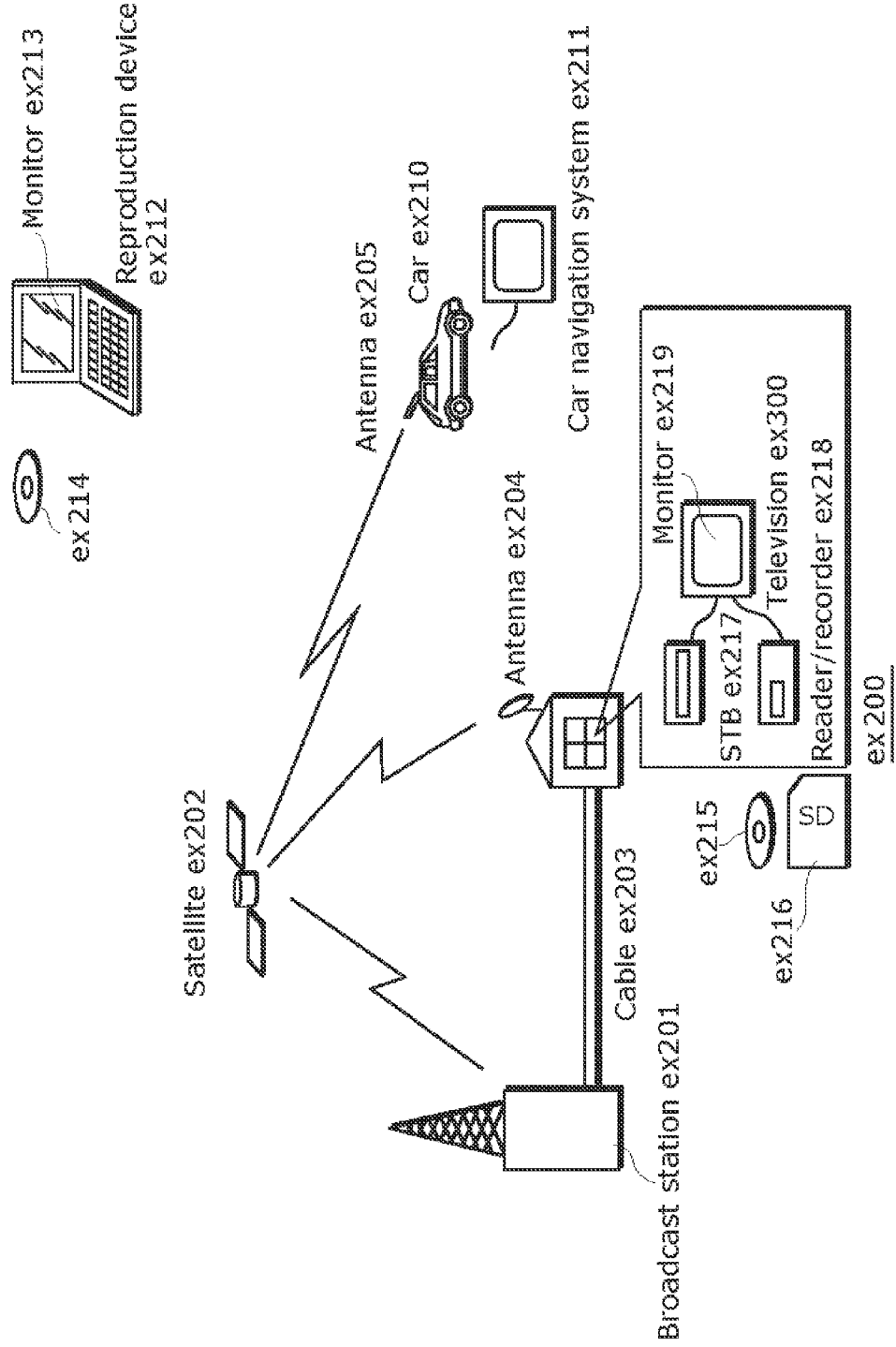
FIG. 28 illustrates an overall configuration of a digital broadcasting system.

The present invention is not limited to the example of the content providing system ex100. At least one of an image encoding device and an image decoding device in the above embodiments can be incorporated into the digital broadcasting system ex200 as shown in FIG. 28. More specifically, a bit stream of video information is transmitted from a broadcast station ex201 to a communication or broadcast satellite ex202 via radio waves. The bitstream is an encoded bitstream generated by the image encoding method described in the above embodiments. Upon receipt of it, the broadcast satellite ex202 transmits radio waves for broadcasting, and a home antenna ex204 with a satellite broadcast reception function receives the radio waves. A device such as a television (receiver) ex300 or a Set Top Box (STB) ex217 decodes the coded bit stream for reproduction.

The image decoding device described in the above embodiments can be implemented in a reproduction device ex212 for reading and decoding an encoded bit stream recorded on a recording medium ex214 such as a CD and DVD that is a recording medium. In this case, the reproduced video signals are displayed on a monitor ex213.

The image decoding device or the image encoding device described in the above embodiments can be implemented in a reader/recorder ex218 for reading and decoding an encoded bitstream recorded on a recording medium ex215 such as a DVD and a BD or for encoding and writing video signals into the recording medium ex215. In this case, the reproduced video signals are displayed on a monitor ex219, and the recording medium ex215, on which the coded bitstream is recorded, allows a different device of system to reproduce the video signals. It is also conceived to implement the image decoding device in the set top box ex217 connected to a cable ex203 for cable television or the antenna ex204 for satellite and/or terrestrial broadcasting so as to reproduce them on a monitor ex219 of the television. The image decoding device may be incorporated into the television, not in the set top box.

Figure 29:
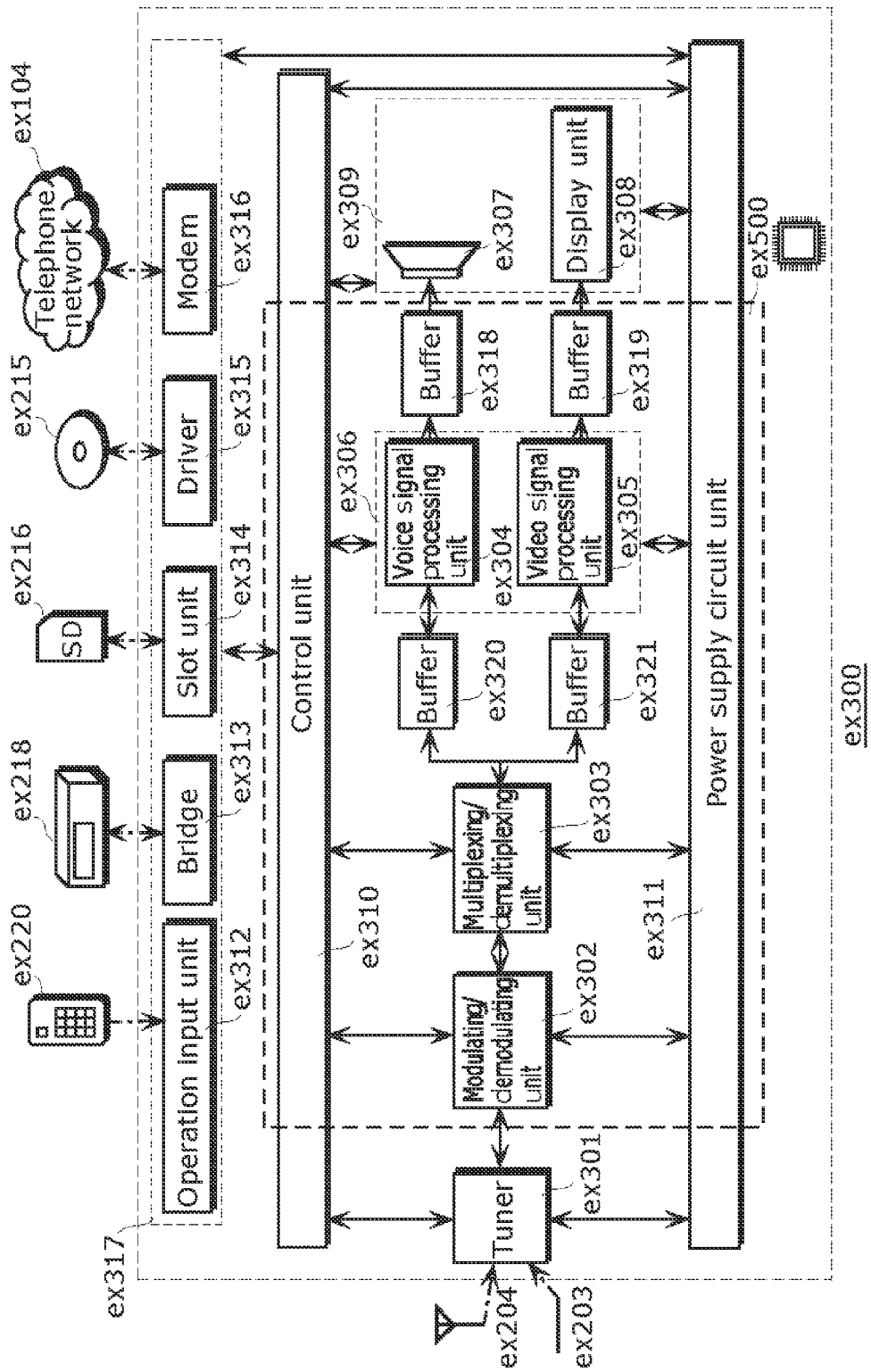
FIG. 29 is a block diagram illustrating an example of a configuration of a television.

FIG. 29 is a diagram showing a television (receiver) ex300 using the image decoding method described in the above embodiments. The television ex300 includes: a tuner ex301 that receives or outputs a bitstream of video information via the antenna ex204, the cable ex203, or the like that receives the above broadcasting; a modulating/demodulating unit ex302 that demodulates the received coded data or modulates generated coded data to be transmitted to the outside; and a multiplexing/demultiplexing unit ex303 that demultiplexes the modulated video data from the modulated audio data or multiplexes the coded video data and the coded audio data.

In addition, the television ex300 includes: a signal processing unit ex306 having (a) an audio signal processing unit ex304 that decodes or encodes audio data and (b) a video signal processing unit ex305 that decodes or encodes video data; and an output unit ex309 having (c) a speaker ex307 that outputs the decoded audio signal and (d) a display unit ex308, such as a display, that displays the decoded video signal. Furthermore, the television ex300 includes an interface unit ex317 having an operation input unit ex312 that receives inputs of user operations, and the like. Moreover, the television ex300 includes: a control unit ex310 for the overall controlling of the respective units; and a power supply circuit unit ex311 that supplies the respective units with power.

In addition to the operation input unit ex312, the interface unit ex317 may include: a bridge ex313 connected to external devices such as the reader/recorder ex218; a slot unit ex314 enabling the recording medium ex216 such as an SD card to be attached to the interface unit ex317; a driver ex315 for connecting to an external recording medium such as a hard disk; a modem ex316 connected to a telephone network; and the like. It should be noted that the recording medium ex216 enables information to be electrically recorded on a stored nonvolatile/volatile semiconductor memory device.

The units in the television ex300 are connected to one another via a synchronous bus.

First, the description is given for the structure by which the television ex300 decodes and reproduces data received from the outside via the antenna ex204 or the like. The television ex300 receives a user operation from a remote controller ex220 or the like. Then, under control of the control unit ex310 having a CPU and the like, the television ex300 demodulates video data and audio data at the modulating/demodulating unit ex302, and demultiplexes the demodulated video data from the demodulated audio data at the multiplexing/demultiplexing unit ex303. In addition, the television ex300 decodes the demultiplexed audio data at the audio signal processing unit ex304, and decodes the demultiplexed video data at the video signal processing unit ex305 using the decoding method described in the above embodiments. The decoded audio signal and the decoded video signal are separately outputted from the output unit ex309 to the outside. When outputting the signals, the signals may be temporarily stored in, for example, buffers ex318 and ex319, so that the audio signal and the video signal are reproduced in synchronization with each other. Furthermore, the television ex300 may read the coded bitstream, not from broadcasting or the like but from the recording media ex215 and ex216 such as a magnetic/optical disc and a SD card.

Next, the description is given for the structure by which the television ex300 encodes audio signal and video signal, and transmits the coded signals to the outside or writes them onto a recording medium or the like. The television ex300 receives a user operation from the remote controller ex220 or the like, and then, under control of the control unit ex310, encodes audio signal at the audio signal processing unit ex304, and encodes video data at the video signal processing unit ex305 using the encoding method described in the above embodiments. The coded audio signal and the coded video signal are multiplexed at the multiplexing/demultiplexing unit ex303 and then outputted to the outside. When multiplexing the signals, the signals may be temporarily accumulated in, for example, buffers ex320 and ex321, so that the audio signal and the video signal are in synchronization with each other.

It should be noted that the buffers ex318 to ex321 may be implemented as a plurality of buffers as shown, or may share one or more buffers. It should also be noted that, besides the shown structure, it is possible to include a buffer, for example, between the modulating/demodulating unit ex302 and the multiplexing/demultiplexing unit ex303, so that the buffer serves as a buffer preventing system overflow and underflow, and thereby accumulate data in the buffer.

It should also be noted that, in addition to the structure for receiving audio data and video data from broadcasting, recording media, and the like, the television ex300 may also have a structure for receiving audio inputs from a microphone and a camera, so that the encoding is preformed for the received data. Here, although it has been described that the television ex300 can perform the above-described encoding, multiplexing, and providing to the outside, it is also possible that the television ex300 cannot perform all of them but can perform one of the encoding, multiplexing, and providing to the outside.

It should be noted that, when the reader/recorder ex218 is to read or write an encoded bitstream from/into a recording medium, either the television ex300 or the reader/recorder ex218 may perform the above-described decoding or encoding, or the television ex300 and the reader/recorder ex218 may share the above-described decoding or encoding.

Figure 30:
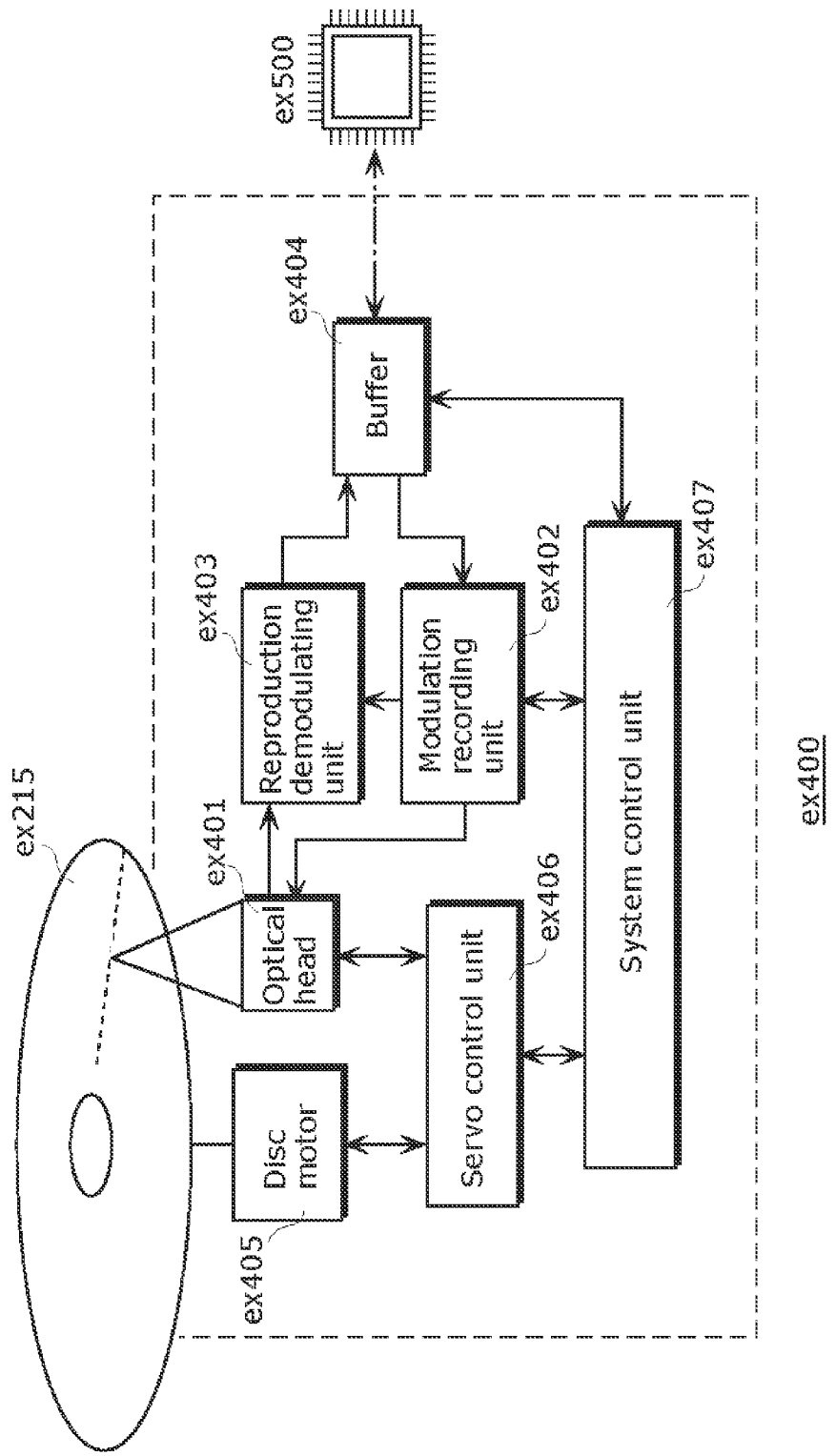
FIG. 30 is a block diagram illustrating an example of a configuration of an information reproducing/recording unit that reads and writes information from and on a recording medium that is an optical disk.

As an example, FIG. 30 shows a structure of an information reproducing/recording unit ex400 in the case where data is read from or written into an optical disc. The information reproducing/recording unit ex400 includes the following units ex401 to ex407.

The optical head ex401 writes information into the recording medium ex215 as an optical disc by irradiating laser spot on a recording surface of the recording medium ex215, and reads information from the recording medium ex215 by detecting light reflected on the recording surface of the recording medium ex215. The modulation recording unit ex402 electrically drives a semiconductor laser included in the optical head ex401, and thereby modulates laser light according to recorded data. A reproduction demodulating unit ex403 amplifies reproduction signal that is obtained by electrically detecting light reflected on the recording surface by a photo detector included in the optical head ex401, then demultiplexes and demodulates signal components recorded on the recording medium ex215, and reproduces necessary information. A buffer ex404 temporarily stores the information to be recorded onto the recording medium ex215, and the information reproduced from the recording medium ex215. A disc motor ex405 rotates the recording medium ex215. A servo control unit ex406 moves the optical head ex401 to a predetermined information track while controlling rotation driving of the disc motor ex405, thereby performing tracking processing of the laser spot.

The system control unit ex407 controls the overall information reproducing/recording unit ex400. The above-described reading and writing are realized when the system control unit ex407 records and reproduces information via the optical head ex401 while cooperating the modulation recording unit ex402, the reproduction demodulating unit ex403, and the servo control unit ex406, by using various information stored in the buffer ex404 and new information generated and added as needed. The system control unit ex407 includes, for example, a microprocessor, and performs the above processing by executing a reading/writing program.

Although it has been described above that the optical head ex401 irradiates laser spot, the optical head ex401 may perform higher-density recording by using near-field light.

Figure 31:
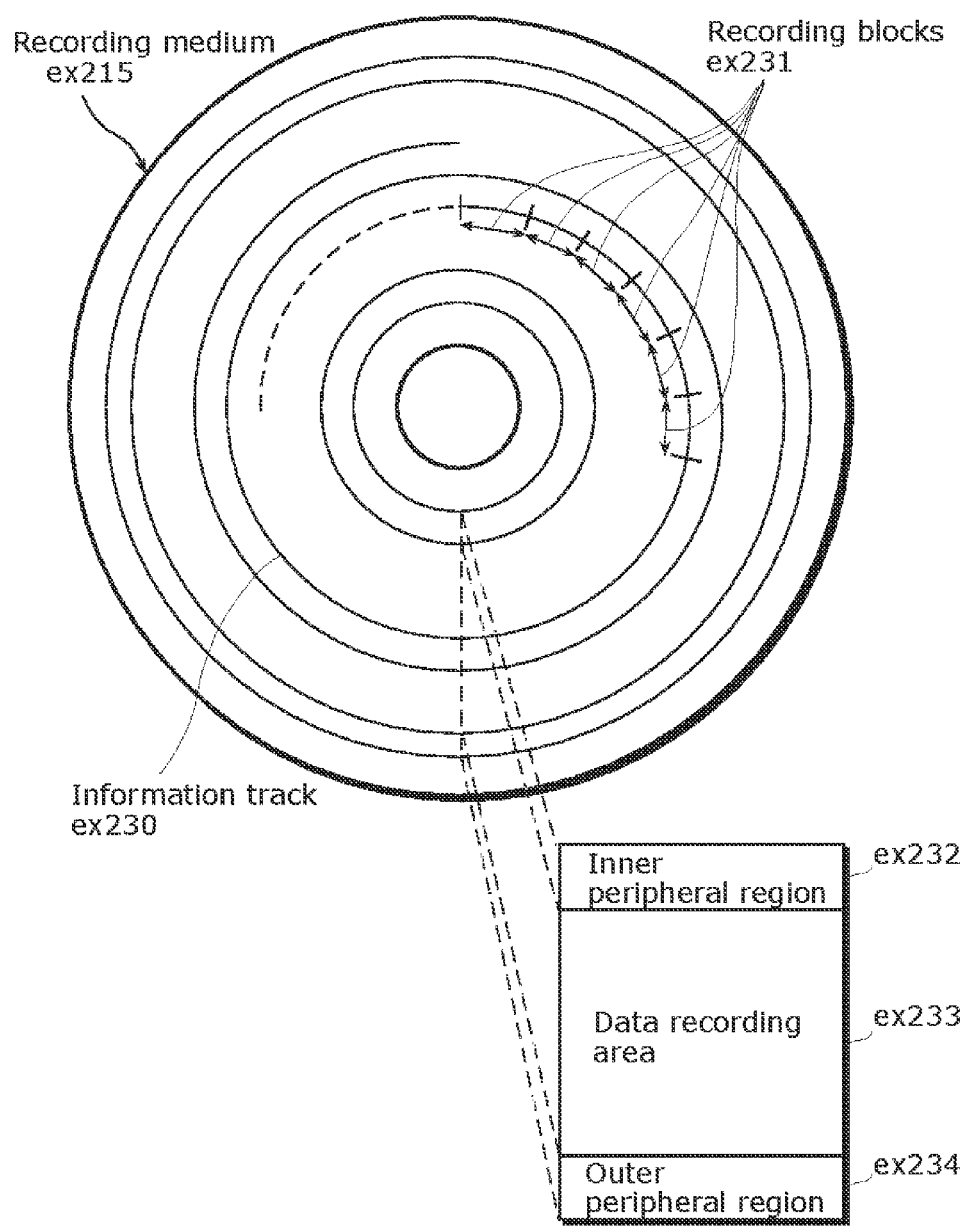
FIG. 31 illustrates an example of a configuration of a recording medium that is an optical disk.

FIG. 31 shows a schematic diagram of the recording medium ex215 that is an optical disc. On the recording surface of the recording medium ex215, guide grooves are formed in a spiral shape, and on an information track ex230, address information indicating an absolute position on the disc is previously recorded using a change of the groove shape. The address information includes information for identifying a position of a recording block ex231 that is a unit for recording data, and a devise performing recording and reproduction is capable of specifying the recording block by reproducing the information track ex230 to read the address information. Moreover, the recording medium ex215 includes a data recording region ex233, an inner peripheral region ex232, and an outer peripheral region ex234. The data recording region ex233 is a region on which user data is recorded. The inner peripheral region ex232 and the outer peripheral region ex234 which are provided in the inner periphery and the outer periphery, respectively, of the data recording region ex233 are for specific uses except the user data recording.

The information reproducing/recording unit ex400 reads/writes coded audio data and video data or coded data generated by multiplexing them, from/into such data recording region ex233 of the recording medium ex215.

Although the above has been described giving the example of a one-layer optical disc such as a DVD or a BD, the optical disc is not limited to the above but may be a multi-layer optical disc so that data can be recorded onto other regions in addition to the surface. Furthermore, the optical disc may have a structure for multidimensional recording/reproducing, such as data recording using color lights having various different wavelengths on the same position of the disc, or recording of layers of different pieces of information from various angles.

It should also be noted that it is possible in the digital broadcasting system ex200 that the car ex210 having the antenna ex205 receives data from the satellite ex202 or the like, and reproduces moving images on the display device such as the car navigation system ex211 or the like in the car ex210. As for the configuration of the car navigation system ex211, a configuration added with a GPS receiving unit to the units as shown in FIG. 29, is conceivable. The same applies to the computer ex111, the mobile phone ex114 and others. Moreover, likewise the television ex300, three types of implementations can be conceived for a terminal such as the above-mentioned mobile phone ex114: a communication terminal equipped with both an encoder and a decoder; a sending terminal equipped with an encoder only; and a receiving terminal equipped with a decoder only.

Thus, the image encoding method and the image decoding method described in the above embodiments can be used in any of the above-described devices and systems, and thereby the effects described in the above embodiments can be obtained.

It should be noted that the present invention is not limited to the above embodiments but various variations and modifications are possible in the embodiments without departing from the scope of the present invention.

Embodiment 7

Figure 32:
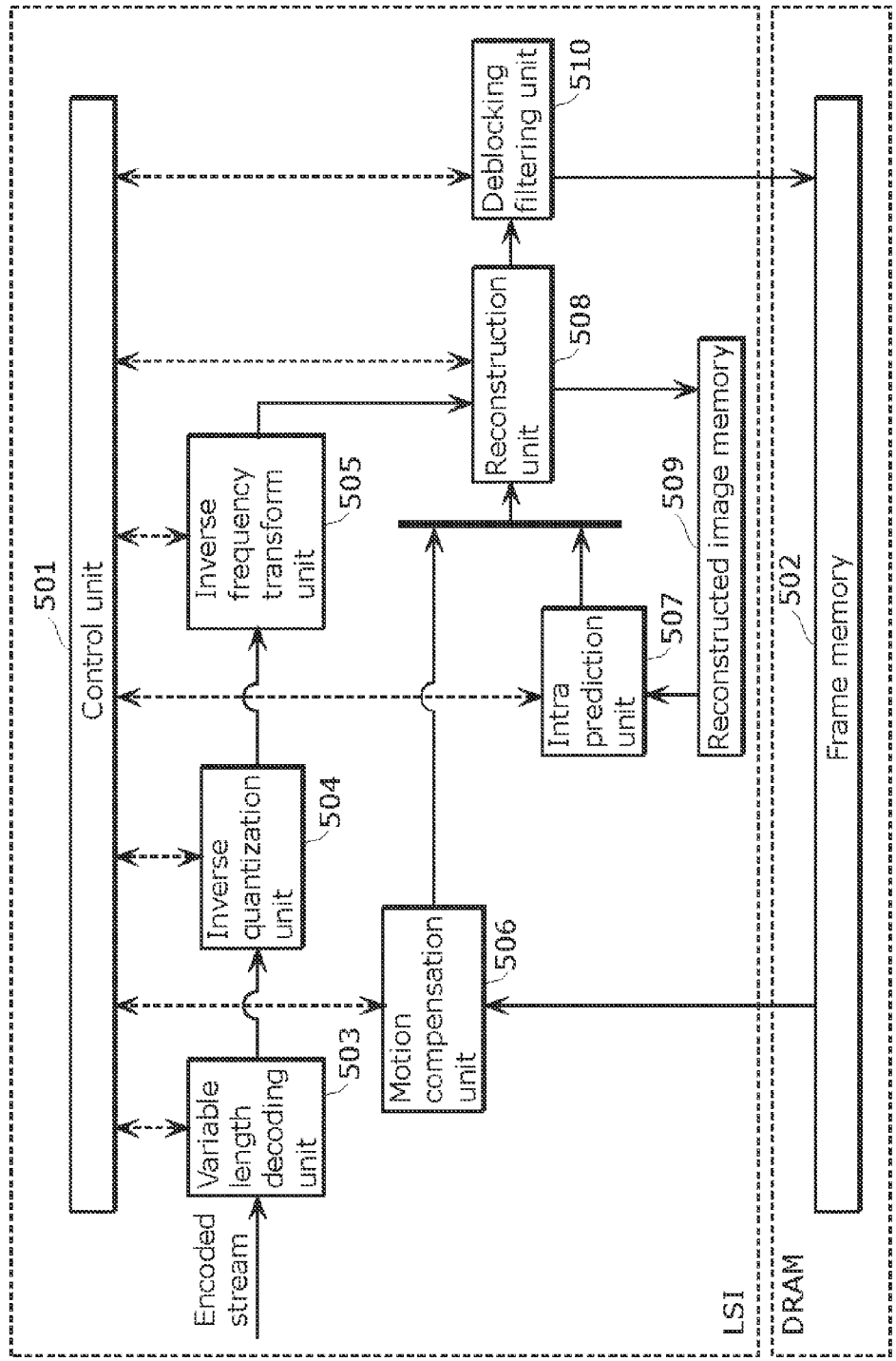
FIG. 32 illustrates an example of a configuration of an integrated circuit for executing image decoding processing.

In this embodiment, the image decoding device according to Embodiment 1 is typically implemented into a Large Scale Integration (LSI) which is an integrated circuit. FIG. 32 shows this embodiment. A frame memory 502 is implemented into a DRAM and the other circuits and memories are implemented into the LSI. A stream buffer for storing a bitstream may be realized on the DRAM.

These structural elements may be integrated separately, or a part or all of them may be integrated into a single chip. Here, the integrated circuit is referred to as an LSI, but the integrated circuit can be called an IC, a system LSI, a super LSI or an ultra LSI depending on their degrees of integration.

The technique of integrated circuit is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured.

Furthermore, when a circuit integration technology for replacing LSIs with new circuits appears in the future with advancement in semiconductor technology and derivative other technologies, the circuit integration technology may be naturally used to integrate the structural elements. Application of biotechnology is one such possibility.

Moreover, the semiconductor chip on which the image decoding device according to the embodiments is combined with a display for drawing images to form an image drawing device depending on various applications. The present invention can thereby be used as an information drawing means for a mobile phone, a television set, a digital video recorder, digital camcorder, a vehicle navigation device, and the like. The display in the combination may be a cathode-ray tube (CRT), a flat display such as a liquid crystal display, a plasma display panel (PDP), or an organic light emitting display (OLED), a projection display represented by a projector, or the like.

It should also be noted that the LSI according to this embodiment may perform encoding and decoding in cooperation with a bitstream buffer on which coded streams are accumulated and a Dynamic Random Access Memory (DRAM) including a frame memory on which images are accumulated. The LSI according to this embodiment may be cooperated not with a DRAM, but with a different storage device such as an embedded DRAM (eDRAM), a Static Random Access Memory (SRAM), or a hard disk.

Embodiment 8

Figure 33:
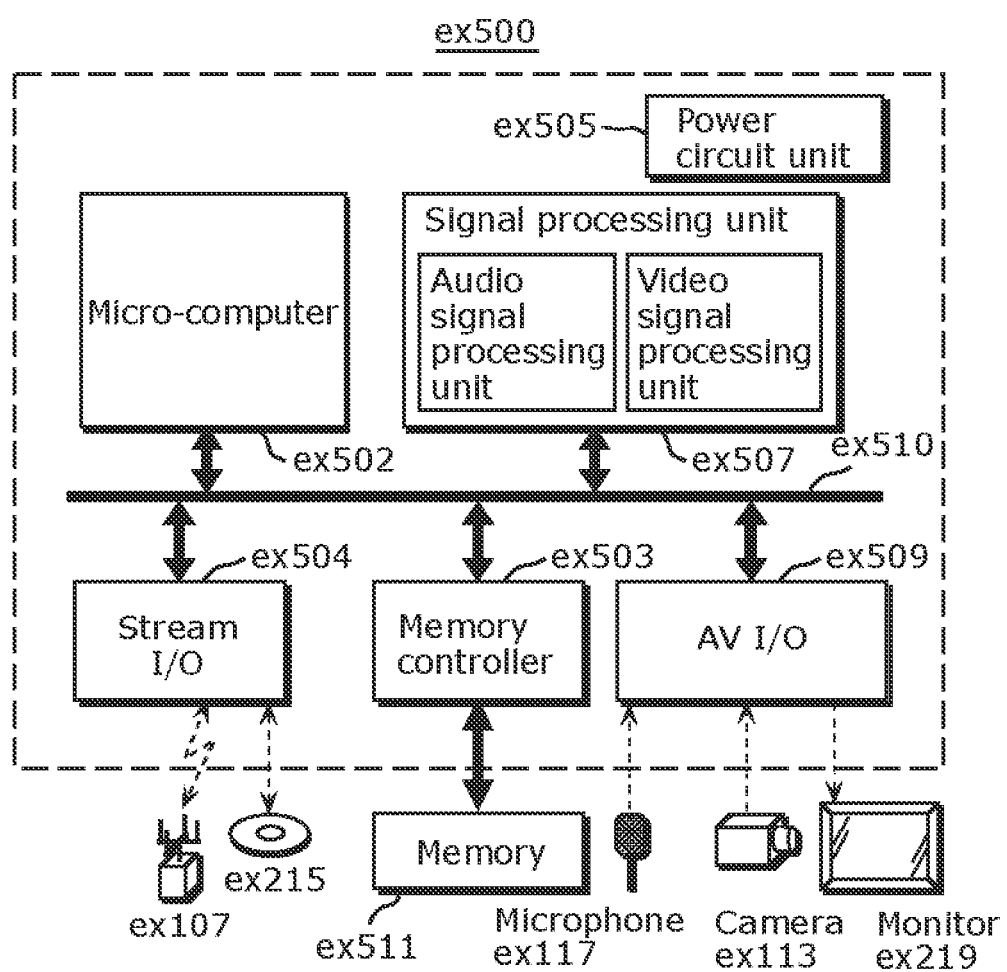
FIG. 33 illustrates an example of a configuration of an integrated circuit for executing image decoding processing and image encoding processing.

In this embodiment, the image encoding device, the image decoding device, the image encoding method, and the image decoding method which have been described in the above embodiments are typically implemented into a Large Scale Integration (LSI) which is an integrated circuit. As an example, FIG. 33 shows a structure of an LSI ex500 on which they are integrated into a single chip. The LSI ex500 includes the following units ex502 to ex509 which are connected to one another via a bus ex510. When a power source is ON, a power supply circuit unit ex505 supplies power to each of the units to activate them to be capable of operating.

For example, in the case of encoding, the LSI ex500 receives input audio/visual (AV) signals from an AV I/O ex509 via the microphone ex117, the camera ex113, or the like. The input AV signals are temporarily stored in an external memory ex511 such as an SDRAM. The accumulated data is, for example, divided into a plurality of times depending on a processing amount and a processing speed, and eventually provided to a signal processing unit ex507. The signal processing unit ex507 performs encoding of audio signal and/or encoding of video signal. Here, the encoding of video signal is the encoding described in the above embodiments. Furthermore, the signal processing unit ex507 performs multiplexing of the coded audio data and the coded video data and other processing as needed, and provides the resulting data from a stream I/O ex504 to the outside. The output bitstream is transmitted to the base station ex107, or written to the recording medium ex215.

Moreover, for example, in the case of decoding, under the control of the microcomputer ex502, the LSI ex500 temporarily accumulates, to a memory ex511 or the like, coded data that is obtained using the stream I/O ex504 via the base station ex107, or coded data that is obtained by reading it from the recording medium ex215. Under control of the microcomputer ex502, the accumulated data is, for example, divided into a plurality of times depending on a processing amount and a processing speed, and eventually provided to the signal processing unit ex507. The signal processing unit ex507 performs decoding of audio signal and/or decoding of video signal. Here, the decoding of a video signal is the decoding described in the above embodiments. It is preferable that the decoded audio signal and the decoded video signal are temporarily stored in the memory ex511 or the like as needed, so that they can be reproduced in synchronization with each other. The decoded output signal is outputted from the AV I/O ex509 to the monitor ex219 or the like appropriately via the memory ex511 or the like. The access to the memory ex511 is actually performed via the memory controller ex503.

Although it has been described above that the memory ex511 is outside the LSI ex500, the memory ex511 may be included in the LSI ex500. It is possible that the LSI ex500 may be integrated into a single chip, or may be integrated separately.

Here, the integrated circuit is referred to as an LSI, but the integrated circuit can be called an IC, a system LSI, a super LSI or an ultra LSI depending on their degrees of integration.

Moreover, ways to achieve integration are not limited to the LSI, and a dedicated circuit or a general purpose processor can also achieve the integration. It is also possible to use a Field Programmable Gate Array (FPGA) that can be programmed after manufacturing the LSI, or a reconfigurable processor in which connection and setting of circuit cells inside the LSI can be reconfigured.

Furthermore, when a circuit integration technology for replacing LSIs with new circuits appears in the future with advancement in semiconductor technology and derivative other technologies, the circuit integration technology may be naturally used to integrate the structural elements. Application of biotechnology is one such possibility.

INDUSTRIAL APPLICABILITY

The present invention is applicable to various usages. For example, the present invention can be used for high resolution information display devices and imaging devices such as televisions, digital video recorders, car navigation systems, mobile phones, digital cameras, and digital video cameras, and thus has a high utility value.

REFERENCE SIGNS LIST 100, 300, 700 Image decoding device
101, 102, 201, 202, 301, 302, 401, 402, 701, 702, 801, 802 Process unit
111, 211, 311, 411, 711, 712, 811, 812 Storage unit
200, 400, 800 Image encoding device
320, 420 Determination unit
500, 511, 512, 513, 514, 515, 517, 518, 519 FIFO unit
501 ex310 Control unit
502 Frame memory
503 Variable length decoding unit
504 Inverse quantization unit
505 Inverse frequency transform unit
506 Motion compensation unit
507 Intra prediction unit
508 Reconstruction unit
509 Reconstructed image memory
510 In-loop filtering unit
5001, 5002, 5003 FIFO management unit
5011, 5012, 5013 Activation unit
5020 Size determination unit
ex100 Content providing system
ex101 Internet
ex102 Internet service provider
ex103 Streaming server
ex104 Telephone network
ex106, ex107, ex108, ex109, ex110 Base station
ex111 Computer
ex112 Personal Digital Assistant (PDA)
ex113, ex116 Camera
ex114 Mobile phone
ex115 Gaming machine
ex117 Microphone
ex200 Digital broadcasting system
ex201 Broadcast station
ex202 Broadcast satellite (satellite)
ex203 Cable
ex204, ex205 Antenna
ex210 Car
ex211 Car navigation system
ex212 Reproduction device
ex213, ex219 Monitor
ex214, ex215, ex216 Recording medium
ex217 Set Top Box (STB)
ex218 Reader/recorder
ex220 Remote controller
ex230 Information track
ex231 Recording block
ex232 Inner peripheral region
ex233 Data recording region
ex234 Outer peripheral region
ex300 Television (receiver)
ex301 Tuner
ex302 Modulating/demodulating unit
ex303 Multiplexing/demultiplexing unit
ex304 Audio signal processing unit
ex305 Video signal processing unit
ex306, ex507 Signal processing unit
ex307 Speaker
ex308 Display unit
ex309 Output unit
ex311, ex505 Power supply circuit unit
ex312 Operation input unit
ex313 Bridge
ex314 Slot unit
ex315 Driver
ex316 Modem
ex317 Interface unit
ex318, ex319, ex320, ex321, ex404 Buffer
ex400 Information reproducing/recording unit
ex401 Optical head
ex402 Modulation recording unit
ex403 Reproduction demodulating unit
ex405 Disc motor
ex406 Servo control unit
ex407 System control unit
ex500 LSI
ex502 Microcomputer
ex503 Memory controller
ex504 Stream I/O
ex509 AV I/O ex510 Bus
ex511 Memory

The invention claimed is:

1. An image decoding device which decodes, by pipeline processing which includes plural processes, an encoded image obtained by encoding plural blocks of at least two sizes divided from the image, the image decoding device comprising:
a first storage unit having a storage area for two blocks having a largest size of the at least two sizes;
a first process unit configured to perform a first process among the plural processes on the plural blocks sequentially, and sequentially store the plural blocks on which the first process has been performed into the first storage unit; and
a second process unit configured to sequentially extract the plural blocks from the first storage unit, and perform a second process among the plural processes on the extracted plural blocks sequentially,
wherein when the first process unit sequentially stores the plural blocks into the first storage unit, the storage area for two blocks having the largest size stores three or more blocks at a time, depending on an available area in the storage area.

2. The image decoding device according to claim 1, further comprising
a second storage unit,
wherein the second process unit is configured to determine whether a block on which the first process has been performed is stored in the first storage unit and whether the second storage unit has an available area for storing a block on which the second process is performed, and
at a time when the second process unit determines that a block on which the first process has been performed is stored in the first storage unit and the second storage unit has an available area for storing a block on which the second process is performed, the second process unit is configured to extract the block from the first storage unit, perform the second process on the extracted block, and store the block on which the second process has been performed into the second storage unit.

3. The image decoding device according to claim 1, further comprising
a determination unit configured to determine sizes of the plural blocks,
wherein the first process unit is configured to determine, according to a size of a block on which the first process has been performed, an area to be occupied by the block in the first storage unit, and store the block into the determined area.

4. The image decoding device according to claim 1,
wherein the plural blocks are plural coding units, plural transform units, or plural prediction units, and
the first process unit or the second process unit is configured to perform, as the first process or the second process, a variable length decoding process on the plural coding units, an inverse frequency transform process on the plural transform units, or a prediction process on the plural prediction units.

5. The image decoding device according to claim 1,
wherein the first process unit is configured to perform a variable length decoding process as the first process, and
the second process unit is configured to perform an inverse quantization process as the second process.

6. The image decoding device according to claim 1,
wherein the first process unit is configured to perform an inverse quantization process as the first process, and
the second process unit is configured to perform an inverse frequency transform process as the second process.

7. The image decoding device according to claim 1,
wherein the first process unit is configured to perform an inverse frequency transform process as the first process, and
the second process unit is configured to perform a reconstruction process as the second process.

8. The image decoding device according to claim 1,
wherein the first process unit is configured to perform an intra prediction process as the first process, and
the second process unit is configured to perform a reconstruction process as the second process.

9. The image decoding device according to claim 1,
wherein the first process unit is configured to perform a motion compensation process as the first process, and
the second process unit is configured to perform a reconstruction process as the second process.

10. The image decoding device according to claim 1,
wherein the first process unit is configured to perform a reconstruction process as the first process, and
the second process unit is configured to perform an in-loop filtering process as the second process.

11. The image decoding device according to claim 1,
wherein the first process unit is configured to perform a reference image transfer process as the first process, and
the second process unit is configured to perform a motion compensation process as the second process.

12. The image decoding device according to claim 1,
wherein the second process unit is configured to sequentially extract the plural blocks from the first storage unit and perform the second process on the extracted plural blocks sequentially, asynchronously with the first process unit.

13. The image decoding device according to claim 1,
wherein the second process unit is configured to perform the second process on a second block away from a first block by two or more blocks in order in which the plural blocks are processed, in parallel to the first process unit performing the first process on the first block.

14. An image encoding device which divides an image into plural blocks of at least two sizes, and encodes the divided image by pipeline processing which includes plural processes, the image encoding device comprising:
a first storage unit having a storage area for two blocks having a largest size of the at least two sizes;
a first process unit configured to perform a first process among the plural processes on the plural blocks sequentially, and sequentially store the plural blocks on which the first process has been performed into the first storage unit; and
a second process unit configured to sequentially extract the plural blocks from the first storage unit, and perform a second process among the plural processes on the extracted plural blocks sequentially,
wherein when the first process unit sequentially stores the plural blocks into the first storage unit, the storage area for two blocks having the largest size stores three or more blocks at a time, depending on an available area in the storage area.

15. An image decoding method for decoding, by pipeline processing which includes plural processes, an encoded image obtained by encoding plural blocks of at least two sizes divided from the image, the image decoding method comprising:
(a) performing a first process among the plural processes on the plural blocks sequentially, and sequentially storing the plural blocks on which the first process has been performed into a first storage unit having a storage area for two blocks having a largest size of the at least two sizes; and (b) sequentially extracting the plural blocks from the first storage unit, and performing a second process among the plural processes on the extracted plural blocks sequentially, wherein in step (a), when the plural blocks are sequentially stored into the first storage unit, the storage area for two blocks having the largest size stores three or more blocks at a time, depending on an available area in the storage area.

16. A non-transitory computer-readable recording medium storing therein a program for causing a computer to execute the image decoding method according to claim 15.

17. An image encoding method for dividing an image into plural blocks of at least two sizes, and encoding the divided image by pipeline processing which includes plural processes, the image encoding method comprising:

(a) performing a first process among the plural processes on the plural blocks sequentially, and sequentially storing the plural blocks on which the first process has been performed into a first storage unit having a storage area for two blocks having a largest size of the at least two sizes; and (b) sequentially extracting the plural blocks from the first storage unit, and performing a second process among the plural processes on the extracted plural blocks sequentially, wherein in step (a), when the plural blocks are sequentially stored into the first storage unit, the storage area for two blocks having the largest size stores three or more blocks at a time, depending on an available area in the storage area.

18. A non-transitory computer-readable recording medium storing therein a program for causing a computer to execute the image encoding method according to claim 17.

19. An integrated circuit which decodes, by pipeline processing which includes plural processes, an encoded image obtained by encoding plural blocks of at least two sizes divided from the image, the integrated circuit comprising:

a first storage unit having a storage area for two blocks having a largest size of the at least two sizes;

a first process unit configured to perform a first process among the plural processes on the plural blocks sequentially, and sequentially store the plural blocks on which the first process has been performed into the first storage unit; and a second process unit configured to sequentially extract the plural blocks from the first storage unit, and perform a second process among the plural processes on the extracted plural blocks sequentially, wherein when the first process unit sequentially stores the plural blocks into the first storage unit, the storage area for two blocks having the largest size stores three or more blocks at a time, depending on an available area in the storage area.

20. An integrated circuit which divides an image into plural blocks of at least two sizes, and encodes the divided image by pipeline processing which includes plural processes, the integrated circuit comprising:

a first storage unit having a storage area for two blocks having a largest size of the at least two sizes;

a first process unit configured to perform a first process among the plural processes on the plural blocks sequentially, and sequentially store the plural blocks on which the first process has been performed into the first storage unit; and a second process unit configured to sequentially extract the plural blocks from the first storage unit, and perform a second process among the plural processes on the extracted plural blocks sequentially, wherein when the first process unit sequentially stores the plural blocks into the first storage unit, the storage area for two blocks having the largest size stores three or more blocks at a time, depending on an available area in the storage area.

* * * * *